(12) United States Patent
Burrows

(10) Patent No.: US 10,874,246 B2
(45) Date of Patent: Dec. 29, 2020

(54) BEVERAGE BREWING SYSTEMS AND METHODS FOR USING THE SAME

(71) Applicant: Coffee Solutions, LLC, Portland, OR (US)

(72) Inventor: Bruce D. Burrows, Valencia, CA (US)

(73) Assignee: COFFEE SOLUTIONS, LLC, Portland, OR (US)

( * ) Notice: Subject to any disclaimer, the term of this patent is extended or adjusted under 35 U.S.C. 154(b) by 441 days.

(21) Appl. No.: 15/516,894

(22) PCT Filed: Oct. 6, 2015

(86) PCT No.: PCT/US2015/054312
§ 371 (c)(1),
(2) Date: Apr. 5, 2017

(87) PCT Pub. No.: WO2016/057568
PCT Pub. Date: Apr. 14, 2016

(65) Prior Publication Data
US 2017/0290458 A1    Oct. 12, 2017

Related U.S. Application Data

(60) Provisional application No. 62/136,258, filed on Mar. 20, 2015, provisional application No. 62/069,772, filed on Oct. 28, 2014, provisional application No. 62/060,282, filed on Oct. 6, 2014.

(51) Int. Cl.
*A47J 31/36* (2006.01)
*A47J 31/46* (2006.01)
*A47J 31/56* (2006.01)
*A47J 31/10* (2006.01)

(52) U.S. Cl.
CPC ......... *A47J 31/3628* (2013.01); *A47J 31/469* (2018.08); *A47J 31/56* (2013.01); *A47J 31/10* (2013.01)

(58) Field of Classification Search
CPC ........ A47J 31/3628; A47J 31/46; A47J 31/56; A47J 31/10
USPC .................. 99/279, 283, 288; 426/231, 431
See application file for complete search history.

(56) References Cited

U.S. PATENT DOCUMENTS

| | | | |
|---|---|---|---|
| 5,083,504 A * | 1/1992 | Koga | A47J 31/32 99/295 |
| 5,403,564 A * | 4/1995 | Katschnig | A23L 3/01 422/307 |
| 8,387,516 B1 | 3/2013 | Reynolds | |
| 2006/0292012 A1 * | 12/2006 | Brudevold | A47J 31/402 417/53 |

(Continued)

FOREIGN PATENT DOCUMENTS

DE    102008050532 A1    4/2010

*Primary Examiner* — Thien S Tran
(74) *Attorney, Agent, or Firm* — Miller Nash Graham & Dunn LLP

(57) ABSTRACT

Methods and apparatuses for brewing beverages. A brewing system in accordance with an aspect of the present disclosure comprises a fluid conduit system, an air conduit system, a valve, and a pump. The valve is coupled to the fluid conduit system and the air conduit system. The pump is coupled to the valve. The valve selectively accesses the fluid conduit system and the air conduit system such that the pump selectively pumps fluid and selectively pumps air.

20 Claims, 33 Drawing Sheets

(56) References Cited

U.S. PATENT DOCUMENTS

2009/0159612 A1\* 6/2009 Beavis .................... A47J 31/36
                                                       222/52
2013/0343907 A1    12/2013 Phillips
2014/0107835 A1\* 4/2014 Biasi .................... B67D 1/0036
                                                       700/231
2014/0242224 A1\* 8/2014 Glucksman ............. A47J 31/32
                                                       426/231

\* cited by examiner

FIG. 33
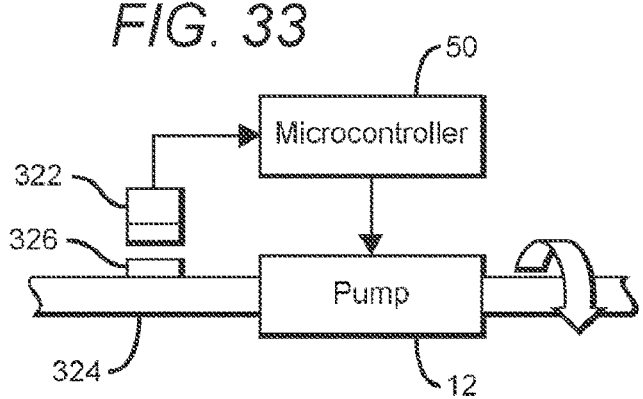
FIG. 34
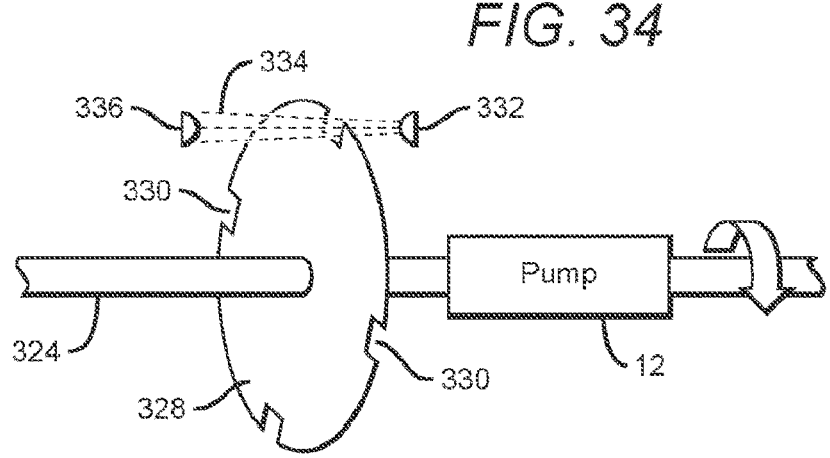
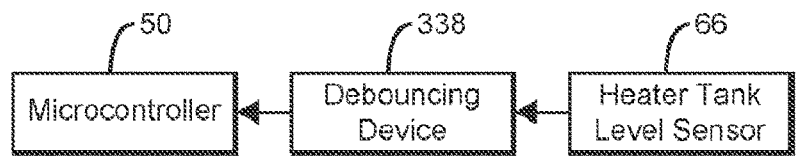
FIG. 35
FIG. 36
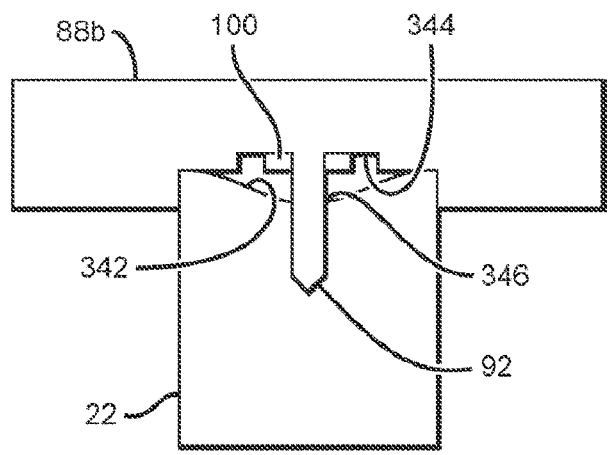

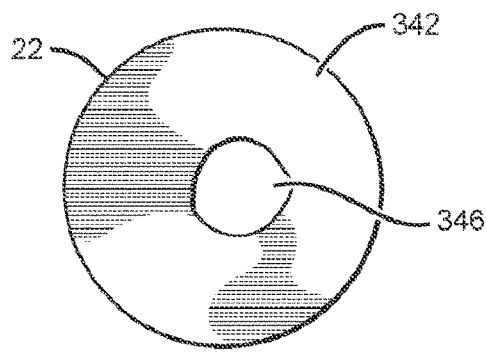
FIG. 37
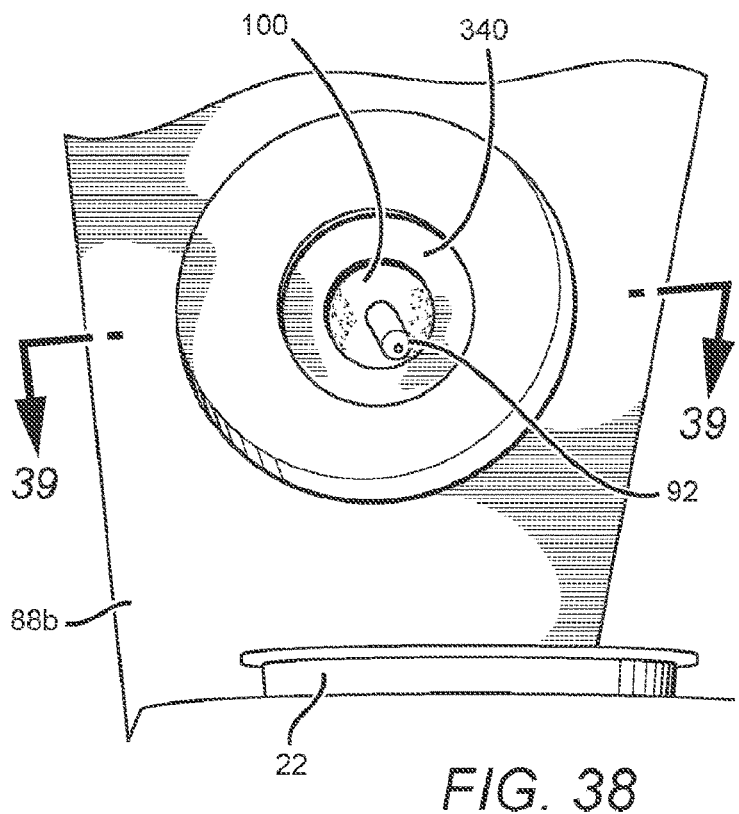
FIG. 38
FIG. 39
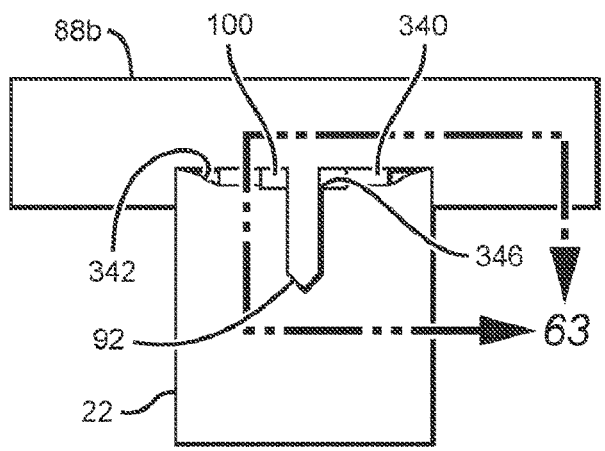

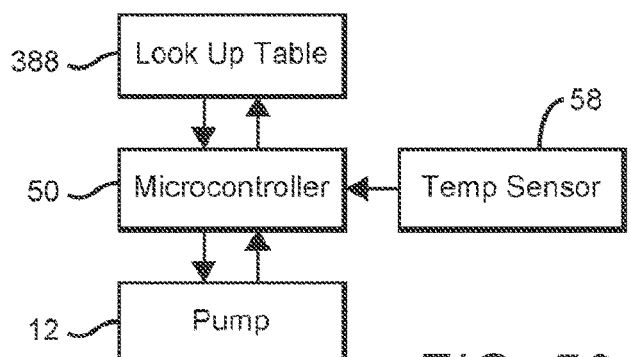
FIG. 50
FIG. 51
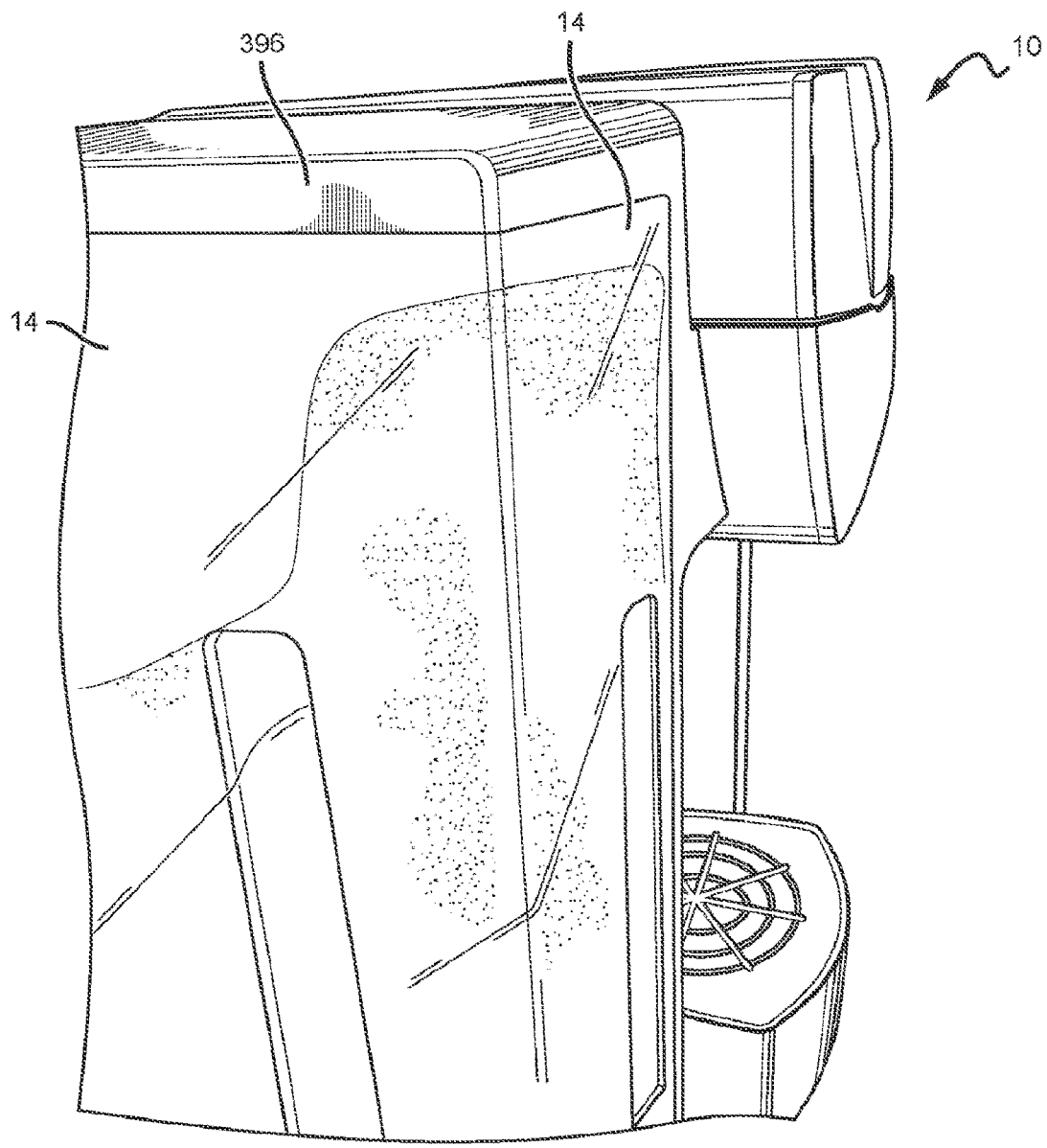

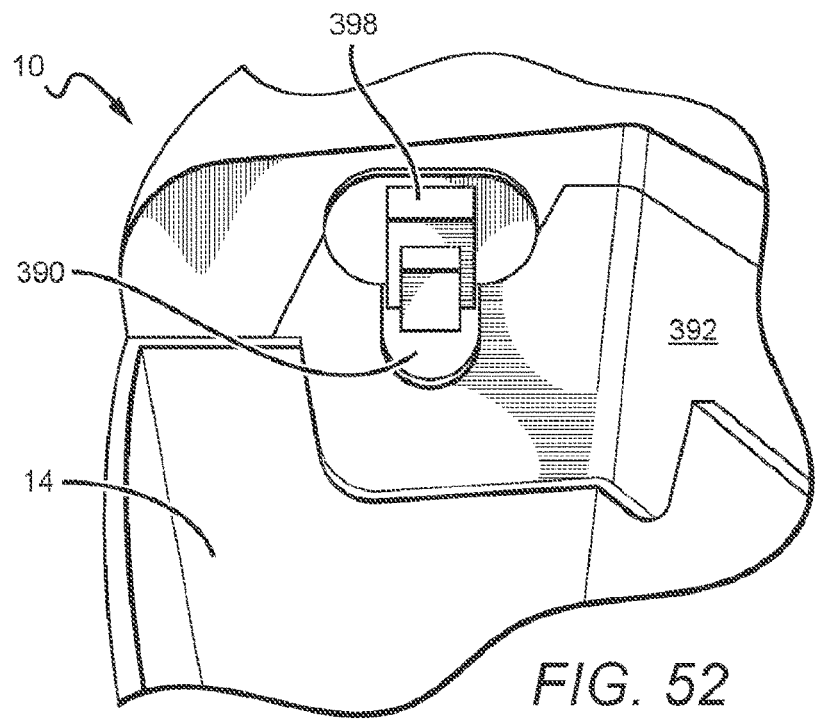
FIG. 52
FIG. 53
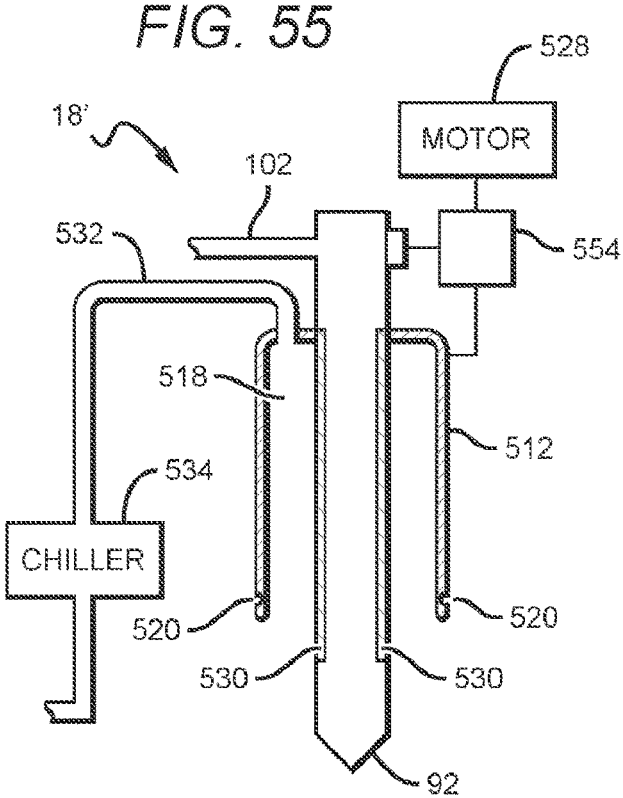
FIG. 55

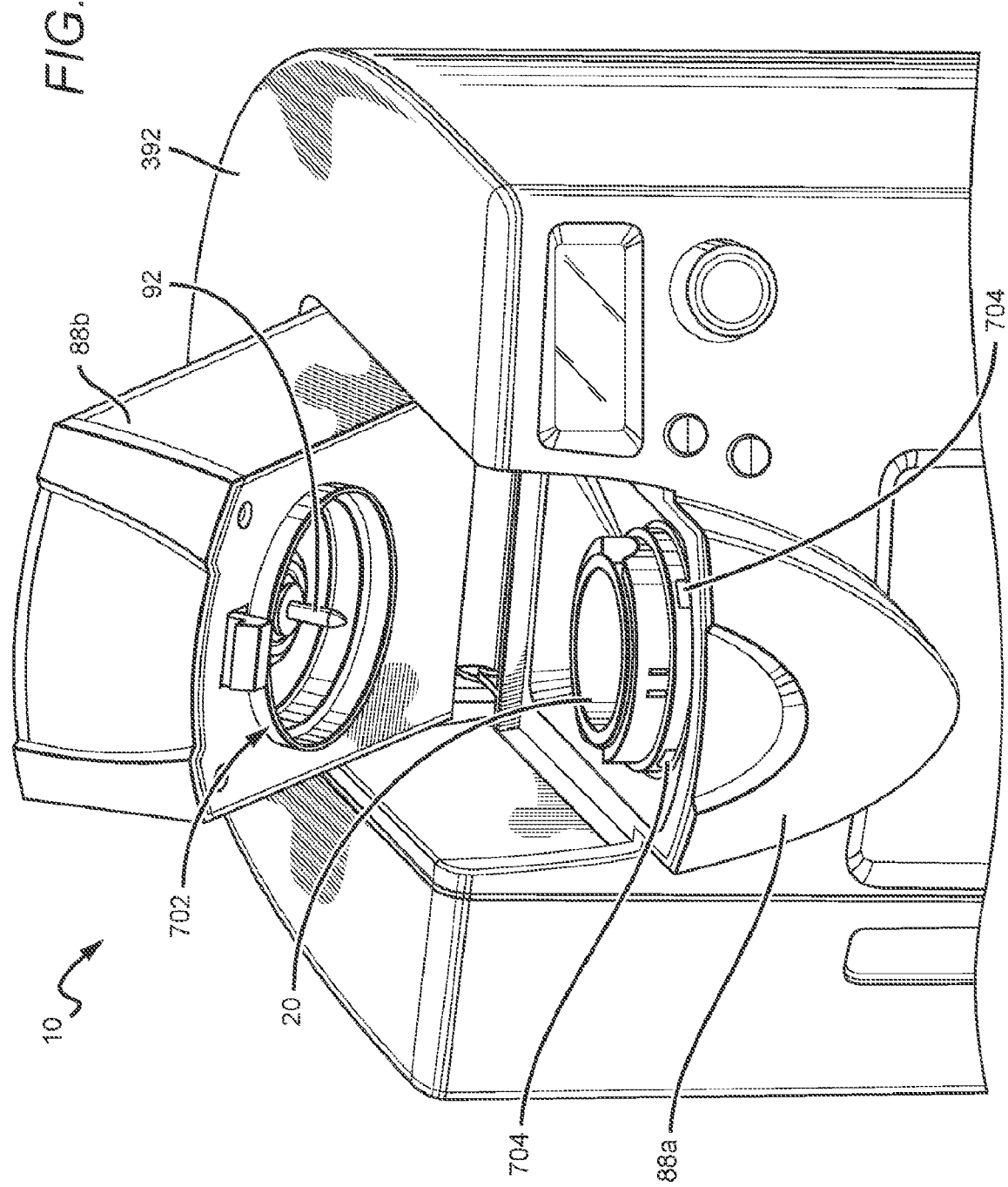

BEVERAGE BREWING SYSTEMS AND METHODS FOR USING THE SAME

CROSS-REFERENCE TO RELATED APPLICATIONS

This application is a National Stage of International Application No. PCT/US2015/054312, filed on Oct. 6, 2015 and entitled "Beverage Brewing Systems and Methods for Using the Same"; which claims priority to U.S. Provisional Application Ser. No. 62/060,282, filed on Oct. 6, 2014 and entitled "Coffee Brewing System and Method of Using the Same"; U.S. Provisional Application Ser. No. 62/069,772, filed on Oct. 28, 2014 and entitled "Coffee Brewing System and Method of Using the Same"; and U.S. Provisional Application Ser. No. 62/136,258, filed on Mar. 20, 2015 and entitled "Coffee Brewing System and Method of Using the Same", the disclosures of which are expressly incorporated by reference herein in their entirety.

BACKGROUND

Field

The present disclosure generally relates to beverage and/or liquid food preparation systems, such as beverage brewing systems, and methods for using the same. More specifically, the present disclosure relates to beverage brewing systems designed to brew a beverage from a single-serve or multi-serve brew cartridge, or the like.

Background

There are a wide variety of products on the market for brewing beverages. For example, traditional coffee brewers require consumers to brew an entire multi-serving pot of coffee during a single brew cycle. In recent years, single-serve coffee brewing devices have become a popular alternative because they allow consumers to quickly brew a single serving of coffee. This is particularly ideal for those who want a single cup of coffee on the go. In this respect, consumers no longer have to brew coffee they do not intend to drink. Single-serve coffee brewers known in the art include a reservoir for holding ambient temperature water used during the brew cycle. One or more pumps displace ambient temperature water from the reservoir to a heater tank for heating thereof before delivery to a brew chamber. Heated water in the brew chamber is injected into the interior of the single-serve brew cartridge, or more recently a multi-serve brew cartridge, by way of an inlet needle designed to pierce the cartridge top. The injected heated water intermixes with coffee grounds within the interior of the brew cartridge and biased from the cartridge bottom by a filter. Brewed coffee passes through the filter and typically out the bottom chamber of the coffee cartridge through an exit nozzle or needle and is dispensed into an underlying coffee mug or other single or multi-serve beverage receptacle through a dispensing head.

Single-serve brewing systems may use overly-complicated systems that deploy multiple sensors designed to determine multiple different fill levels in the heater tank. Moreover, these coffee brewing systems deliver heated water from the heater tank to the coffee cartridge at a constant rate when the brew cycle starts, and without the benefit of pre-heating or pre-wetting the grounds therein at the start of the brew cycle. In this respect, known brewers may not be able to maximize flavor-extraction during the brew cycle, at the expense of taste. Additionally, many single-serve coffee brewers use air to purge residual water at the end of the brew cycle, but require multiple, expensive pumps: one for pumping water from the reservoir to the heater tank and another for pumping the purging air. Multiple pumps decreases brewer efficiency, and unnecessarily increase the cost, weight and complexity of the brewer design.

Another aspect is that known coffee brewers internalize pressure within the heater tank and conduits. The internal pressure is useful to pump water from the heater tank and out into the brew chamber where brewed coffee is dispensed into an underlying container. But, conventional brewers do not have a way to release the internal pressure, except out through the inlet needle. As a result, the forward pressure build-up causes liquid to drip from the brewer dispensing nozzle or head for some duration after the brew cycle was supposed to be completed. Thus it is not uncommon for such brewers to include a drip tray underneath the dispensing head in expectation that the brewer will not cease dripping immediately after the brew cycle completes. Some brewers known in the art attempt to purge the remaining liquid using air, but the process is inefficient and typically results in continued and unwanted dripping.

Many conventional single-serve brewers known in the art have significant problems with water condensation along the interior surface of the water reservoir. The water reservoir container is typically made from a clear or lightly frosted material, so the condensation is readily visible. This condensation can be particularly aesthetically unappealing to the consumer. Additionally, some single-serve coffee brewers include relatively small or discrete ports that vents the interior of the brewer to atmosphere. This can be particularly beneficial or desirable for venting heated air generated by the heater tank during or after a brew cycle as long as the internal components of the brewer remain at a temperature above ambient. In one specific example, a single-serve brewer includes a passageway or port between the brewer interior and the atmosphere. But, the sidewall of the water reservoir and/or the water reservoir lid substantially occludes this passageway or port, thereby significantly inhibiting heated air flow from the interior of the brewer housing into the water reservoir.

Accordingly, there is a need in the art for a brewing system that includes a variety of improvements to better deliver hot water to a single-serve or multi-serve cartridge, such as measuring or monitoring water volume flow with a pump tachometer, a float-based sensor system for determining when the heater tank is full, providing an initial flash of heated water to initially pre-heat and pre-wet coffee grounds in the cartridge, a single dual-purpose pump configured for use with various fluids (e.g., liquid, air, or a combination thereof), an air-purge line that selectively opens by way of a solenoid or the like to introduce a source of ambient air to the inlet of the pump when purging water or coffee from the brewing system, a release that selectively opens at the end of the brew cycle to reduce pressure within the brewer conduit system to reduce and/or prevent dripping from the dispensing head at or near the conclusion of the brew cycle, a port opening the brewer to a water reservoir having a flow-through port to facilitate movement of relatively heated airflow through the water reservoir and out therefrom at a flow rate to substantially reduce or eliminate condensation within the water reservoir, and other improvements as described herein. The present disclosure fulfills these needs and provides further related advantages.

SUMMARY

The coffee brewing system disclosed herein generally includes a reservoir for storing water for use in brewing a beverage. The system also includes a pump having an inlet and an outlet for pumping water from the reservoir to a heater tank designed to heat water therein. In one embodiment, the coffee brewing system may include a first conduit having a one-way check valve with a positive cracking pressure in series that couples the reservoir to the pump inlet. The first conduit may optionally include a flow meter in series for measuring the volume of water flowing from the reservoir to the heater tank. Alternatively, a pump tachometer may instead measure the volume of water flowing therethrough, thereby supplanting the need for a flow meter. A second conduit may have an optional similar one-way check valve with a positive cracking pressure that couples the pump outlet in series with the heater tank inlet.

The brewing system further includes a heater tank level sensor having an inlet pickup coupled to the outlet of the heater tank and an outlet coupled to a third conduit for use in determining when the heater tank is full. The inlet pickup may extend into the heater tank outlet or be formed at or near the top of a dome-shaped nose of the heater tank. Water filling the heater tank enters into the heater tank level sensor, thereby causing a float therein to rise. When the heater tank is full or filled to a predetermined level, the float may block or occlude a photoreceptor from receiving a light beam from an emitter (e.g., a light-emitting diode ("LED")). A third conduit having an in-series one-way check valve with a positive cracking pressure couples the heater tank level sensor outlet to a brew head having a rotating or spinning inlet needle designed to pierce a brew cartridge and inject heated water into the coffee grounds contained therein.

The brewing system further includes a first air line having a first solenoid valve therein to selectively open the inlet-side of the pump to the atmosphere during an air purge cycle. The system also includes a second air line having a second solenoid in series to selectively open the outlet-side of the heater tank to the atmosphere to reduce dripping out from the brew head at the end of the brew cycle. The second air line may also include a tortuous path.

A method for using the brewing system disclosed herein includes initially pumping water from the reservoir to the heater tank for filling the heater tank and heating thereof. The controller shuts off the pump after the heater tank level sensor indicates the heater tank is full or at a predetermined level. A heater warms the water in the heater tank to a predetermined brewing temperature. The heating step may occur simultaneously during filling or at some point after the heater tank is full or filled to a predetermined level. Upon initiation of a brew cycle, the pump initially injects a small amount of heated water from the heater tank into the coffee cartridge to pre-heat and pre-wet the coffee grounds therein. The system then decreases the speed of the pump to displace a constant volume of heated water under a lower pressure and rate into the cartridge to brew most of the desired quantity of coffee. Near the end of the brew cycle, the brewing system opens the first solenoid valve to reduce the pressure on the inlet-side of the pump open to atmosphere. As a result, air is pumped through the second conduit and the heater tank and into the third conduit where a portion of the remaining water or brewed beverage is purged out through the brew head. Finally, the system opens the second solenoid valve at or about the same time the pump shuts off to reduce the pressure on the outlet-side of the heater tank, including the second conduit between the pump and the heater tank and the third conduit between the heater tank and the brew head. As such, the third check valve closes because the pressure in the third conduit falls below the cracking pressure thereof. In this respect, opening the second solenoid valve reduces or prevents the brew head from dripping because the third check valve closes, thereby preventing water from further flowing therethrough.

A brewing system in accordance with an aspect of the present disclosure comprises a fluid conduit system, an air conduit system, a valve, and a pump. The valve is coupled to the fluid conduit system and the air conduit system. The pump is coupled to the valve. The valve selectively allows access to the fluid conduit system and selectively allows access to the air conduit system such that the pump selectively pumps fluid and selectively pumps air.

A brewing system in accordance with another aspect of the present disclosure comprises a fluid conduit system and a pump coupled to the fluid conduit system. A volume of fluid in the fluid conduit system is measured by monitoring an electrical current draw of the pump.

A method for brewing a beverage in accordance with another aspect of the present disclosure comprises pumping a fluid at least partially through a first conduit to a cartridge containing a beverage medium, switching a valve when a desired amount of the fluid has been pumped to the cartridge, and pumping air through the first conduit to purge at least a portion of the fluid from the first conduit.

The above summary has outlined, rather broadly, some features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same or similar purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further features and advantages, will be better understood from the following description when considered in connection with the accompanying figures. It is to be expressly understood, however, that each of the figures is provided for the purpose of illustration and description only and is not intended as a definition of the limits of the present disclosure.

Other features and advantages of the present disclosure will become apparent from the following more detailed description, when taking in conjunction with the accompanying drawings, which illustrate, by way of example, the principles of the disclosure.

BRIEF DESCRIPTION OF THE DRAWINGS

The accompanying drawings illustrate some embodiments and/or aspects of the present disclosure. In such drawings:

FIG. 33 is a diagrammatic view of an embodiment of the pump according to an aspect of the present disclosure;

FIG. 34 is a diagrammatic view of another embodiment of the pump according to an aspect of the present disclosure;

FIG. 35 is a diagrammatic view illustrating operation of de-bouncing logic according to an aspect of the present disclosure;

FIG. 36 is a diagrammatic view of a brew head having a counter bore according to an aspect of the present disclosure;

FIG. 37 is a top plan view of a brew cartridge having a "blown out" lid according to an aspect of the present disclosure;

FIG. 38 is a bottom perspective view of an upper jaw according to an aspect of the present disclosure;

FIG. 39 is a cross-sectional view of the upper jaw generally taken about Line 39-39 in FIG. 38 according to an aspect of the present disclosure;

FIG. 50 is a schematic view of the microcontroller referencing a table according to an aspect of the present disclosure;

FIG. 51 is a perspective view of a water reservoir according to an aspect of the present disclosure;

FIG. 52 is a front perspective view of a passageway for venting heated air out from within the brewer according to an aspect of the present disclosure;

FIG. 53 is a perspective view of a reservoir lid according to an aspect of the present disclosure;

FIG. 55 is a diagrammatic view of an embodiment of the brew head according to an aspect of the present disclosure;

FIG. 62 is a perspective view of one embodiment of the coffee brewer according to an aspect of the present disclosure;

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Overview

Figure 1:
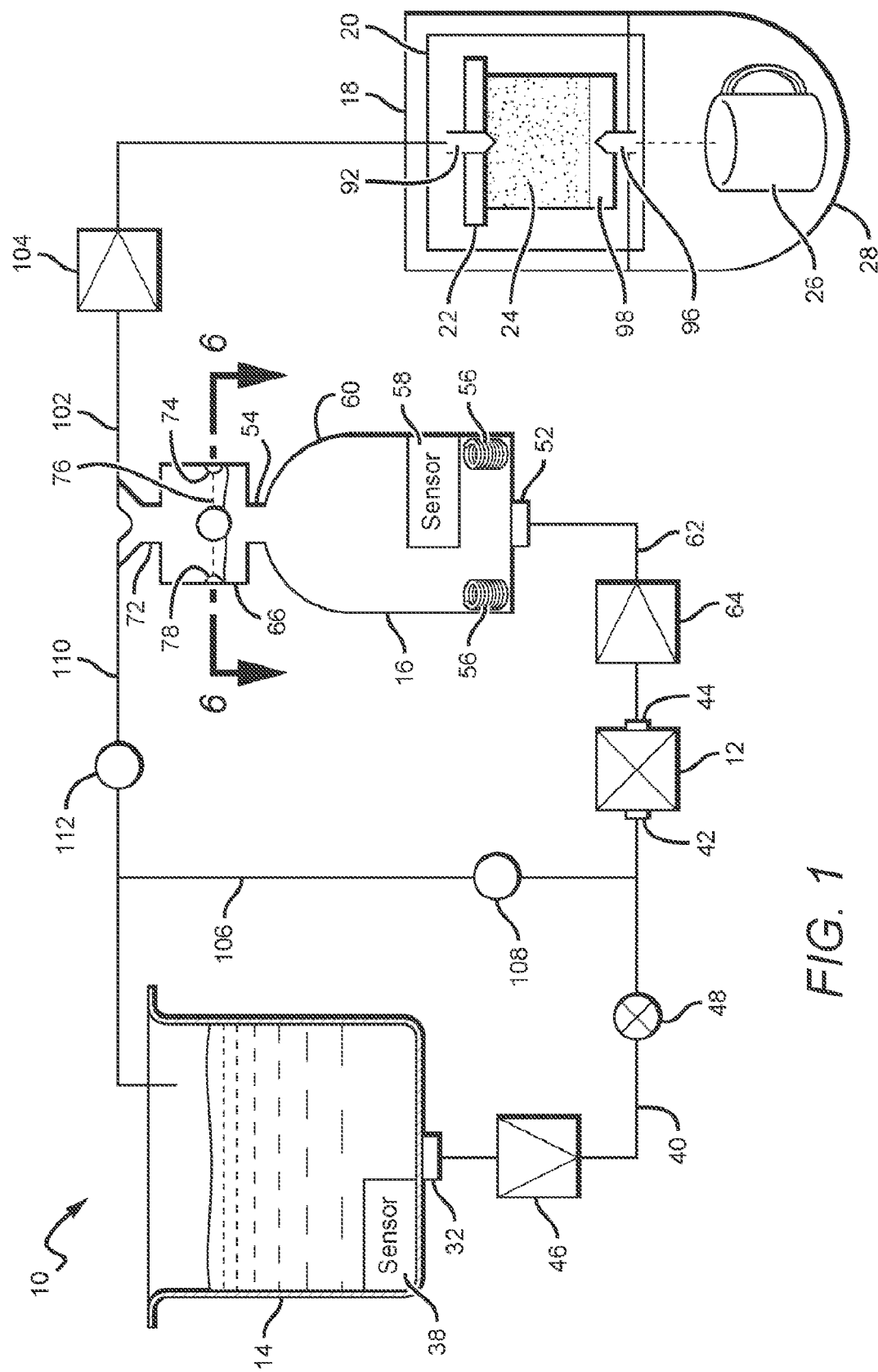
FIG. 1 is a schematic view of one embodiment of a beverage system according to an aspect of the present disclosure.

FIG. 1 is a schematic view of one embodiment of a beverage system according to the present disclosure.

As shown in the drawings for the purposes of illustration, the present disclosure for a beverage system, such as a beverage brewing system, is referred to generally by the reference numeral 10 in FIG. 1, and alternative or additional embodiments of beverage brewer systems in accordance with the present disclosure may be referred to by prime iterations, such as reference numbers 10' and 10" herein.

Although the beverage brewing system may be referred to as reference numeral 10, it should be understood that reference to features in systems 10', 10", etc., will have the same and/or similar structure and/or function as those features described with respect to the system 10.

An aspect of the present disclosure is shown in the drawings for the purposes of illustration, such as a beverage brewing system 10, can generally include a pump 12 that can be configured to pump unheated water from an ambient temperature water reservoir 14 to a heater tank 16, which can heat the water to a desired temperature (referred to herein as a "brewing temperature," although other temperature types—e.g., "mixing temperature," "soup temperature," etc.—are possible, and this term should not be construed as limiting) for eventual delivery to a brew head 18 (referred to herein as a "brew head," although many different types of heads are possible and this term should not be construed as limiting). The brew head 18 can include a receptacle 30 (e.g., a "brew chamber") that can house a cartridge 32 (e.g., a "brew cartridge") containing a single-serve or a multi-serve amount of a beverage medium 78, such as coffee grounds, tea, hot chocolate, lemonade, etc., for producing a beverage dispensed from the brew head 18. The beverage can be dispensed into an underlying container, such as a mug 268 or other similar container (e.g., a carafe) which can be placed on a platen 14, as part of a brew cycle.

More specifically, the reservoir 14 stores ambient temperature water used to brew a cup or multiple cups of beverage (e.g., coffee) in accordance with the embodiments and processes disclosed herein. Embodiments utilizing water at temperatures other than ambient are also possible, such as but not limited to pre-heated water that is hotter than ambient. The reservoir 14 may be top accessible for pour-in reception of water and may include a pivotable or fully removable lid or other closure mechanism that provides a watertight seal for the water in the reservoir 14. The water may exit the reservoir 14 during the brew process via an outlet 131 at the bottom thereof. Although, the water may exit the reservoir 14 from locations other than the bottom, such as the sides or the top such as via a reservoir pickup 34 extending down into the reservoir 14, or other locations as desired or feasible. In one embodiment, the reservoir 14 includes a water level sensor 38 for measuring the volume of water present therein. An optional reservoir closure switch 36, such as a Hall Effect sensor or the like, may detect whether the reservoir 14 is sealed by the lid, and may correspond with the brewer circuitry to prevent initiation of the brew cycle in the event the lid is open. The reservoir 14 may be sized to hold a sufficient quantity of water to brew at least one cup of brewed beverage, e.g., a 6 ounce ("oz.") cup of coffee. The reservoir 14 could be of any size or shape, and may be sized to hold enough water to brew more than 6 oz., such as 8, 10, 12, 14 oz. or more. Of course, the water reservoir 14 could be replaced by other water sources, such as a water main.

The system 10 may employ the water level sensor 38 to determine the level of water in the reservoir 14. The water level sensor 38 may determine when the water level in the reservoir 14 falls below a threshold minimum quantity to complete a brew cycle. For example, if the brewing system 10 is set to brew 10 oz. of coffee, the sensor 38 may prevent the brewer from initiating the brew cycle if the water level sensor 38 determines there is only 8 oz. of water in the reservoir 14. In this respect, the system 10 will not initiate the brew cycle since the sensor 38 indicates the water level is below this threshold value (i.e., the brewer is unable to brew the desired quantity). To start the brew cycle, water would need to be added to the reservoir 14 to exceed the minimum threshold value, or the quantity to be brewed can be reduced. Alternatively and/or additionally, the sensor 38 may be a low water level sensor. Such a sensor 38 may be employed in an embodiment where the brewer is capable of brewing only a single size cup of coffee. Here, the brew cycle would not initiate if the water in the reservoir 14 falls below a minimum predetermined quantity of water (e.g., 6 oz.). The sensor 38 may be of any type, such as a float sensor.

In another embodiment, the brewing system 10 may not include the water level sensor 38. In such an embodiment, the brewing system 10 may automatically initiate and run the brew cycle so long as the reservoir 14 contains water. When the reservoir 14 empties, the brewing system 10 initiates the end of the brew cycle. In such an embodiment, the brewing system 10 may monitor whether the reservoir 14 has water based on readings from the pump 12. The pump 12 may operate under a higher load when pumping water (i.e., when the reservoir 14 contains water) as compared to a lower load when pumping air (i.e., when the reservoir 14 is empty). The brewing system 10 may be able to measure the change from a high or full load to a low or nearly no load state by monitoring changes in current that the pump 12 draws or by taking periodic readings of the current drawn by the pump 12. For example, the pump 12 will draw a higher current when under the higher load of pumping higher density water and a lower current when pumping the lower density air. The brewing system 10 can compare the differences in the current readings to determine if the reservoir 14 is empty. A measurable drop in current (within a standard deviation) signals that the reservoir 14 is empty because the pump 12 is no longer pumping water, but air.

Alternatively, and/or in addition, the brewing system 10 may be able to compare current readings to a look-up table to determine if the brewing system 10 is pumping water or air. The look-up table may be helpful for initially determining whether reservoir 14 has any water to pump. If the initial current reading is in the range normally associated with pumping air, the brewing system 10 may not initiate the brew cycle and. Instead, indicate that the reservoir 14 is empty or needs to be filled. The reservoir 14 may then be filled with some quantity of water before the brew cycle initiates. The brewing system 10 may thus have the ability to selectively brew a specific quantity of beverage based on the amount added to reservoir 14. This may allow a user to manually determine the size of the beverage to be brewed before initiating the brew cycle, and may reduce or eliminate any tracking and/or monitoring of the volume of liquid being brewed.

Other features of the present disclosure may employ other techniques to determine the level of water in reservoir 14. For example, system 10 may monitor or measure the rotational speed (e.g., revolutions per minute ("RPM") of the pump 12. As discussed herein, the pump 12 operates under a higher load when pumping water as compared to a lower load when pumping air. As such, the pump 12 may operate at a lower rotational speed when under a relatively higher load (i.e., when pumping water) as opposed to operating at a higher rotational speed when under a relatively lower load (i.e., when pumping air). The system 10 may compare the readings to determine that the reservoir 14 is empty. A measurable increase in rotational speed (within a standard deviation) may indicate that the reservoir 14 is empty. Such readings in rotational speed may also be compared to a look-up table. If initial rotational speed readings are in the range normally associated with pumping air, the system 10 may not initiate the brew cycle and/or indicate that the reservoir 14 is empty or should be filled with some quantity of water before initiating the brew cycle.

In another embodiment of the present disclosure, the system 10 may include other sensors to identify flow of water (or lack thereof) through the conduits therein, such as through a first brew line or conduit 40, or in conditions where reservoir 14 has (or has no) water. For example, an optical sensor may be able to identify or measure the flow of water through conduit 40 based on the turbulence or other optically sensitive flow characteristics. System 10 could include a magnet on an armature or shaft (e.g., that essentially operates as a Hall Effect sensor) that turns with water throughput. A similar design could be accomplished through use of a magnet and a spring. In each instance, a measured low or no flow condition through the conduit 40 would indicate that the reservoir 14 is low or empty.

Advantageously, in some embodiments of the present disclosure the pump 12 can be used for the dual purpose of pressurizing and/or pumping water (e.g., from the reservoir 14 to the brew cartridge 32) and/or for pressurizing and/or pumping air (e.g., for efficiently purging remaining water or brewed beverage from the system 10, such as near, at, or after the end of the brew cycle). In this respect, the pump 12 can initially pump water from the reservoir 14 through a first conduit 40 to the heater tank 16 where the water can be pre-heated and/or heated to a predetermined brew temperature before delivery to the brew cartridge 32 to brew the beverage medium 78. At, near, or after the end of the brew cycle, the pump 12 pumps pressurized air through the system 10 to purge any remaining water and/or brewed beverage therein to reduce and/or eliminate dripping at the end of the brew cycle. As such, the pump 12 is able to operate in both wet and dry conditions, i.e., the pump 12 can switch between pumping water and air without undue wear and tear. Accordingly, the pump 12 may eliminate the need for a two-pump system, thereby reducing the overall complexity of the brewing system 10, and is advantageous over conventional systems that require one pump for water and a second pump for purging the remaining fluid with air.

Many variables exist within system 10 that may affect the overall performance of system 10. One variable is the water level in the reservoir 14. Another variable may be the heater 82 operation in the heater tank 16. Another variable may be the back pressure from the cartridge 32 that may partially close the check valve 122. Other variables may also exist. Each of these variables may be at least partially accounted for through processor 512 to produce a more consistent performance in system 10.

Within reservoir 14, the pressure at outlet 131 (or if system 10 is coupled to a water main, the pressure of the water main) and against the flow direction of check valve 46 may vary. Although pump 12 can deliver a constant volume of liquid per rotation as described herein, the monitoring of the current draw by pump 12 may not be sufficient to determine the pressure differential across pump 12.

The voltage delivered to pump 12 may be clamped such that the current delivered to operate pump 12 determines the speed and timing of each rotation of pump 12. The number of windings on the stator of pump 12 may vary from pump to pump, and, as such, a calibration for each pump may be made to determine the current drawn by each pump prior to installation in system 10.

The current spikes occur at specific times during the rotation of the rotor of pump 12, i.e., when the electric field within the windings of the stator is interfered with by the magnets or other metallic portions of the rotor. These current spikes may correspond to the movement of the pistons in pump 12, or may be calibrated to determine any delay between the current spikes and the full displacement of one or more of the pistons in pump 12.

Between the current spikes, it may not be necessary to clamp the voltage delivered to pump 12, as the times in between the current spikes are not drawing enough power to overload or otherwise damage pump 12. As such, the voltage across pump 12 may be unclamped and measured. This voltage shows the rest pressure in conduit 40, which is related to the hydrostatic pressure created by the water level in reservoir 14.

In other words, the minimum pressure, or diastolic pressure at inlet 42 of pump 12, created by the water level in reservoir 14 or in any other manner, can be determined by measuring the voltage, current, or other characteristics of pump 12 when pump 12 is at or near the point equidistance from the maximum pump displacement (in one embodiment at the minimum pump displacement), similar to systolic pressure in the heart, at outlet 144 of pump 12. Processor 512 or other similar means may take the measurements into account to change the amount of fluid delivered to heater tank 16, and ultimately to cartridge 32, to produce a more consistent fluid flow within system 10.

In an aspect of the present disclosure, check valve 88 may control the minimum pressure entering heater tank 16, and check valve 122 controls the minimum pressure leaving heater tank 16 to be delivered to nozzle 44 and cartridge 32. However, the actual pressure may be much more than the minimum cracking pressure that check valve 122 will accept. Because this pressure is, other than a minimum value, uncontrolled, additional pressure and/or liquid may be delivered to cartridge 32, causing inconsistent results for system 10.

For example, and not by way of limitation, when a brew cycle starts, check valve 122 has obtained a minimum cracking pressure and fluid flows through nozzle 44 into cartridge 32. If, during the brew cycle, heating element(s) 82 are energized, the pressure in heater tank will rise, thus creating additional pressure through check valve 122. Since this additional pressure may not be controlled by check valve 122, or vented through vent 128, the additional pressure may be delivered through nozzle 44 to cartridge 32. For the next brew cycle, heating element 82 may not be energized (or may be energized less), and thus the additional pressure and/or fluid caused by expansion of water due to the additional heat from heating element(s) 82 will not (or will only to a lesser extent) be delivered to the next cartridge 32. Since the beverage mediums 24 received different pressures, the tastes, temperatures, or other characteristics to be gleaned from the beverage mediums 24 may be different.

To reduce the difference in pressure, the present disclosure may employ processor 512 or other means to monitor current delivered to heating element(s) 82, and adjust the time that fluid is delivered to nozzle 44 accordingly. The present disclosure may also employ processor 512 to monitor the difference in pressure delivered to check valve 122 in other ways, e.g., temperature measurement, pressure measurement at the input to check valve 122, etc., to vary the time fluid is delivered or other aspects of system 10 to obtain more consistent results.

Once pierced by nozzle 44, each cartridge 32 provides resistance to the flow of fluid through cartridge 32 to mug 268. This resistance varies based on, among other things, the beverage medium within cartridge 32. For example, and not by way of limitation, bouillon within cartridge 24 may provide less resistance to fluid flow than ground coffee, because bouillon dissolves in the heated fluid from nozzle 44 while coffee grounds do not.

The pressure drop across the beverage medium 78 can result in back pressure against the outlet of check valve 122. If this back pressure is high enough (e.g., equal to or greater than the difference in pressure between the inlet and outlet of the check valve 122), check valve 122 may close, or cartridge 32 (or filter paper that is internal to cartridge 32) may be "blown out" by the pressure created by the incoming pressure of the heated fluid through nozzle 44.

Because cartridge 32 can only withstand a certain amount of pressure, and to minimize the chance of failure of cartridges 22, processor 512 may monitor the position of check valve 122 (such as through a sensor), and/or there may be a coupling of check valve 122 and vent 132.

In many brewing processes, there are several variables that affect flavor extraction from brewing materials. For example, and not by way of limitation, a brewing machine may heat water for a certain amount of time, called the heating time, and pass water through a brewing material (e.g., coffee) for a certain amount of time called the brewing time. However, if the only variable that is controlled by the brewing machine is time for the heating time and brewing time, the brewing machine likely does not take into account the ambient or prior temperature of the water, the hardness or other minerals present in the water, the amount of water in the machine, and/or the pressure that the water is being delivered at, among other things. Further, during the brew cycle, a simple timer likely does not take into account the amount, grind, and/or density of beverage medium, and/or actual temperature of the water as the water passes through the brewing material.

As such, a device or system in accordance with the present disclosure may take several variables into account for brewing different materials in different ways. Further, a device or system in accordance with the present disclosure may take into account one or more variables that may change during and/or between brewing cycles.

A brewing cycle may comprise, for example, several different periods of time. The conditions of the water, brewing material, and/or brewing machine may be determined, approximated, measured, interpolated, extrapolated, or otherwise taken into account prior to a request for brewing by a consumer or user. For example, and not by way of limitation, the temperature of the water in a reservoir, heater tank, or other area may be measured to determine how long a heating element should be energized to heat the water to a desired temperature, etc. Such initial conditions of the water, brewing material, system parameters, and other conditions prior to delivery of the water to the brewing material may be referred to as the "pre-brewing period" of a brew cycle herein.

Another period within the brewing cycle may be referred to as the "brew period" of the brew cycle. The brew period is the time during the brew cycle that water is delivered to the brewing material. As with the pre-brewing period, conditions of the water, brewing materials, system parameters, and other conditions during delivery of the water to the brewing materials may be monitored, measured, or otherwise inferred or determined to more precisely control the conditions for brewing during the brew period. For example, and not by way of limitation, the water temperature may be measured and/or controlled after being heated to provide a consistent water temperature to the brewing material, etc.

Another period during the brew cycle may be referred to as the "purge period." The purge period may be employed to remove water or other materials from the brewing device. For example, and not by way of limitation, the brewing machine may change the flow of water within the brewing device to stop delivery of the heated water to the brewing material and pump air through the tubing, pumps, and other pipes inside the brewing machine to reduce or eliminate dripping from the machine after the desired beverage has been brewed.

A brewing device in accordance with the present disclosure can determine, measure, infer, or otherwise determine one or more conditions of one or more of the brewing variables, e.g., water temperature, pressure, backpressure, amount or type of brewing material, time, time of water delivery, amount of water delivery, amount of water delivery at temperature, purge time, pre-existing conditions, and/or other characteristics that may control brewing performance for one or more brewing materials used in the brewing machine.

Figure 2:
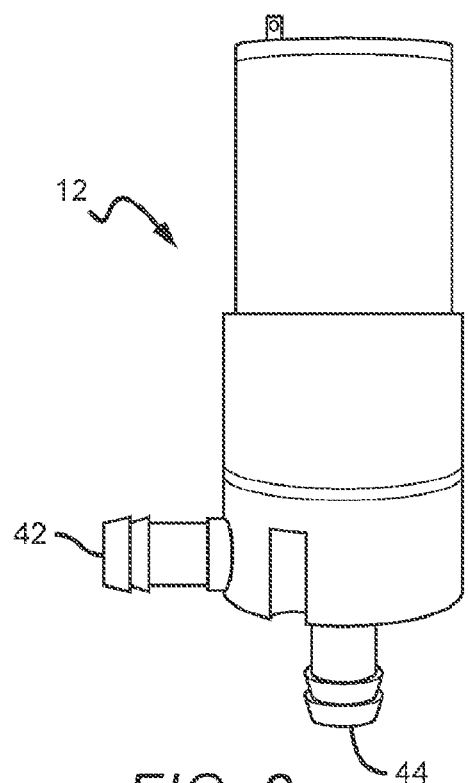
FIG. 2 is a perspective view of a pump for use with a beverage system according to an aspect of the present disclosure.

FIG. 2 is a perspective view of a pump for use with a beverage system according to the present disclosure.

More specifically, FIG. 2 illustrates one embodiment of the pump 12 for use with the brewing system 10. The pump 12 includes an inlet 42 for receiving a quantity of fluid and an outlet 144 for discharging pressurized fluid therefrom. The pump 12 may be a positive displacement pump such as a tri-chamber diaphragm pump or other diaphragm pump. Alternatively, the pump 12 may be a non-positive displacement pump such as a centrifugal pump. The pump 12 can alternate between pumping air and/or water and carries an operational lifespan commensurate in scope with the normal operating lifespan of conventional beverage brewers.

The first conduit 40 fluidly couples the reservoir 14 to the pump 12. In one embodiment the first conduit 40 may carry water from the reservoir 14, through a first check valve 46 and an optional flow meter 48 to the pump inlet 42. The first check valve 46 may be a one-way check valve that only permits forward flow from the reservoir 14 to the pump 12 when in a first position, and otherwise prevents fluid from flowing in the reverse direction (i.e., backwards) back toward the reservoir 14 when in a second position. Moreover, the first check valve 46 has a positive cracking pressure (i.e., a positive forward threshold pressure needed to open the valve). As such, the first check valve 46 is generally biased in a closed position unless the positive forward flow (e.g., induced by the pump 12) exceeds the cracking pressure. For example, the first check valve 46 may have a cracking pressure of 2 pounds per square inch ("psi"). Thus, the pressure pulling fluid through the first conduit 40 must exceed 2 psi to open the first check valve 46 for fluid to flow there through. In this respect, water from the reservoir 14 will not flow past the first check valve 46 unless the pump 12 pressurizes the first conduit 40 to at least 2 psi. The cracking pressure may vary depending on the specific pump and/or other components used.

The beverage brewing system 10 may include the flow meter 48 disposed between the first check valve 46 and the pump 12 for measuring the volume of water pumped from the water reservoir 14 to the heater tank 16. In one aspect, the flow meter 48 may measure the quantity of water used to initially fill the heater tank 16. Additionally or alternatively, once the heater tank 16 is full, the flow meter 48 may measure the quantity of water delivered to the brew cartridge 32 in real-time during a brew cycle. This information may allow the system 10 to set and track the amount of beverage to be brewed during the brew cycle. Thus, a user is able to select the desired quantity of beverage to brew (e.g., 6, 8, 10, 12 oz. or more) for any one brew cycle. In essence, the flow meter 48 ensures that the pump 12 displaces the correct amount of water (i.e., the desired serving size) from the reservoir 14 to the brew cartridge 32. The flow meter 48 may be a Hall Effect sensor, but may be any type of flow meter without departing from the scope of the present disclosure. Alternately, the flow meter 48 may be positioned on the outlet side of the pump 12.

In alternate embodiments, the beverage brewing system 10 may use the pump 12 to determine the volume of water transferred from the reservoir 14 to the heater tank 16 and/or the brew cartridge 32, thus eliminating the flow meter 48. The system 10 may monitor the rotational speed of the pump 12 by way of electrical signal feedback to a processor 50, or other devices in system 10, to determine the speed (e.g., in revolutions-per-minute, or "rpm") at which the pump 12 is operating. This is similar to the use of a tachometer. In this respect, the system 10 can determine the rotational speed of the pump 12 based on, e.g., the amount of current the pump 12 draws. Each revolution of a positive displacement pump causes a predetermined quantity of fluid to pass there through. So, if the pump 12 is a tri-chamber diaphragm pump, the system 10, which may employ processor 512, can know that each revolution of the pump 12 displaces three times the amount of fluid that fills each diaphragm. Put another way, a ⅓ revolution would displace an amount of fluid equal to volume of the cavity of one diaphragm. In this manner, by monitoring the rotational speed of the pump 12, the beverage brewing system 10 can determine the total volume of water displaced through the pump 12 based on the pump runtime (e.g., fluid quantity=pump rate*fluid volume/revolution*time). For example, if the pump 12 runs for 1 minute at 500 rpm and each revolution displaces 0.02 ounces of fluid, the beverage brewing system 10 may determine therefrom that the pump 12 pumped a total of 10 ounces of fluid (e.g., water during a brew cycle). In another similar embodiment, current spikes can be monitored. Each pump current spike can be correlated to an amount of water displaced (e.g., the volume of liquid in one diaphragm), and thus the total volume displacement (and thus flowrate) can be calculated. The pump speed, runtime, and displacement may vary depending on the type and size of pump selected and depending on the type of the beverage brewing system 10. The above is just one example of many different combinations that may be utilized with the system 10 disclosed herein.

The heater tank 16 is designed to heat the ambient temperature water pumped from the reservoir 14 to a temperature sufficient for brewing coffee (e.g., 192° Fahrenheit). More specifically, the heater tank 16 includes an inlet 52 for receiving an inflow of unheated water, an outlet 54 for discharging heated water, and a heating element 56 for heating the water for eventual use to brew the coffee grounds 24 in the brew cartridge 22. The inlet 52 and the heating element 56 are disposed substantially at the bottom of the heater tank 16 as shown in FIGS. 1, 3, 16 and 17. The water heated by the heating element 56 rises because it is less dense than the cooler water (e.g., room temperature) displaced from the reservoir 14. This ensures constant heating of the coolest water in the tank 16. Even if the inlet 52 were placed at the top of the tank 16, ambient temperature water from the reservoir 14 may flow directly over or past one or more of the heating elements 56, to ensure proper heating. For example, in an embodiment where the inlet 52 is at the top of the heater tank 16, a first heating element (not shown) may be placed near the entrance to pre-heat water entering the tank 16, while the heating element 56 may be placed at the bottom thereof to ensure continued heating. The heating element 56 may be a series of electrically resistive coils, but may be any type of heating element known in the art. The outlet 54 may be disposed at the top of the heater tank 16 to ensure that water will only exit the heater tank 16 if it is under sufficient pressure to counteract gravity (i.e., flow upward). That is, gravity will not cause the residual water in the coffee brewing system 10 to flow through the outlet 54 to the brew head 18 and drip therefrom after the brew cycle is complete. As such, the coffee brewing system 10 disclosed herein is advantageous over conventional systems that have the heater tank outlet located at the bottom thereof. Although, in an alternative embodiment, any of the systems 10, 10', 10", 10''',10'''' disclosed herein.

The heater tank 16 further includes a temperature sensor 58 such as a thermistor for measuring the temperature of the water in the heater tank 16. Alternately, the temperature sensor 58 may be a ceramic or polyester thermostat or any other suitable temperature sensor known in the art. The temperature sensor 58 helps the coffee brewing system 10 maintain the appropriate brewing temperature (e.g., 192° Fahrenheit) in the heater tank 16. The temperature sensor 58 may also help the system 10 set the desired brew temperature in the event the brew temperature is manually or automatically adjustable.

Figure 4:
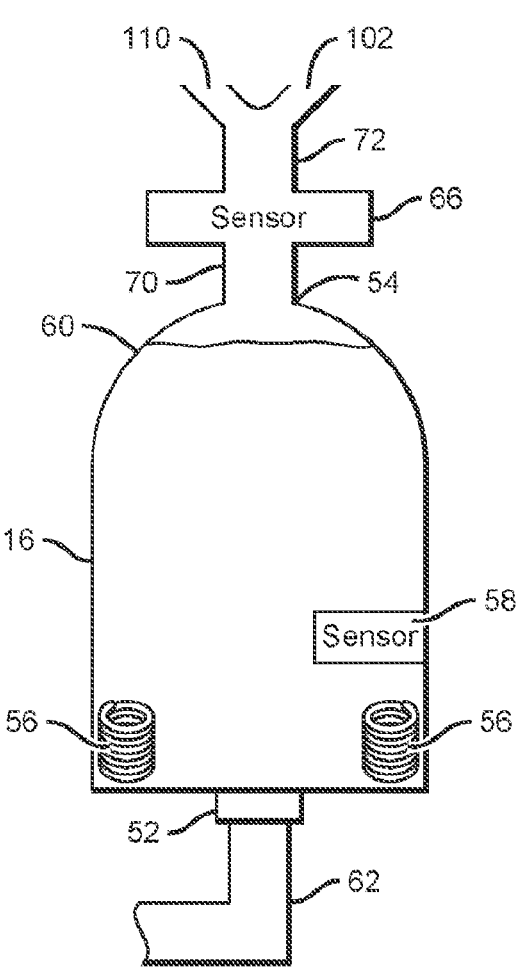
FIG. 4 is an enlarged schematic view of the heater tank according to an aspect of the present disclosure.

In one embodiment shown in FIG. 4, the heater tank 16 may include a rounded or dome-shaped nose 60 with the heater tank outlet 54 concentrically extending therefrom. This way, the geometry of the dome-shaped nose 60 helps prevent fluid in the heater tank 16 from collecting in corners or other pockets and, instead, facilitates flow of fluid out through the heater tank outlet 54. The heater tank 16 may be large enough to hold enough water to brew the largest serving size (e.g., 16 oz.), but may be any shape or size known in the art.

As shown in FIGS. 1, 3, 16 and 17, fluid displaced by the pump 12 travels through a second brew line or conduit 62 fluidly coupling the pump outlet 44 to the bottom of the heater tank 16 at the inlet 52. A second check valve 64 (FIGS. 1 and 3) is disposed between the pump 12 and the inlet 52 in series with the second conduit 62 to prevent heated water in the heater tank 16 from flowing back toward the pump 12. The second check valve 64 may be a one-way check valve having a positive cracking pressure (e.g., 2 psi) similar to the first check valve 46. As such, fluid cannot flow to the heater tank 16 unless it exceeds the cracking pressure of the second check valve 64. Of course, the second check valve 64 may have different specifications than the first check valve 46, including a different cracking pressure.

Figure 5:
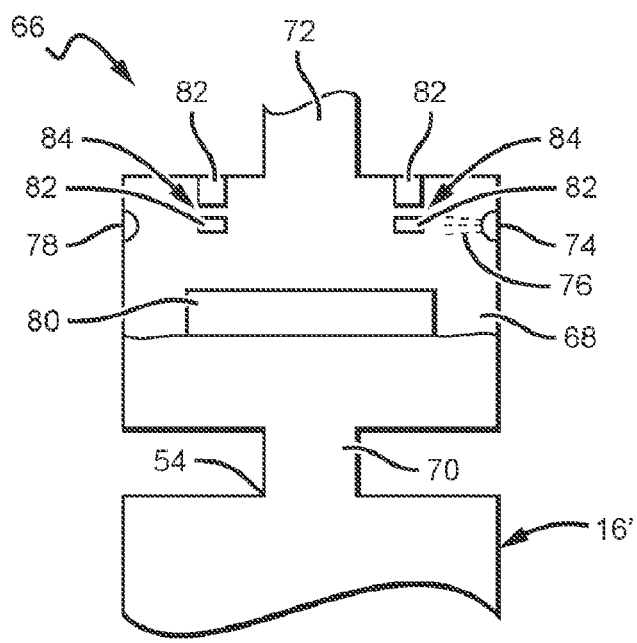
FIG. 5 is a cross-sectional view of one embodiment of a heater tank water level sensor taken generally about the line 5-5 in FIG. 3 according to an aspect of the present disclosure.

Additionally, the coffee brewing system 10 may include a heater tank level sensor 66 for determining the level of water in the heater tank 16. In one embodiment, as illustrated in FIG. 5, the sensor 66 includes a substantially cylindrical cavity 68 having an inlet pickup 70 on one side that extends down into the heater tank outlet 54 and an outlet 72 on the other side, as described in more detail below. The inlet pickup 70 may be coupled to or formed from the dome-shaped nose 60, as shown in FIG. 4. That is, the inlet pickup 70 may not necessarily extend down into the top of the heater tank 16 or 16', but rather be formed from the general shape of the heater tank 16 or 16'. The sensor 66 may include an emitter 74 disposed on one side of the cavity 68 for emitting a light beam 76 across the cavity interior for reception by a photoreceptor 78 disposed opposite thereof. The emitter 74 and the photoreceptor 78 may be disposed within the cavity 68 as shown in FIG. 5 or external the cavity 68, so long as the light beam 76 can be transmitted therebetween. In the embodiment shown in FIG. 5, the emitter 74 and the photoreceptor 78 are disposed on the vertical sides of the sensor housing, while the inlet pickup 70 and the outlet 72 extend from the bottom and top portions of the sensor 66, respectively.

Figure 21:
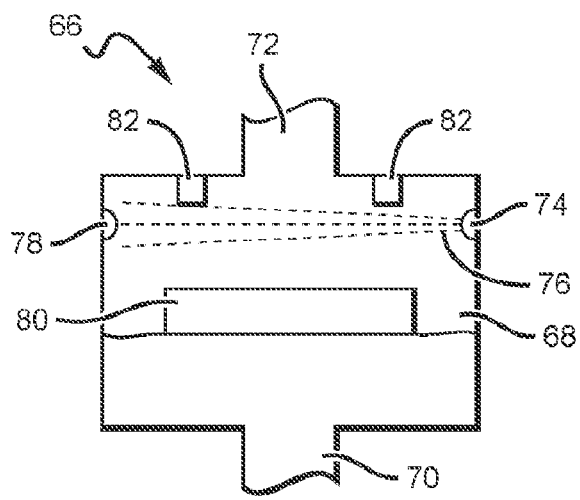
FIG. 21 is a cross-sectional view of the heater tank water level sensor similar to FIG. 5 according to an aspect of the present disclosure.
Figure 22:
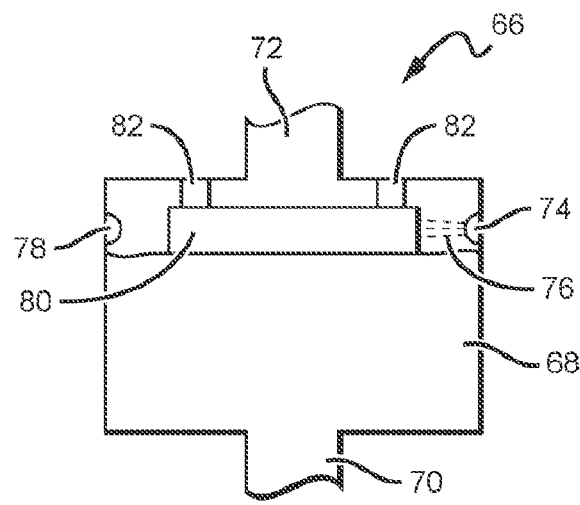
FIG. 22 is a cross-sectional view of the heater tank water level sensor similar to FIG. 21 according to an aspect of the present disclosure.

Heated water from the heater tank 16 enters the sensor 66 via the inlet pickup 70 and pushes a float 80 disposed therein upward as the tank 16 fills with water. In one embodiment (FIGS. 5 and 21-22), the float 80 generally has a disk-like shape and floats on top of the water entering the cavity 68. The buoyancy of the float 80 allows it to rise with the water level in the cavity 68 as water exits the heater tank 16 and fills the interior of the sensor 66. The float 80 eventually contacts one or more downwardly-extending legs 82 that prevent the float 80 from completely occluding or sealing the sensor outlet 72. At this point (e.g., as shown in FIG. 22), the float 80 is disposed between the emitter 74 and the photoreceptor 78, thereby occluding the photoreceptor 78 from receiving the light beam 76 from the emitter 74. The photoreceptor 78 may relay a signal to the microcontroller 50 (FIG. 18) indicating that the heater tank 16 is full because the light beam 76 is no longer being sensed by the photoreceptor 78. The downwardly extending legs 82 may include one or more passageways 84 (FIG. 5) therebetween that permit water in the heater tank 16 to bypass the float 80 and flow out through the outlet 72 during the brew cycle. Of course, the heater tank level sensor 66 can work with either the heater tank 16 or 16'.

Figure 6:
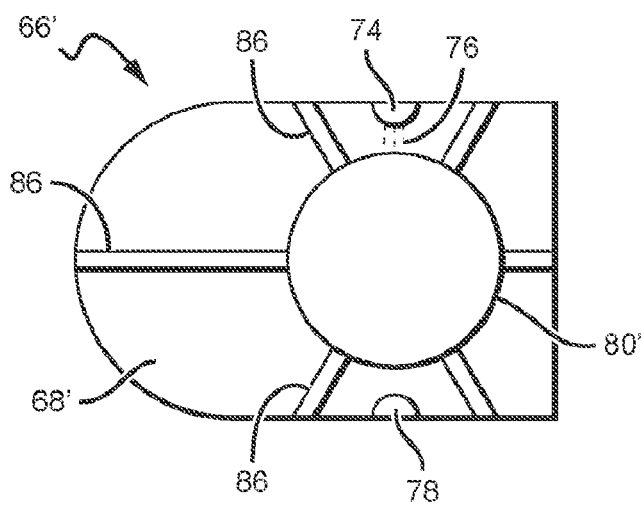
FIG. 6 is a cross-sectional view of an alternative embodiment of a heater tank water level sensor taken generally about the line 6-6 in FIG. 1 according to an aspect of the present disclosure.

In an alternative embodiment illustrated in FIG. 6, the system 10 may include a heater tank level sensor 66' having a D-shaped cavity 68' with a spherical float 80' disposed therein. In this embodiment, a set of projections 86 selectively horizontally position the float 80' within the D-shaped cavity 68' for eventual alignment or positioning between the emitter 74 and the photoreceptor 78 while simultaneously allowing or permitting substantial laminar flow of fluid through the cavity 66' during a brew cycle, and after the heater tank 16 is full. The projections 86 may be formed from a portion of the interior sidewalls of the cavity 68' and extend inwardly thereof, or the projections 86 may be formed from or extend out from the spherical float 80' and slide relative to the interior sidewalls of the cavity 68'. In either embodiment, the projections 86 may be relatively vertically longer than wide to minimize disruption of vertical fluid flow through the cavity 66' and to minimize the vertical surface area contact between the projections 86 and either the spherical float 80' or the interior sidewalls of the cavity 68', to allow the spherical float 80' to vertically move within the cavity 66'.

As mentioned above, the system 10 pumps enough water from the reservoir 14 to fill the heater tank 16 and the inlet pickup 70. At least initially, when no water is in the cavity 68', the spherical float 80' resides at or near the bottom thereof. As the pump 12 continues to move water into the now full heater tank 16, the water level rises in the cavity 68', thereby causing the spherical float 80' to rise with the water level. As mentioned above, the projections 86 bias the spherical float 80' so the body of the float 80' remains in substantially the same general horizontal position shown in FIG. 6. This enables the spherical float 80' to eventually interrupt transmission of the light beam 76 from the emitter 74 to the photoreceptor 78, thereby signaling that the heater tank 16 is full. The projections 86 basically constrain the horizontal position of the spherical float 80', while permitting the float 80' to move vertically as the water level in the cavity 66' changes. As illustrated in FIG. 6, the float 80' includes six of the projections 86, but the float 80' may have more or less of the projections 86 as may be desired or needed.

The heater tank level sensor 66' operates in generally the same manner as described above with respect to the heater tank level sensor 66. As water fills the cavity 68', the float 80' rises to the top thereof, thereby occluding the photoreceptor 78 from receiving the light beam 76 emitted by the emitter 74. As shown in FIG. 6, the spherical float 80' only occupies a portion of the D-shaped cavity 68' so there is sufficient room for fluid to flow around the float 80' and the projections 86, thereby supplanting any need for the legs 82 or the passageways 84.

Figure 7:
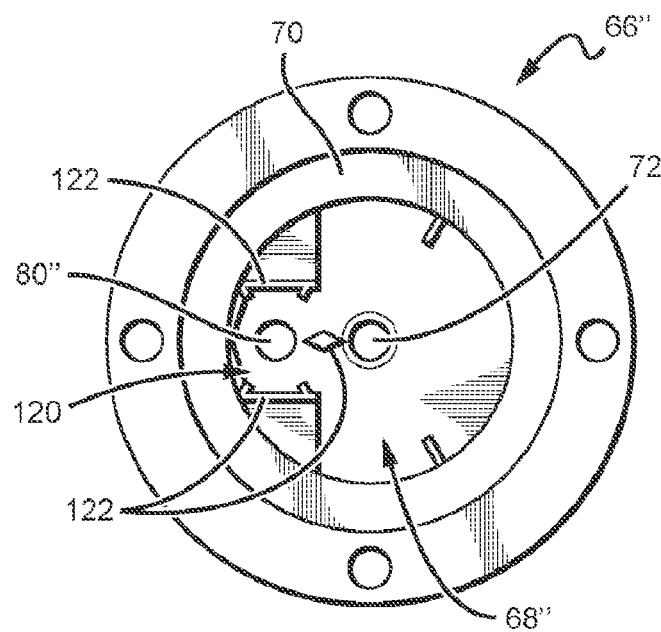
FIG. 7 is a bottom view of another alternative embodiment of the heater tank water level sensor according to an aspect of the present disclosure.
Figure 8:
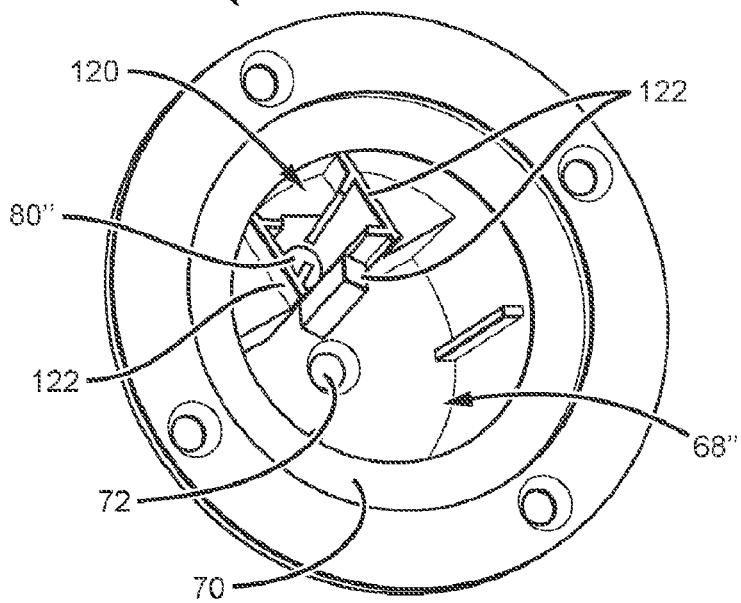
FIG. 8 is a bottom perspective view of the embodiment of the heater tank water level sensor shown in FIG. 7.

FIGS. 7 and 8 illustrate another embodiment of a heater tank level sensor 66" wherein the cavity is split or partitioned into a first or main partition cavity 68" adjacent to a second float partition 120 that retains a spherical float 80" therein. One or more partition walls 122 define the float partition 120 next to the cavity 68" and horizontally confine the float 80' therein for eventual alignment or positioning between the emitter 74 and the photoreceptor 78 while simultaneously permitting substantial laminar flow of fluid through the cavity 68" as a result of being offset from the central axis of the sensor outlet 72. That is, the partition walls 122 retain the spherical float 80" in substantially the same general horizontal position while still permitting the float 80" to move vertically as the water level in the cavity 68" changes during a brew cycle. Of course, the partition walls 122 are configured to permit water to flow into and out from the float partition 120 to raise and lower the float 80" depending on the water level in the heater tank 16 and/or the heater tank water level sensor 66". As specifically illustrated in FIG. 7, the float partition 120 includes three walls of the walls 122 offset form the relatively larger partitioned cavity 68". Although, a person of ordinary skill in the art will readily recognize that a different quantity of the walls 122 could be used as long as the float 80" could operate the sensor 66" as disclosed herein. Additionally, the partitioned cavity 68" is generally open and somewhat D-shaped as described above with respect to FIG. 6, but a person of ordinary skill in the art will also readily recognize that the partitioned cavity 68" could be any shape known in the art (e.g., rectangular, square, etc. etc.). The central axis aligning the sensor outlet 72 and the inlet pickup 70 (not shown in FIG. 7) may be generally free from obstruction to encourage laminar flow of fluid through the heater tank water level sensor 66". In this respect, FIG. 8 illustrates an alternative view of the size and positioning of the partitioned cavity 68" relative to the float partition 120 formed by the partition walls 122.

The heater tank level sensor 66" operates in generally the same manner as described above with respect to the heater tank level sensors 66, 66'. As water fills the cavity 68", the float 80" rises to the top thereof, thereby occluding the photoreceptor 78 from receiving the light beam 76 emitted by the emitter 74. As shown in FIG. 8, the spherical float 80" occupies a relatively small portion of the sensor 66" relative to the partitioned cavity 68" and is disposed horizontally away (i.e., not coaxial with) from the sensor outlet 72, thereby providing an unobstructed path between the inlet pickup 70 and the sensor outlet 72.

The heater tank sensors 66, 66', 66" act as a binary switch to turn the pump 12 "on" and/or "off" depending on the fill state of the heater tank 16. Accordingly, the photoreceptor 78 is either in a state where it is receiving or sensing the light beam 76 from the emitter 74 (i.e., an "unfilled" state), or the photoreceptor 78 is not receiving or sensing the light beam 76, thereby indicating the heater tank 16 is in a "filled" or "full" state. In this respect, the sensors 66, 66', 66" do not sample the degree or level of occlusion. Rather, the sensors 66, 66', 66" operate more akin to a light switch with distinct "on" and "off" conditions.

Figure 9:
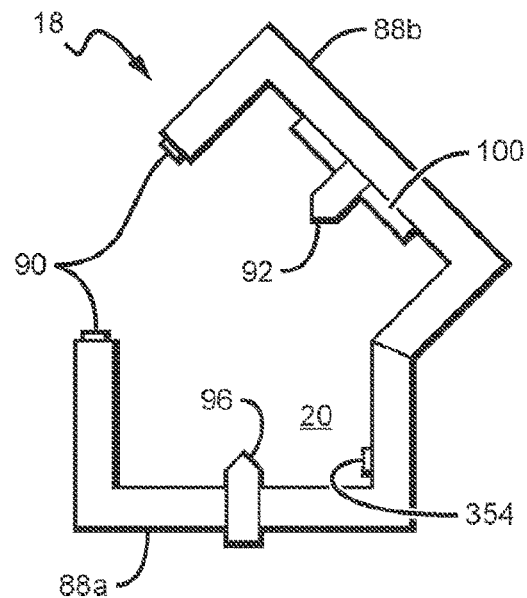
FIG. 9 is a diagrammatic view of a brew head according to an aspect of the present disclosure.

As briefly mentioned above, the coffee brewing system 10 includes the brew head 18 having the brew chamber 20 that holds or retains the brew cartridge 22 containing a sufficient amount of the coffee grounds 24 to brew a cup of coffee or several cups of coffee (e.g., 10 oz.) during a brew cycle. More specifically as illustrated in FIG. 9, the brew head 18 includes a pair of jaws 88, including a lower jaw 88a that may be fixed relative to a moveable upper jaw 88b. Although, of course, the lower and upper jaws 88a, 88b may both be movable or the lower jaw 88a may be movable relative to a stationary upper jaw 88b. Together, the lower and upper jaws 88a, 88b cooperate to define the brew chamber 20 therebetween.

The brew head 18 may include an activation sensor or switch 90 that monitors the positioning of the upper jaw 88a relative to the lower jaw 88b. That is, when the lower and upper jaws 88a, 88b are in the closed position, both sides of the switch 90 are in contact and the system 10 identifies the jaws 88 being in a closed position. Alternatively, opening the jaws 88 causes opposite ends of the activation switch 90 to lose contact such that the system 10 now identifies the jaws 88 as being in an open position. When in the open position shown in FIG. 9, the system 10 may refuse to initiate the brew cycle or cease the brew cycle in the event the upper jaw 88b moves to the open position shown in FIG. 9 during the brew cycle. This may be an important safety feature so the brewer does not activate while the brew chamber 20 is exposed.

Figure 10:
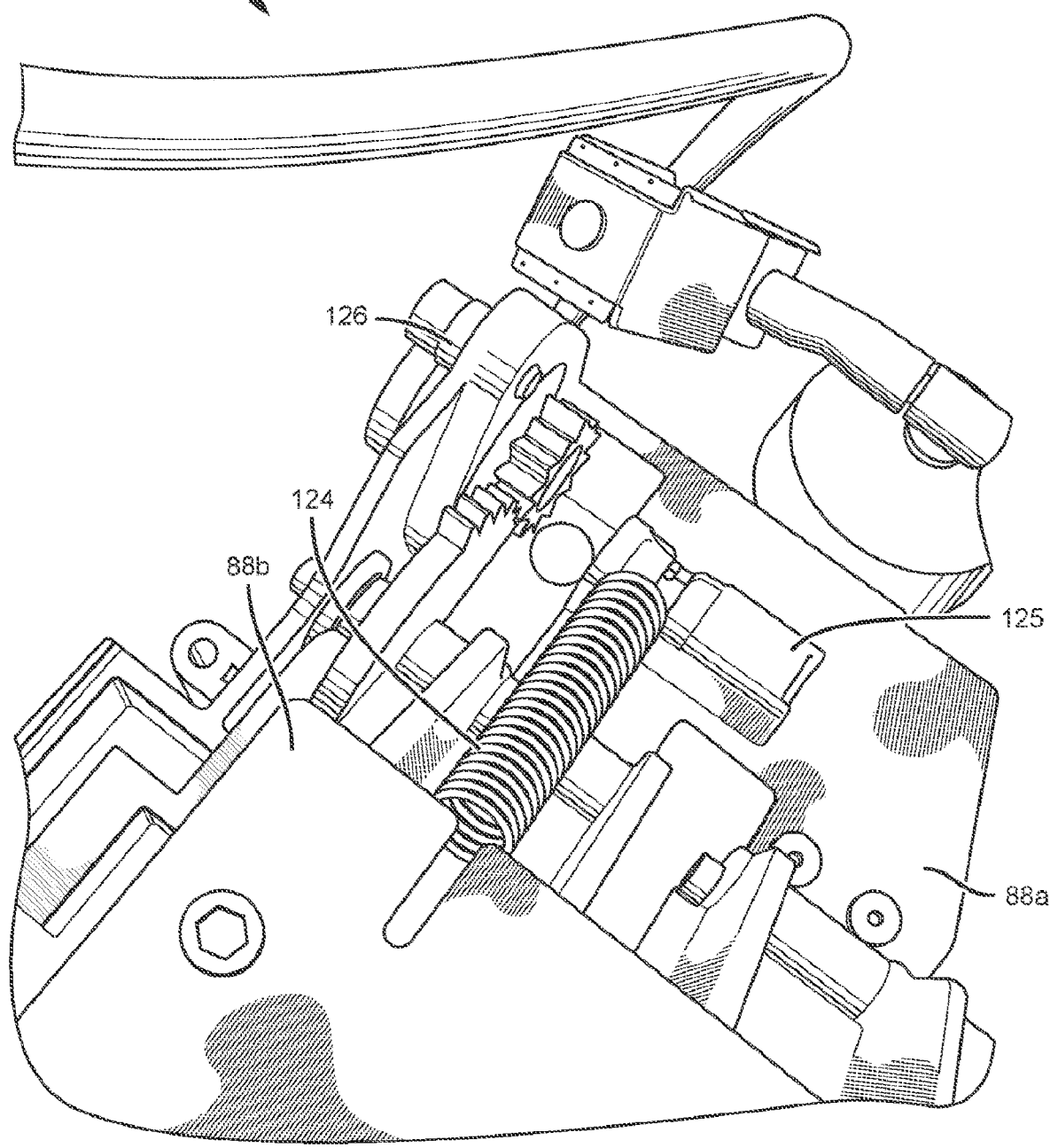
FIG. 10 is a perspective view of an embodiment of the brew head according to an aspect of the present disclosure.
Figure 11:
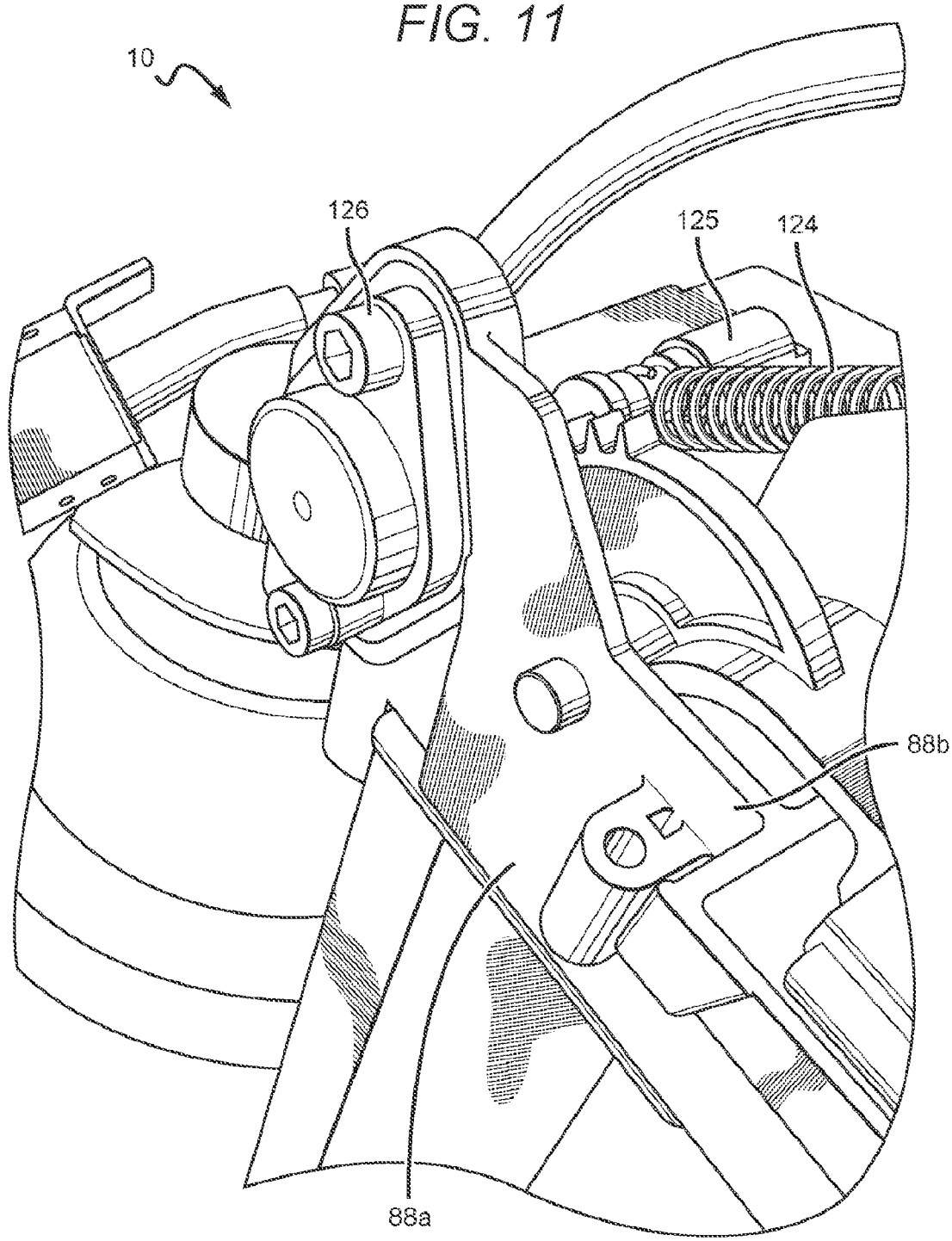
FIG. 11 is an alternate perspective view of the embodiment of the brew head according to an aspect of the present disclosure.

As illustrated in FIGS. 10 and 11, the brew head 18 further includes a tension spring 124 extending between the moveable upper jaw 88b down to a mount 125 formed from a portion of the brew head 18. The spring acts to pull or bias open the upper law 88b (when released as discussed in more detail below) to an open position. In this respect, the spring 124 acts to pull the upper jaw 88b away from the lower jaw 88a about a pivot formed at the back of the brew head 18. In the open position, the brew chamber 20 is accessible. The tension spring 124 is shown in FIGS. 10 and 11 connected to the mount 125, but it may extend between or connect to a stationary portion of the brew head 18 and a movable portion of the upper jaw 88b to facilitate selected pivotable opening of the upper jaw 88b relative to the lower jaw 88a to provide access to the brew chamber 20.

FIGS. 10 and 11 also illustrate the brew head 18 including a rotary dampener 126 to soften the opening and/or closing of the upper law 88b. The rotary dampener 126 may at least counteracts or dampens the tensioned opening force of the tension spring 124, thereby smoothing the opening speed so the upper jaw 88b does not snap or pop open too quickly. In this respect, resistance created by the rotary dampener 126 slows the release of compression energy from the tension spring 124. This results in a smoother opening motion. Alternatively or in addition to, the rotary dampener 126 may provide a positive closing force that reduces the amount of energy needed to pivot the upper jaw 88b back to the closed position. That is, the rotary dampener 126 may help overcome the separating force generated by tension spring 124 when closing the upper jaw 88b. The rotary dampener 126 may be a one-way rotary dampener, which only provides resistance and dampening force when opening the brew chamber 20. Although, the rotary dampener 126 may be two-way rotary dampener, i.e., the rotary dampener 126 provides resistance and dampening when opening and closing the brew chamber 20.

Figure 12:
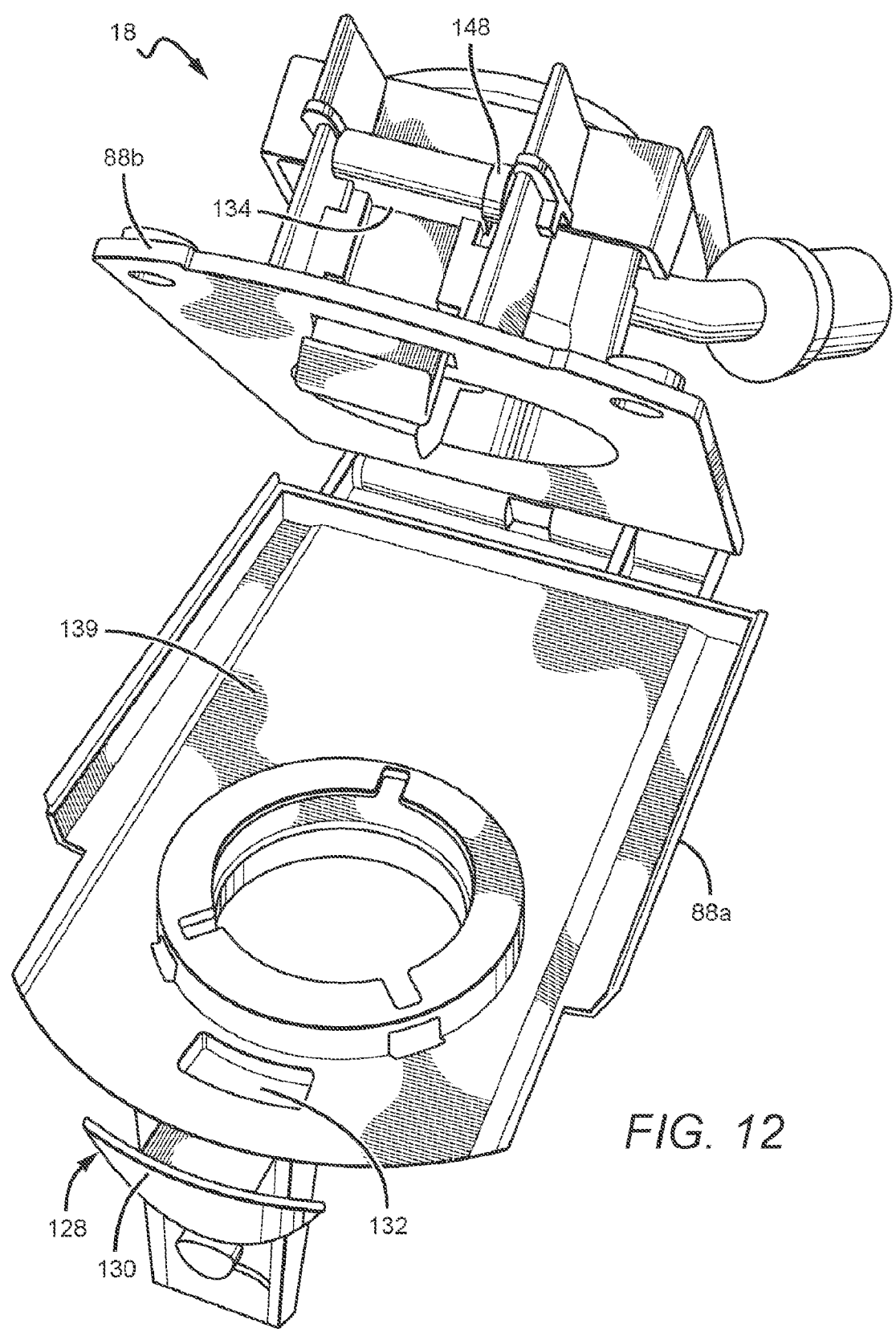
FIG. 12 is a perspective view of one embodiment of the brew head according to an aspect of the present disclosure.
Figure 13:
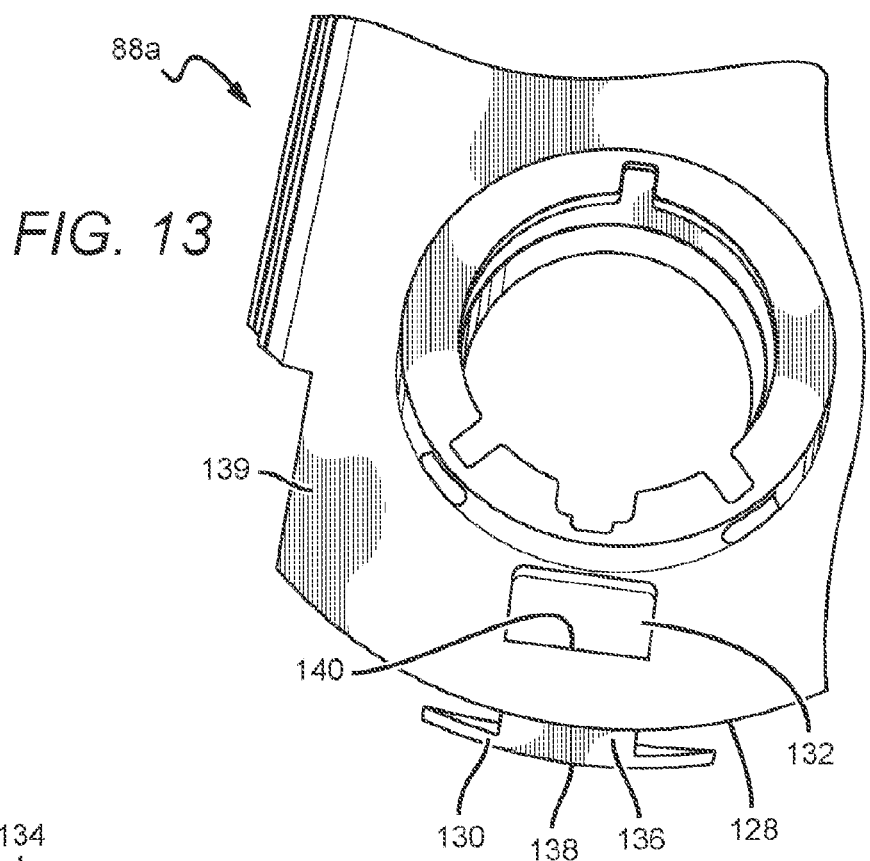
FIG. 13 is top perspective view of one embodiment of a lower jaw according to an aspect of the present disclosure.
Figure 14:
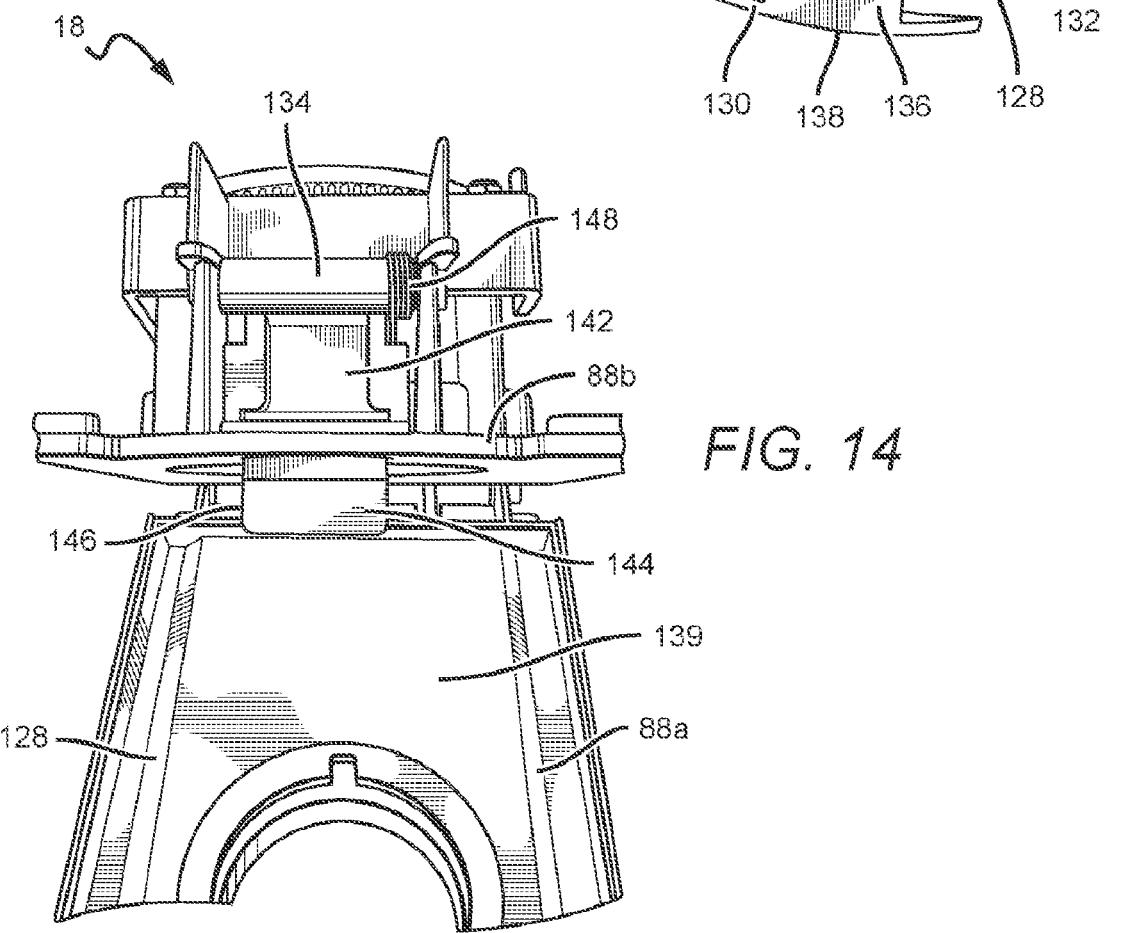
FIG. 14 is front perspective view of one embodiment of a upper jaw according to an aspect of the present disclosure.

As illustrated in FIGS. 12-14, the brew head 18 further includes a jaw lock 128 that facilitates selected release of the upper jaw 88b from the lower jaw 88a, to permit pivotal movement of the upper jaw 88b to the open position by the tension spring 124, as discussed above. More specifically, the jaw lock 128 may include a forwardly and externally accessible release button 130 protruding from a portion of the brew head 18 and configured for hand manipulation. When depressed, the release button 130 selectively slides horizontally into the body of the brew head 18 and into a jaw clip passageway 132 disposed in the lower jaw 88a. In general, movement of the body of the release button 130 into the jaw clip passageway 132 engages a jaw clip 134 pivotably mounted to the upper jaw 88b; pivotable movement of the jaw clip 134 disengages the upper jaw 88b from the jaw lock 128. More specifically, the release button 130 includes a release button shaft 136 extending into the lower jaw 88a and away from an externally accessible fingertip-actuated touch surface 138. The release button 130 is biased in the outward direction (i.e., the non-depressed position), such as by a spring (not shown) or the like. The jaw clip passageway 132 is an aperture generally formed downwardly from a top surface 139 of the lower jaw 88a and into a wider cavity 140 underneath. The release button shaft 136 slides or extends into the cavity 140 and is disposed generally perpendicular to the central axis of the jaw clip passageway 132, thus positioning the release button 130 generally below the jaw clip passageway 132. The jaw clip 134 includes a jaw clip shaft 142 having a boss 144 disposed on a lower end and extending perpendicularly therefrom. The boss 144 further includes a downward facing chamfer 146 (i.e., the top of the boss 144 may be thicker than the bottom) for guiding the jaw clip 134 into the jaw clip passageway 132. When the brew chamber 20 is closed, the jaw clip 134 extends through the jaw clip passageway 132 and into the cavity 140. A torsion spring 148 biases the jaw clip 134 in a forward position (i.e., the jaw clip 134 is pivoted toward the touch surface 138), thereby pushing the boss 144 forward into the cavity 140 and underneath the top surface 139 of the lower law 88a and in the shaft 136. In this respect, the contact between the lower jaw 88a and the boss 144 holds the jaws 88a, 88b closed.

To open the brew chamber 20, the user depresses the touch surface 138, thereby causing release button shaft 136 to slide horizontally into the cavity 140 and into contact with the boss chamber 146 therein. This horizontal sliding force pivots the boss 144 against the forward force of the torsion spring 148 and out from engagement with the jaw clip passageway 132. In this respect, the release button shaft 136 effectively rotates the jaw clip 134 to a position where the boss 144 is disposed entirely within the jaw clip passageway 132. Accordingly, since no surface is present above the boss 144, the spring 124 causes the upper jaw 88b to pivot away from engagement with the lower jaw 88a, at the resistance of the rotary dampener 126, thereby opening the brew chamber 20. Closing the brew chamber 20 is just a matter of pivoting the upper jaw 88b downwardly (overcoming the opening force of the brew head spring 124) until the jaw clip 134 re-engages the cavity 140. Specifically, as mentioned above, the torsion spring 144 biases the jaw clip 134 forward and toward the general position of the release button 130. The boss 144 contacts the lower jaw 88a when the upper jaw 88b is pushed or pivoted downwardly. The chamfer 146 on the boss 144 allows the jaw clip 134 to slide into the jaw clip passageway 132. That is, the chamfer 146 provides an angled sliding surface that allows the jaw clip 134 to gradually pivot away from the release button 130 so the boss 144, which would otherwise be blocked by the top surface 139 of the lower jaw 88a, can travel through the jaw clip passageway 132 and into the cavity 140. In this respect, once the boss 144 slides below the jaw clip passageway 132, the torsion spring 148 pivots the jaw clip 134 toward the touch surface 138, thereby placing the boss 144 under the top surface 139 of the lower jaw 88a and into locking engagement in the cavity 140, thereby locking the brew chamber 20 in a closed position.

The upper jaw 88b may include a spinning or rotating inlet needle 92 that extends downwardly into the brew chamber 20 and is designed to pierce a top surface 94 (FIGS. 1, 3, 16 and 17) of the brew cartridge 22 to inject heated water into the same. Correspondingly, the lower jaw 88a includes an upwardly-extending outlet needle 96 may be designed to pierce a bottom surface 98 of the brew cartridge 22, thereby facilitating flow through of hot water during the brew cycle when the top surface 94 of the brew cartridge 22 is pierced by the inlet needle 92. The upper jaw 88b may include a seal 100 that slips or slides concentrically over the inlet needle 92 for placement up underneath the upper jaw 88b as shown in FIG. 9. The seal 100 may create a hermetic seal between the inlet needle 92 and the upper jaw 88b and a similar hermetic seal between the inlet needle 92 and the top surface 94 of the brew cartridge 22 during the brew cycle. Accordingly, the seal 100 may prevent or substantially prevent fluid leaking during the brew cycle. The seal 100 may be constructed from silicone, ethylene propylene diene monomer (EPDM) rubber or any other suitable material durable enough to permit spinning or rotating movement of the inlet needle 92 therein over an extended duration of use, such as the normal operating life of conventional drip coffee brewers.

The system 10 includes a third brew line or third conduit 102 that fluidly couples the sensor outlet 72 to the brew head 18, and specifically to the rotating inlet needle 92. During the brew cycle, the pump 12 displaces heated water from the heater tank 16 through the third conduit 102 and into the brew cartridge 22. In this respect, the rotating inlet needle 92 injects hot water and steam into the coffee grounds 24 therein. A third check valve 104 is disposed between the sensor outlet 72 and the rotating inlet needle 92 in series along the third conduit 102. The third check valve 104 may be a one-way check valve having a positive cracking pressure (e.g., 2 psi). In this respect, the third check valve 104 prevents liquid from flowing to the brew head 18 unless the flow exceeds the cracking pressure (e.g., 2 psi). In this case, the third check valve 104 may have the same or similar specifications as the first and second check valves 46, 64, but the third check valve 104 may have different specifications than the first and second check valves 46, 64, including a different cracking pressure.

The third check valve 104 also helps prevent dripping out of the brew head 18 after the brew cycle is complete because any residual water within the conduit 102 and behind the check valve 104 may be under insufficient pressure to crack open the third check valve 104. Moreover, the third conduit 102 may be configured to gravity drain residual water back into the heater tank 16 (e.g., by positioning the third conduit 102 above the heater tank 16). Furthermore, a portion of the third conduit 102 may be shaped into a drain catch or trap to help prevent water backflow. The brewing system 10 may remove as much residual water from the third conduit 102 as possible so only heated water from the heater tank 16 is injected into the brew cartridge 22 at the start of the next brew cycle. As such, the coffee brewing system 10 disclosed herein is advantageous over conventional systems that permit residual water to remain in the third conduit 102 between the heater tank and the brew head at the end of the brew cycle.

To pump air at the end of the brew cycle, the coffee brewing system 10 further includes a first air line 106 open to atmosphere and fluidly coupled to the first conduit 40 behind the pump 12 and in front of the flow meter 48 (if included). The open end of the first air line 106 may be disposed over the reservoir 14 as illustrated in FIGS. 1, 3, 16 and 17 so any backflow of water in the system 10 drips or drains back into the water reservoir 14. A first solenoid valve 108 may be placed in series with the first air line 106 to control access to the atmospheric air. Initially, when the pump 12 displaces water from the reservoir 14 to the heater tank 16, the first solenoid valve 108 is closed. To pump air, the first solenoid valve 108 opens so the first conduit 40 opens to atmosphere. The air pressure in the first brew line 40 equalizes with the atmosphere, which is lower than the pressure within the first conduit 40 when the solenoid valve 108 was closed. As a result, the pressure in front of the first check valve 46 drops to atmosphere and below the cracking pressure, thereby allowing the first check valve 46 to close. Accordingly, the pump 12 stops displacing water and, instead, starts pumping air from the air line 106 exposed to atmosphere. As such, water no longer flows to the pump 12 from the reservoir 14. Conversely, if the first solenoid valve 108 closes, the pump 12 will re-pressurize the first conduit 40 and begin displacing water from the reservoir 14. In this respect, the first solenoid valve 108 can effectively control the pumping medium (i.e., air or water).

Figure 15:
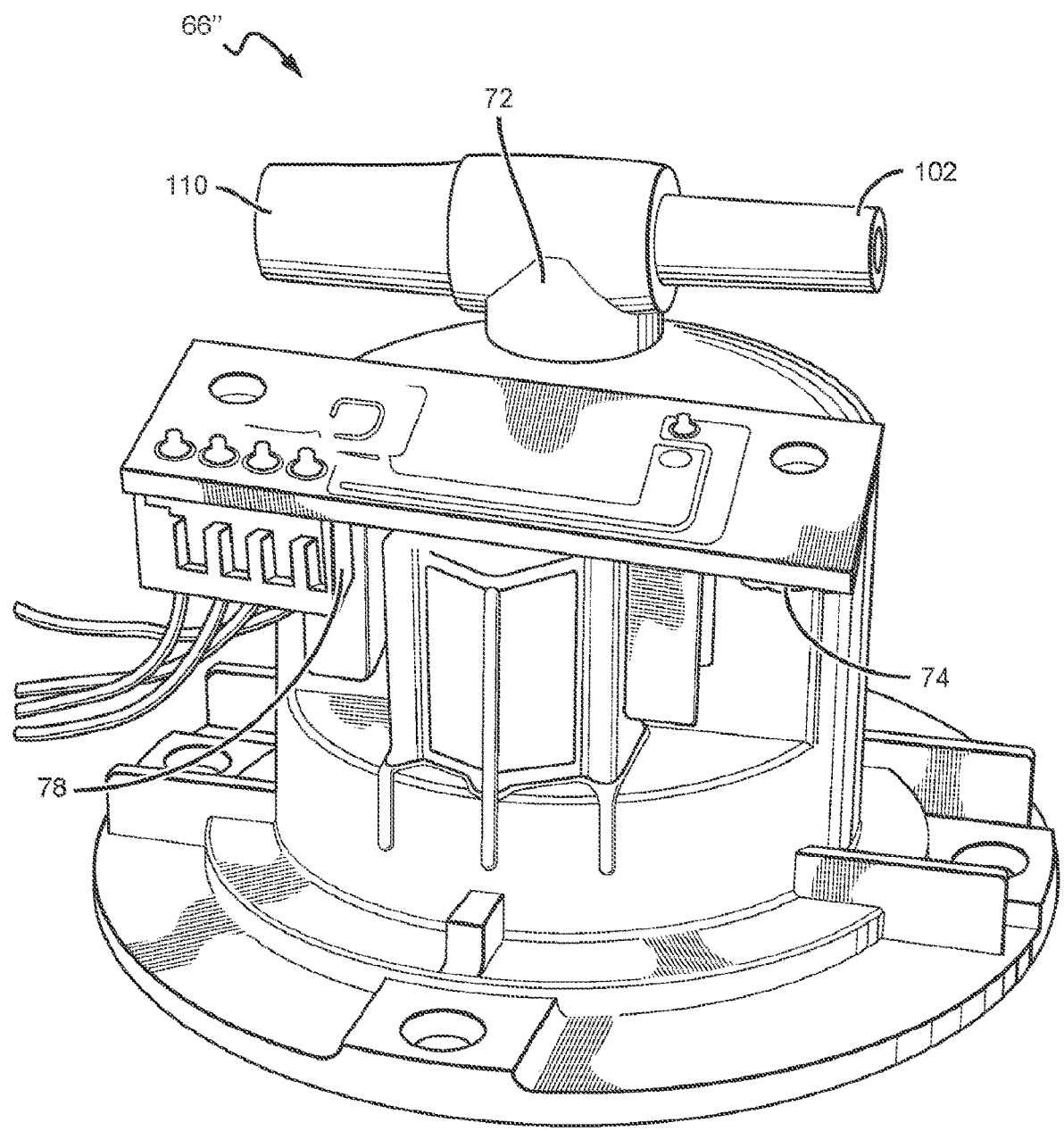
FIG. 15 is a front perspective view of the heater tank water level sensor of FIGS. 7-8 according to an aspect of the present disclosure.

The coffee brewing system 10 also includes a second air line 110 for controlling the pressure in the third conduit 102. The second air line 110 may split off from the third conduit 102 between the third check valve 104 and the sensor outlet 72 as shown in FIGS. 1, 3, 16 and 17. In one embodiment (best shown in FIG. 15), the sensor outlet 72 may include a Y- or T-shape.

That is, one side of the Y- or T-shaped outlet 72 facilitates connection with the second air line 110 and the other side of the Y- or T-shaped outlet 72 facilitates connection with the third conduit 102. The open end of the second air line 110 may be disposed over the reservoir 14, as illustrated in FIGS. 1, 3, 16 and 17, to drip or drain water back to the reservoir 14 (if needed), as described above with respect to the first air line 106. In this respect, the second air line 110 may optionally include an overflow fitting 398 to facilitate connection with the reservoir 14. The second air line 110 also includes a second solenoid valve 112 that opens the third conduit 102 to atmosphere when "open" and closes the third conduit 102 off from the atmosphere when "closed". When the second solenoid valve 112 is "open", pressure on the outlet side of the heater tank 16 equalizes with the atmosphere and the pressure in the third conduit 102 falls to atmosphere. This pressure drop allows the third check valve 104 to close by reducing the pressure in the third conduit 102 to below its cracking pressure. Thus, opening the second solenoid 112 helps prevent unwanted dripping at the end of the brew cycle because the third conduit 102 is closed off from further fluid flow by virtue of closing the third check valve 104.

Figure 16:
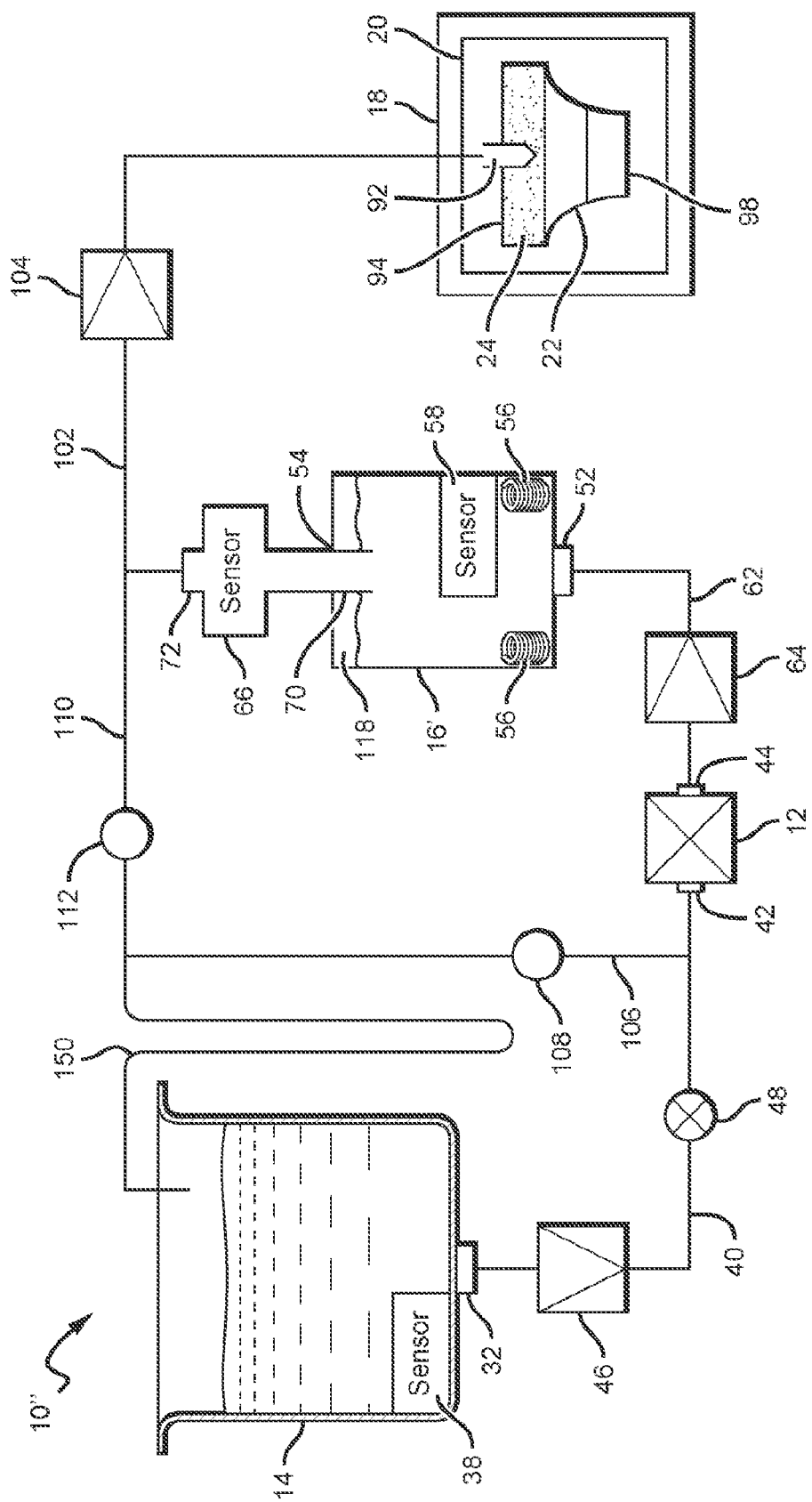
FIG. 16 is a schematic view of another alternate embodiment of the coffee brewing system according to an aspect of the present disclosure.

In an alternate embodiment illustrated in FIG. 16, the system 10 includes the second air line 110 includes an atmospherically vented tube 150 shaped similar to a plumbing trap (i.e., U-shaped). The atmospherically vented tube 150 stores water that flows out of the sensor 66 when the second solenoid valve 112 is open and the flow is under insufficient pressure to open the third check valve 104, e.g., when heating water in the heater tank 16 after an initial fill. As shown, the first air line 106 connects to the second air line 110 between the atmospherically vented tube 150 and the second solenoid valve 112. During the purge cycle (discussed in detail below), the pump 12 will displace or remove water stored in the atmospherically vented tube 150 when the first solenoid valve 108 opens and before pumping air. This effectively removes and refreshes the water in the atmospherically vented tube 150. The open end of the second air line 110 is disposed above the connection point with the sensor outlet 72 so water cannot flow out of the open end of the second air line 110 (e.g. out the atmospherically vented tube 150 and into the water reservoir 14) without completely filling the second air line 110 and the atmospherically vented tube 150. The second air line 110 may connect to the overflow fitting 398, which provides a fluidly sealed connection with the reservoir 14 to prevent leaking.

Figure 17:
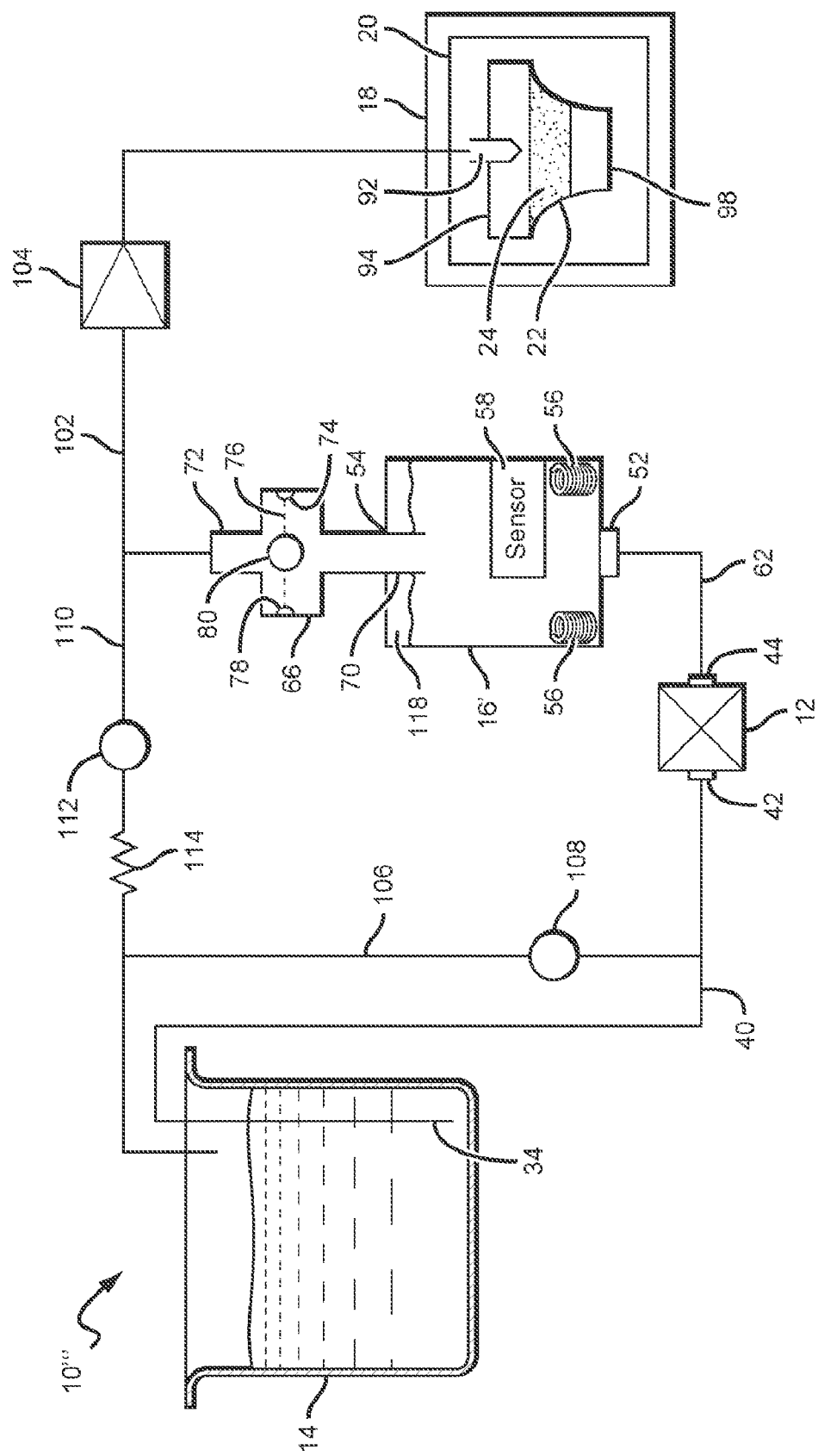
FIG. 17 is a schematic view of a coffee brewing system according to an aspect of the present disclosure.

In a further embodiment illustrated in FIG. 17, the second air line 110 in the system 10''' includes a tortuous path 114 to help prevent water from flowing out of the open end of the second air line 110. More specifically, the tortuous path 114 is filled with air when the second solenoid valve 112 is closed. When the second solenoid valve 112 opens, residual water from the third conduit 102 may flow into the second air line 110 due to the concomitant pressure release associated therewith. As such, some of the air in the tortuous path 114 is displaced by the water flowing in from the third conduit 102. The length and pressure drop across this path 114 (i.e., the tortuous nature) may ensure that no water is expelled from the open end of the second air line 110 (e.g., above the reservoir 14). In this respect, the tortuous path 114 helps ensure that only air exits the open end of the second air line 110. The tortuous path 114 may have any shape known in the art such as a spiral, zig-zag, circular, or rectangular path.

Figure 3:
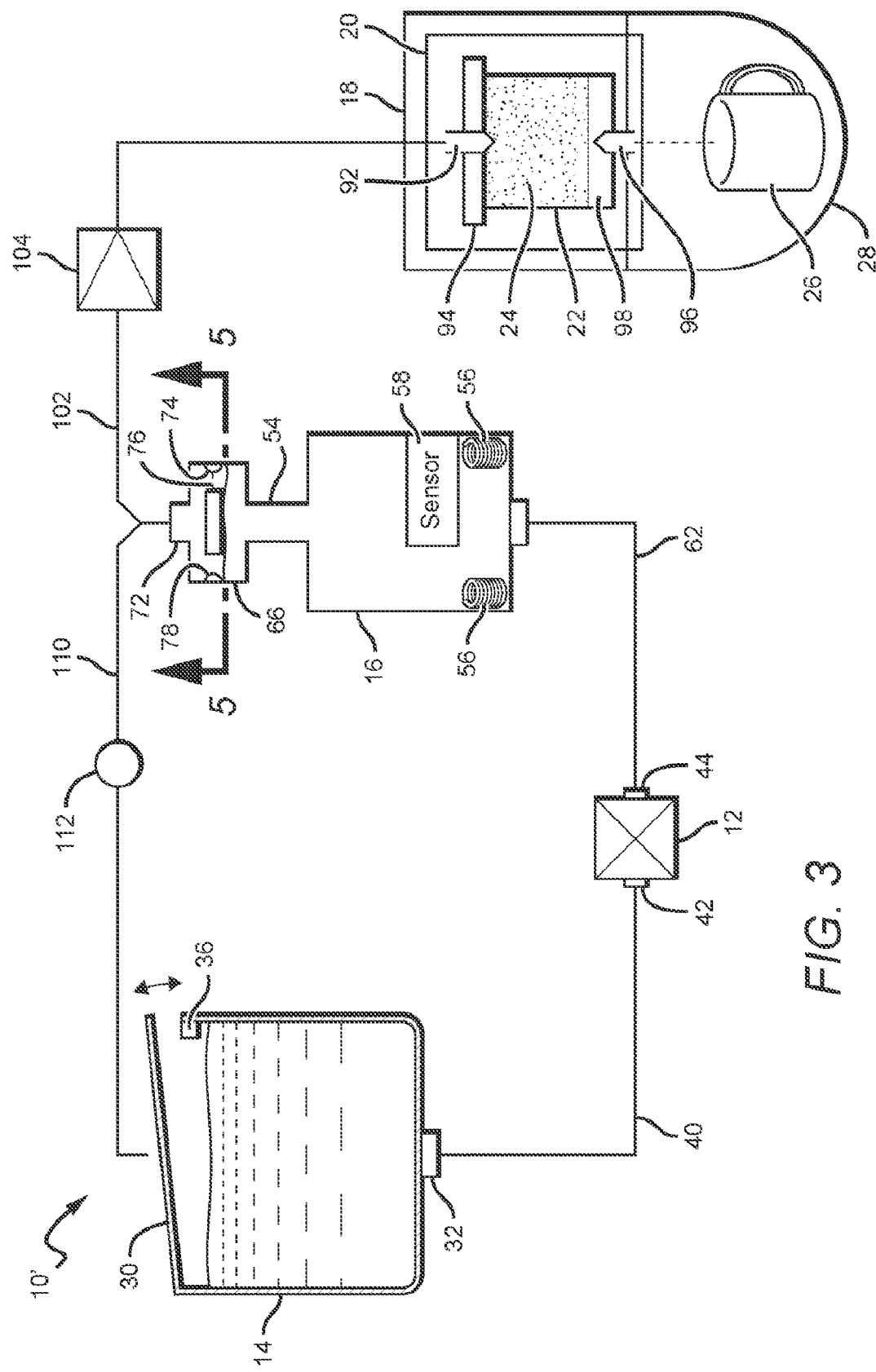
FIG. 3 is a schematic view of an alternate embodiment according to an aspect of the present disclosure.

In another aspect of the brewing systems disclosed herein, and as specifically shown with respect to systems 10', 10''' in FIGS. 3 and 17, the first check valve 46 and the second check valve 64 may be omitted. In essence, the pump 12 is used in place of the second check valve 64 to prevent water from flowing back from the heater tank 16 to the reservoir 14. The pump 12 operates to force or displace water forward from the reservoir 14 and into the heater tank 16 and, therefore, acts as a one-way valve. In operation, the pump 12 draws water into an open chamber exposed to the fluid in the first conduit 40. The pump 12 pressurizes the fluid in the chamber and causes forward displacement through the pump cycle, as is well known in the art. When the pump stops, the diaphragms block the passageway in the pump 12 from the pump outlet 44 to the pump inlet 42, effectively operating as a check valve. This, of course, prevents reverse flow of water from the second conduit 62 back into the first conduit 40 and toward the reservoir 14. To this end, the second check valve 64 is unneeded to stop backflow of water. The pump 12 may be capable of withstanding exposure to heated water in the event it is exposed to heated water from the heater tank 16.

Additionally, in the embodiment illustrated in FIG. 3, the pump 12 displaces water from the reservoir 14 only while water is present in the reservoir 14. Once the reservoir 14 empties, the system 10' initiates the air purge step (described in detail below). Since no water is available in the reservoir 14 when the air purge begins, there is no need to prevent water from flowing out of the reservoir 14 during this step (i.e., by the positive cracking pressure of the first check valve 46). Thus, it may be possible and desirable to eliminate the first check valve 46 as shown in FIG. 3, since the air purge cycle initiates when the water reservoir 14 is empty.

Furthermore with respect to the embodiment illustrated in FIG. 17, the use of the reservoir pickup 34 may allow the pump 12 to generate enough force within the first conduit 40 in front of the water reservoir 14 to draw water up into the first conduit 40. When the first solenoid valve 108 opens, pressure within the first conduit 40 drops to atmosphere. As a result of this pressure drop, the pump 12 is no longer able to effectively draw water from the reservoir 14 by way of the pickup 34. As a result, the pump 12 switches from pumping water to pumping air analogously as described above with respect to the brewing systems 10, 10', 10". The change in pumping medium occurs because it is easier for the pump 12 to displace atmospheric air from the open first air line 106 than it is to pump water from the reservoir 14 against the force of gravity. In this respect, the first check valve 46 is unnecessary and may be removed to reduce cost and complexity.

In view of the foregoing description, a person of ordinary skill in the art will realize that each of the brewing systems 10, 10', 10", 10''' may include various combinations of the check valves 46, 64, including using the first and second check valves 46, 64, using only the first check valve 46, using only the second check valve 64, or omitting both the first and second check valves 46, 64 (FIGS. 3 and 17), in accordance with the embodiments disclosed herein.

Figure 18:
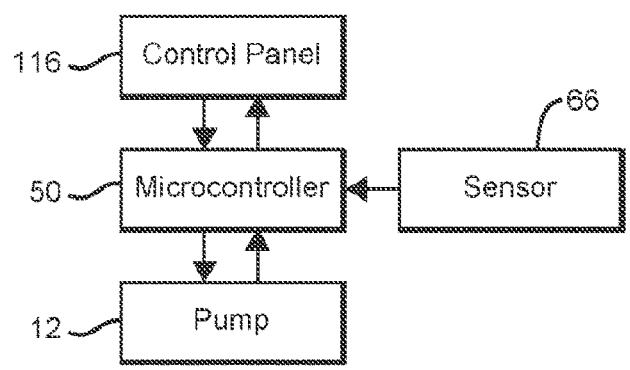
FIG. 18 is a diagrammatic view of a microcontroller that operates the coffee brewing system according to an aspect of the present disclosure.

As illustrated in FIG. 18, the system 10 further includes at least one microcontroller 50 for controlling different features of the brewer before, during and after a brew cycle. For example, the microcontroller 50 may be coupled with the pump 12 and have the ability the turn the pump 12 "on" or "off" in response to the fill state of the heater tank 16. More specifically, the microcontroller 50 may receive feedback responses from the photoreceptor 78 and operate the pump 12 based on those feedback responses. For example, when the photoreceptor 78 provides light-receiving feedback, the microcontroller 50 knows the heater tank 16 is not full. As such, the microcontroller 50 may continue to run the pump 12 to fill the heater tank 16. Conversely, occlusion of the light beam 76 by the float 80, 80', 80" in accordance with the embodiments described above may result in the photoreceptor 78 providing negative feedback to the microcontroller 50. Here, the microcontroller 50 knows the heater tank 16 is full since the float 80, 80', 80" occludes transmission of the light beam 76 to the photoreceptor 78 within the heater tank level sensor 66. Accordingly, the microcontroller 50 may shut "off" the pump 12. One skilled in the art will understand that the system 10 may include one or more of the microcontrollers 50, and that the microcontroller(s) 50 can be used to control various features of the system 10 beyond simply turning the pump "on" or "off". For example, the microcontroller 50 may also control, receive feedback from or otherwise communicate with the heater tank temperature sensor 58 (e.g., to monitor heater tank water temperature), the low water level sensor 38 in the reservoir 14 (e.g., determine if there is any water to brew), the flow meter 48 (e.g., monitoring the quantity of water pumped to the heater tank during a brew cycle), the heating element 56 (e.g., regulate water temperature in the heater tank 16), heater tank level sensor 66 (e.g., determine fill state of the heater tank 16), the emitter 74 (e.g., to turn "on" or "off" the light beam 76), the photoreceptor 78 (e.g., to determine occlusion of the light beam 76), the rotating inlet needle 92 (e.g., activation and rotation during a brew cycle), the first solenoid valve 108 (e.g., open or close), the second solenoid valve 112 (e.g., open or close), the activation switch 90 (e.g., determining whether the jaws 88 are open, before initiating a brew cycle) and/or an externally accessible control panel 116.

The control panel 116 may include a series of externally accessible controls, knobs, LCD screens, etc. that allow users to operate the brewing system 10. As mentioned above, the control panel 116 is in feedback communication with one or more of the microcontroller(s) 50 for processing the selected or desired brewing conditions. More specifically, the user may utilize the control panel 116 to provide commands to the one or more microcontroller(s) 50, such as to initiate the brew cycle or change the desired serving size. In this respect, the control panel 116 may include push-buttons, rotary dials, knobs, or other inputs known in the art. As will be discussed in greater detail below, in one embodiment the control panel 116 includes a rotary dial or other rheostat 348 that allows the user to select different serving sizes (e.g., 6-12 oz.) and/or brewing temperatures by rotating or moving an externally accessible knob. In this respect, the rheostat 348 regulates the quantity of water that the pump 12 displaces from the reservoir 14 into the heater tank 16 and ultimately into the coffee mug 26 as part of the brew cycle. The rheostat 348 may facilitate linear or incremental size selection (e.g., 2 oz. increments). The control panel 116 may also provide the user with visual feedback regarding the status of the brewing system 10, including the status of an ongoing brew cycle. In one embodiment, for example, the control panel 116 may include an LCD screen (not shown) to indicate the serving size selected and/or an array of LEDs to provide immediate visual identification of the brewing system 10 prior to a brew cycle, during a brew cycle, and after a brew cycle. The microcontroller 50 may deactivate all of the controls (e.g., push-buttons, rotary dials such as rheostat 348, knobs, LCD screen, etc.) after the brew cycle is initiated.

Figure 19:
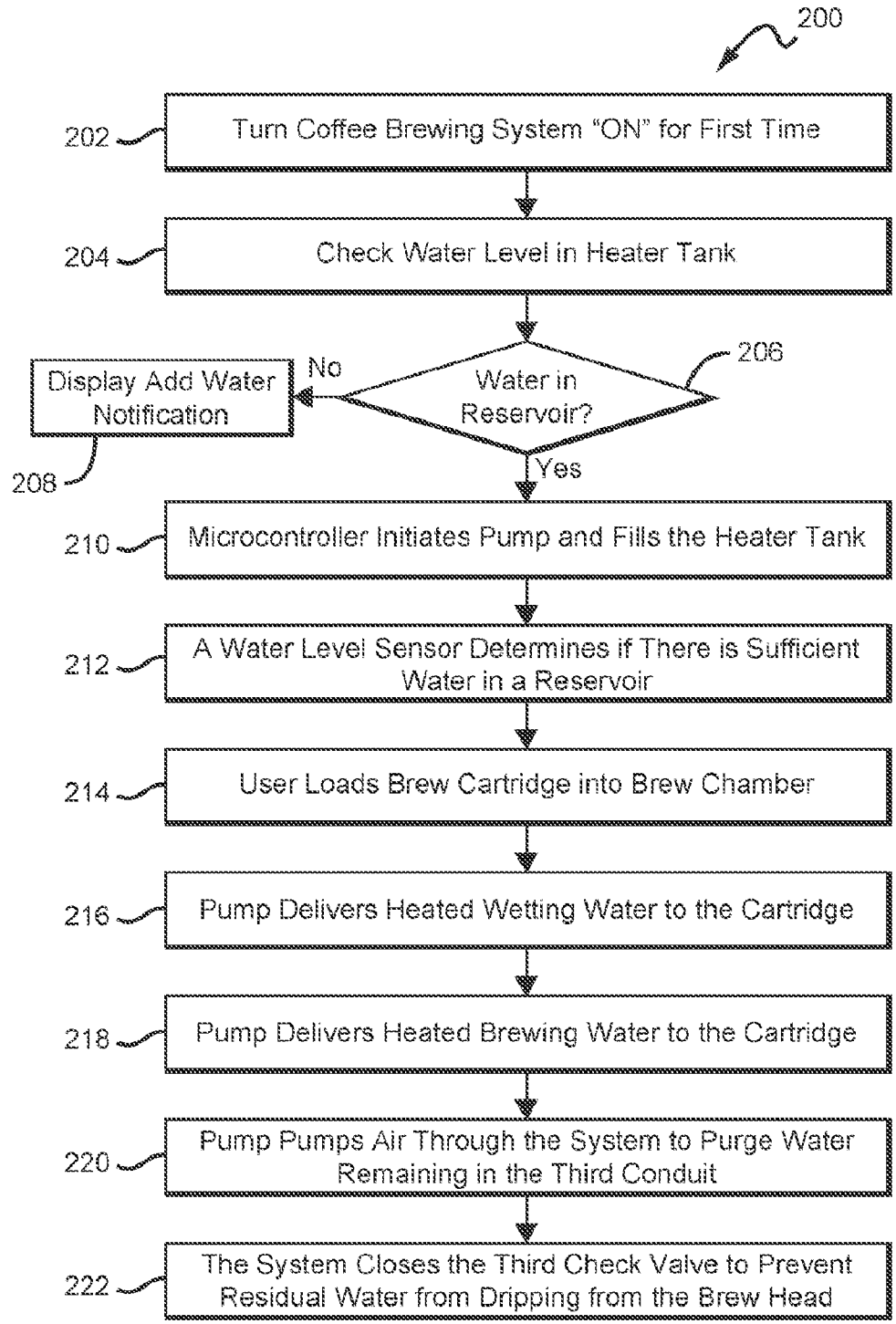
FIG. 19 is a flow chart illustrating a method for using the coffee brewing system in accordance with an aspect of the present disclosure.

FIG. 19 illustrates one method (200) for operating the coffee brewing system 10 in accordance with the embodiments disclosed herein. In this respect, the first step (202) is to turn the coffee brewing system 10 "on" for the first time. Powering "on" the brewing system 10 activates the electronics, including the microcontroller 50 and other features operated by the microcontroller 50, such as the emitter 74, as described herein. The next step (204) is for the now powered brewing system 10 to check the water level in the heater tank 16. This can be quickly accomplished by reading feedback from the photoreceptor 78. If the heater tank 16 is empty, the photoreceptor 78 will send positive feedback to the microcontroller 50 that the light beam 76 is being received. This should be the case the first time the brewing system 10 is turned "on", unless the system 10 already has water in the heater tank 16.

As such, the next step (206) is for the system 10 to determine if there is any water in the reservoir 14 that can be used to fill, or at least partially fill, the heater tank 16. The microcontroller 50 may receive feedback from a water level sensor indicating that the reservoir 14 has some quantity of water. More specifically, the microcontroller 50 may receive feedback from the low level sensor 38 (indicating a threshold amount of water is in the reservoir 14) or one or more sensors that provide feedback regarding the specific quantity of water in the reservoir 14. Alternatively, the microcontroller 50 may operate the pump 12 to determine whether the reservoir 14 has any water, as described above. If there is no water in the reservoir 14, then the system 10 will display a notification to "add water" (208). Alternatively, if there is water in the reservoir 14, the microcontroller 50 activates the pump 12 to start filling the heater tank 16 as part of step (210). The pump 12 will continue pumping water from the reservoir 14 until the heater tank level sensor 66 indicates the heater tank 16 is full, or until the microcontroller 50 determines the reservoir 14 is out of water, e.g., through feedback from the low water level sensor 38 or the like, or through feedback from the pump 12.

When the pump 12 turns "on" as part of the initial filling stage, it runs at a substantially constant speed (i.e., constant voltage) to pump water from the reservoir 14 through the first conduit 40 and into the heater tank 16 via the inlet 52. At this point, the first solenoid valve 108 is closed and the second solenoid valve 112 is open. The first check valve 46 (if included) opens to allow water from the reservoir 14 to flow therethrough in the forward direction once the pump 12 creates sufficient pressure in the first conduit 40 to exceed the cracking pressure of the first check valve 46 (if included). The water then flows through the flow meter 48 (if included, as in FIG. 1) en route to the pump 12. The flow meter 48 can determine and track the volume of water pumped from the reservoir 14. Although, in an alternate embodiment as shown in FIGS. 3 and 17, the water volume pumped from the reservoir 14 may be determined based on the speed and duration of the pump 12, as described herein. The water then flows through the pump 12 and through the second check valve 64 (if included), assuming the water pressure is greater than its cracking pressure. In this embodiment, both the first and second check valves 46, 64 have the same cracking pressure. Thus, if the flow pressure is sufficient to open the first check valve 46, it is also sufficient to open the second check valve 64. The water then flows into the bottom of the heater tank 16 via the inlet 52 and starts to fill the heater tank 16. Step (210) may optionally include creating an air blanket 118 at the top of the heater tank 16.

Figure 20:
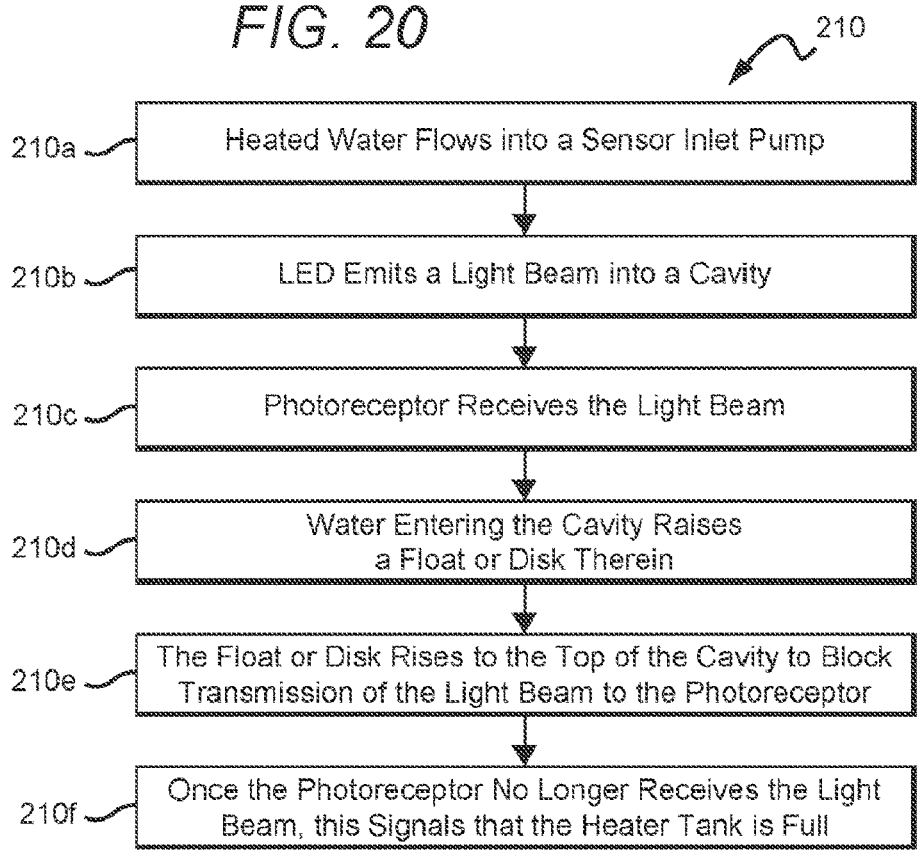
FIG. 20 is a flow chart illustrating a method for using the heater tank level sensor according to an aspect of the present disclosure.

FIG. 20 more specifically illustrates the step (210) for initiating the pump and filling the heater tank 16, and using the heater tank level sensor 66 to determine if the heater tank 16 is full, or is low on water. As the heater tank 16 fills with water, continued pumping results in water flowing into the sensor inlet pickup 70 as part of step (210a). As mentioned above, the emitter 74 emits the light beam 76 into the cavity 68 (210b) and the photoreceptor 78 receives the light beam 76 and provides feedback to the microcontroller 50 as such (210c). This feedback indicates the heater tank 16 is less than full, e.g., as illustrated in FIG. 21. Water entering and rising in the cavity 68 also causes the float 80 to rise (210d). In step (210e), the float 80 rises to the upper portion of the cavity 68 and contacts the legs 82. The legs 82 stop upward movement of the float 80 without sealing off the sensor outlet 72 from the cavity 68 (e.g., by way of the passageways 84). The legs 82 bias the float 80 in a vertical position whereby the body of the float 80 blocks or obstructs transmission of the light beam 76 from the emitter 74 to the photoreceptor 78, as illustrated in FIG. 22. The same occlusion can be accomplished using the float 80', 80" as described herein. Once the photoreceptor 78 no longer receives the light beam 76, the sensor 66 relays a signal to the microcontroller 50 indicating that the heater tank 16 is full (210f). Thereafter, the system 10 shuts off the pump 12 as part of the final step (210f) shown in FIG. 20.

The heater tank 16 remains full or substantially full at all times after the initial fill cycle is completed as part of step (210). In this respect, the microcontroller 50 may be programmed to maintain the heater tank 16 in a full state at any given point in the future through periodic continued monitoring of the heater tank level sensor 66, or by other methods disclosed herein or known in the art. At this stage, since the heater tank 16 is full of water, movement of water from the reservoir 14 to the heater tank 16 by the pump 12 causes a commensurate amount of water in the heater tank 16 to be displaced or expelled out through the sensor outlet 72 and into the third conduit 102 for delivery to the brewer head 18, as described in more detail herein.

Additionally, the microcontroller 50 may activate the heating element 56 during the initial filling process described above to heat the water in the heater tank 16 to the desired brew temperature. This way, the water in the heater tank 16 is immediately pre-heated upon entry to the heater tank 16, thereby reducing the time for the brewing system 10 to prepare for a brew cycle. In a one embodiment, the heating element 56 may sufficiently pre-heat the water in real-time to the desired brewing temperature upon entry to the heater tank 16. In an alternative embodiment, it may take longer for the heating element 56 to heat the water to the desired brewing temperature. In this respect, the water in the heater tank 16 is initially below the brewing temperature when the heater tank 16 is full. Accordingly, the heating element 56 continues to heat the cooler water at the bottom of the heater tank 16. The heated water at the bottom of the heater tank 16 rises as it becomes less dense than the cooler water above, which now falls to the bottom of the heater tank 16 and into closer proximity with the heating element 56. This process continues until the entire (or substantially the entire) volume of water in the heater tank 16 is at the desired brew temperature. During the heating process, the temperature sensor 58 tracks or measures the temperature of the water in the heater tank 16 to determine when the water is at the correct or desired brew temperature. Optionally, an externally viewable temperature LED (not shown) may provide visual notification that the heating element 56 is active, or that the water is at an optimal brew temperature and ready to initiate a brew cycle. Another feature of the brewing system 10 may permit the user to manually set the desire brew temperature using the externally accessible control panel 116.

In the embodiment illustrated in FIG. 16, the microcontroller 50 may not activate the heating element 56 until the sensor 66 indicates that heater tank 16 is completely full. Once the heating element 56 begins heating the water in the heater tank 16, the water therein thermally expands and may cause some of the water to flow out of the sensor outlet 72 and into the third conduit 102 and the second air line 110. Water exiting the sensor 66 is under insufficient pressure to open the third check valve 104, so the third check valve 104 effectively blocks or prevents water flow to the brew head 18. As such, the water flows through the second air line 110 and past the open second solenoid valve 112 for eventual storage in the atmospherically vented tube 150. In this respect, the second air line 110 and the atmospherically vented tube 150 may be typically filled with water during the brew cycle (i.e., steps (216)-(218)). This water, of course, is expelled and refreshed as part of the purge cycle at the end of the brew cycle (e.g., step (220)).

Additionally, the microcontroller 50 may receive periodic continuous feedback readings from the temperature sensor 58 after the heater tank 16 has been filled with water. In this respect, the microcontroller 50 may turn the heating element 56 "on" and "off" at periodic intervals to ensure the water in the heater tank 16 remains at an optimal brewing temperature so a user can initiate a brew cycle without waiting for the brewer to heat the water therein. Alternatively, the microcontroller 50 can be pre-programmed or manually programmed to activate the heating element 56 to ensure the water temperature is at the optimal brewing temperature at certain times of the day (e.g., morning or evening), instead of keeping the heater tank water at the desired brew temperature. In this respect, it may be possible for the user to set the times when the water in the heater tank 16 should be at the optimal temperature for brewing a beverage.

Once the heater tank 16 is full and the water is at the optimal brewing temperature, the brewing system 10 is ready to initiate a brew cycle. The system 10 may include the control panel 116 with externally accessible knobs, switches or dials that permit selection of certain brewing conditions. For example, a user may be able to set the desired brew size (e.g., 6 oz., 8 oz., 10 oz., etc.) using the externally accessible rheostat 348. After selection of the desired brew size, the system 10 may then read the water level sensor 38 (e.g., with the microcontroller 50) in the reservoir 14 to determine if the reservoir 14 contains a sufficient volume of water to brew the desired quantity of coffee, as part of step (212). If the reservoir 14 does not contain an adequate quantity of water, the brewing system 10 may present a "low" or "no" water indication and prompt the user to add water to the reservoir 14 similar to step (208). Alternatively, in accordance with the systems 10', 10''' shown in FIGS. 3 and 17, the microcontroller 50 may determine whether the reservoir 14 includes water based on load and current measurements of the pump 12. In this embodiment, and as described above, it is not necessary to include the low water level sensor 38.

Figure 23:
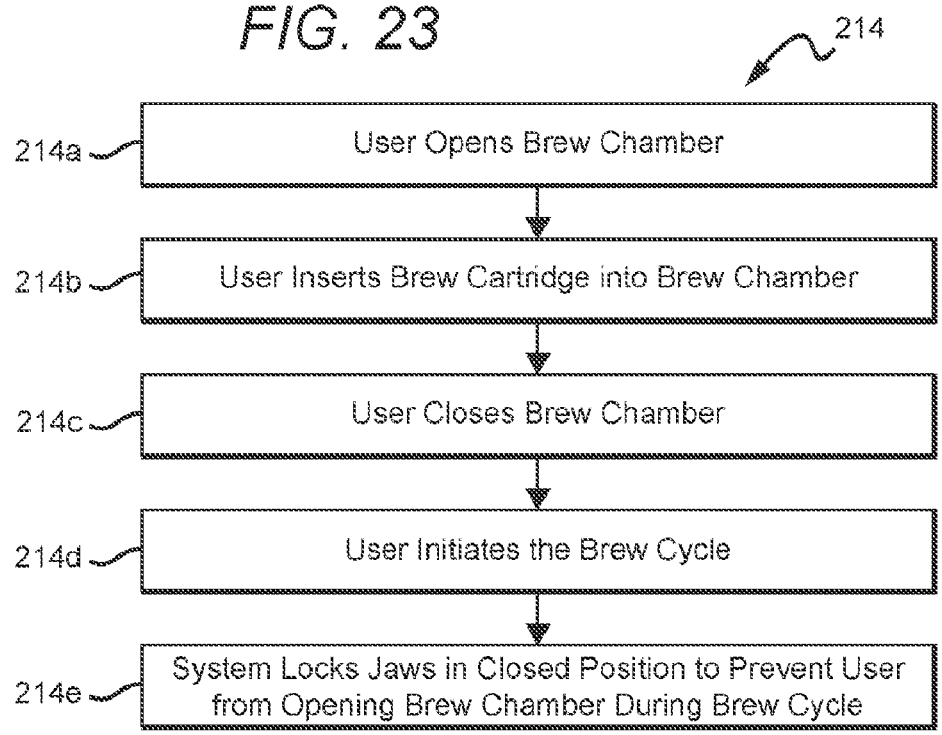
FIG. 23 is a flow chart illustrating steps for loading a brew cartridge into the brew chamber.

The next step (214) is for the user to load a brew cartridge 22 into the brew chamber 20. More specifically as illustrated in the flowchart of FIG. 23, the user opens the brew chamber 20 in step (214a) such as by pressing a touch surface 138 on the release button 130 to automatically open the upper jaw 88b. Alternately, the user may manually open the brew chamber 20 by moving the upper jaw 88b relative to the lower jaw 88a. Next, the user inserts the brew cartridge 22 containing the coffee grounds 24 into a receptacle in the brew chamber 20 as part of step (214b). In step (214c), the user shuts the brew chamber 20 by closing the upper jaw 88b such as by hand pressure, as described above, or by an automatic mechanism known in the art. The user then initiates the brew process (214d), e.g., by pressing an externally accessible button on the control panel 116. The system 10 may then lock the jaws 88a, 88b in the closed position (214e) (e.g., by disabling the release button 130) to prevent the user from opening the brew chamber 22 during the brew cycle. The user may perform step (214) at any point during method (200) and prior to initiation of the brew cycle shown and described as part of step (216).

Just prior to the start of step (216), the system 10 closes the second solenoid valve 112 to prevent the pump 12 from displacing heated water to the second air line 110 and the atmospherically vented tube 150 during the brew cycle. In this respect, closing the second solenoid valve 112 displaces water to travel forward into the third conduit 102. An increased pressure in the third conduit 102 opens the check valve 104 and delivers pressurized heated water to the rotating inlet needle 92. Next, as part of step (216), the pump 12 delivers a small predetermined amount of heated water to the brew cartridge 22 at a high pressure and flow rate to initially preheat and pre-wet the coffee grounds 24 therein. More specifically, the pump 12 may run at a relatively high voltage (e.g., 80-90% of the maximum voltage) for a relatively short duration (e.g., 10% of the brew cycle) to inject a relatively small quantity of heated water (e.g., 1 oz. or 10% of the total brew volume or serving size) into the brew cartridge 22. The pump 12 may run for a predetermined time period (e.g., 10 seconds) or until the pump amperage spikes indicating that the heated water has wetted the coffee grounds 24. For example, a 12 volt pump may run at 10-11 volts to inject 1 oz. of heated water into a brew cartridge designed to brew a 10 oz. serving. The coffee brewer system 10 may run the pump 12 at a higher or lower voltage or inject more or less heated water as needed or desired. Once in the brew cartridge 22, the heated water intermixes with the bed of coffee grounds 24 to initially pre-wet and pre-heat the same. This initial quantity of heated water does not cause brewed beverage to exit the brewer head 18 (or at least very little). The rotating inlet needle 92 may ensure homogenous wetting and pre-heating of all or a substantial majority of the grounds 24 in the brew cartridge 22. The wetting and preheating of the coffee grounds 24 in step (216) enhances consistent flavor extraction relative to conventional brewing processes known in the art, thereby improving the taste of the resultant coffee. Moreover, step (216) also pre-heats the third conduit 102, thereby preventing any temperature drop in the heated water used to brew the desired coffee beverage later in the brew cycle. Step (216) may comprise only a small amount of the total brewing time (e.g., 5-10%).

Figure 24:
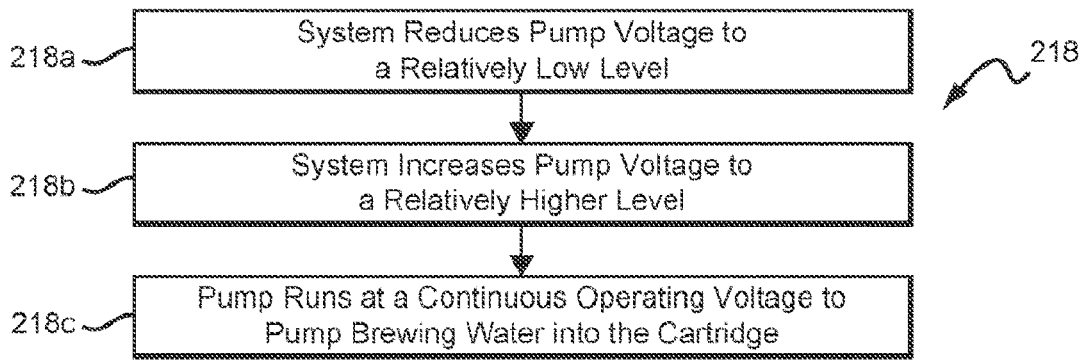
FIG. 24 is a flow chart illustrating steps for delivering heated water to a brew cartridge according to an aspect of the present disclosure.

The next step (218) is for the system 10 to pump a predetermined amount of heated water (e.g., 90% of the brew volume) from the heater tank 16 into the brew cartridge 22 to brew the coffee. More specifically as illustrated in FIG. 24, the system 10 reduces the voltage supplied to the pump 12 from the relatively high level in step (216) to a relatively low voltage (e.g., 20% of the total pump voltage) in step (218a), thereby reducing the pressure and flow rate of water to the brew cartridge 18 relative to step (216). Once at this voltage, the system 10 gradually increases the pump voltage to an operating voltage, as shown in step (218b). The operating voltage at the end of step (218b) may still be much less than the total pump voltage (e.g., 40%). The voltage increase in step (218b) may be a ramp function (i.e., a substantially continuous linear increase in voltage), a stair-step function (i.e., the voltage increases in a series of discrete steps), or any other method of increasing the pump voltage as desired. The pump 12 then runs at the operating voltage (i.e., a continuous voltage) to continue the brew cycle until most of the desired quantity of beverage is brewed (218c). For example, a 12 volt motor running at 10-11 volts in step (216) may drop to 2 volts in step (218a) and slowly ramp up to 4 volts in step (218b) and continue at that voltage until the pump 12 has delivered a total of 9 oz. of heated water (i.e., 1 oz. of heated wetting water and 8 oz. of heated brewing water) as part of a 10 oz. serving. In this respect, the heated water flows from the heater tank 16 into the brew cartridge 22 in the same manner as the heated pre-wetting water in step (216), albeit at a lower pressure. Step (218) may comprise the majority of the brewing time (e.g., 80-90%).

Figure 25:
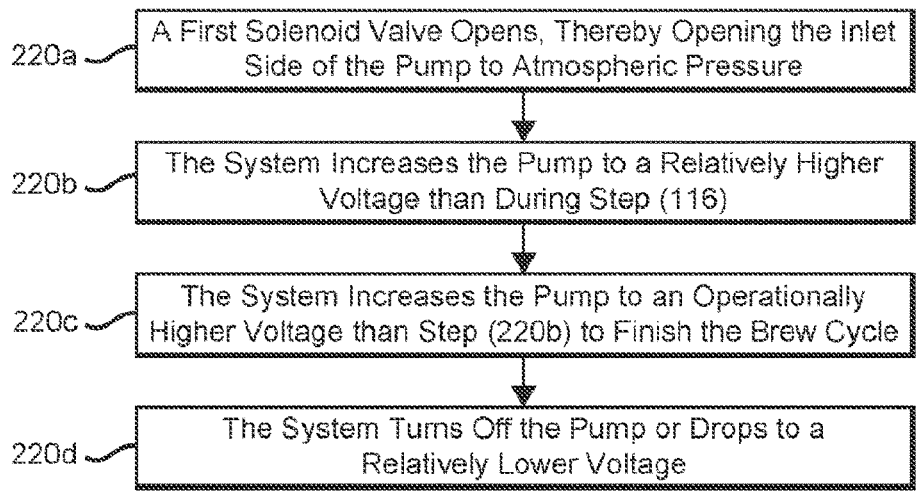
FIG. 25 is a flow chart illustrating steps for purging water and coffee from the brew head according to an aspect of the present disclosure.

The next step (220) is for the pump 12 to pump air through the system 10 to purge the remaining water in the third conduit 102. After completion of step (218), a relatively small amount of heated water (e.g., 10% of the total brew volume, or about 1 oz.) may remain in the third conduit 102 and/or the atmospherically vented tube 150 (FIG. 16). The amount of water displaced from the heater tank 16 during steps (216) and (218) should not equal the total amount of water delivered to the brew cartridge 22 because the third conduit 102 has a positive volume that stores a portion of the displaced water. Thus, to brew the entire serving size, this residual water must be displaced from the third brew line 102 and/or the atmospherically vented tube 150. As illustrated in FIG. 25, the first step (220a) is for the first solenoid valve 108 to open, thereby opening the inlet side of the pump 12 (i.e., the first conduit 40) to atmospheric air. As such, pressure in the first conduit 40 falls to atmosphere. This permits the first check valve 46 to close because the pressure in the first conduit 40 falls below the cracking pressure of the first check valve 46. Now, the pump 12 pulls and pumps air from the first air line 106 and into the second conduit 62.

In the alternative embodiment shown in FIG. 3, the step (220) for pumping air through the conduit system to purge any remaining water in the third conduit 102 occurs as a result of pulling air through the reservoir 14 after the reservoir 14 runs out of water. As described above, in this embodiment, the pump 12 will continue to pump water until the reservoir 14 is empty. When the water runs out, the first conduit 40 becomes exposed to the atmosphere and the pump draws air into the first conduit 40 through the opening in the reservoir 14. At this point, the microcontroller 50 identifies an amperage drop in the pump 12 and initiates the last phase of the brew cycle, i.e., purging water remaining in the third conduit 102, in accordance with the embodiments disclosed herein.

In the embodiment illustrated in FIG. 16, the step (220) for pumping air though the system 10II to purge any remaining water in the third conduit 102 occurs as a result of pulling air through the atmospherically vented tube 150. As mentioned above, the atmospherically vented tube 150 is typically filled with water during steps (216)-(220). In this respect, the pump 12 will pull all water remaining in the atmospherically vented tube 150 and the second air line 110 first. Once the water is completely drained from the second air line 110, the microcontroller 50 identifies an amperage drop in the pump 12 and initiates the final phase of the brew process, i.e., the air purge. In this respect, the water stored in the atmospherically vented tube 150 is refreshed every brew cycle.

In step (220b), the pump voltage may immediately increase to a relatively higher voltage (e.g., 70% or 80% of the maximum pump voltage) to immediately force a quantity of pressurized air through the second conduit 62, the heater tank 16, the sensor 66 and out through the third conduit 102 and into the brew cartridge 22. The pressurized air will bubble through the water in the heater tank 16 because the air is less dense than water. The top of the heater tank 16 includes the dome-shaped nose 60 so the pressurized air is immediately directed to the heater tank outlet 54 for delivery to the third conduit 102. Residual water or brewed coffee in the third conduit 102 onward may be quickly and smoothly evacuated and dispensed from the system 10 and into the underlying mug 26 or the like as brewed coffee. The third conduit 102 has a relatively smaller diameter than the heater tank 16, which increases the density and flow rate of air traveling therethrough to more efficiently evacuate and dispense any residual liquid out from the brew head 18. In this respect, the pressurized air and concomitant friction within the third conduit 102 is able to force substantially all of the water remaining in the third conduit 102 into the brew cartridge 22.

The pump 12 may steadily increase to an even higher voltage (e.g., 80-90% of the maximum pump voltage) as part of a finishing step (220c). The voltage increase in step (220c) may be a ramp function (i.e., a substantially continuous linear increase in voltage), a stair-step function (i.e., the voltage increases in a series of discrete steps), or any other method of increasing pump voltage known in the art. In this respect, the pump 12 continues to draw air into the system 10 through the first air line 106 (or through the reservoir 14 in accordance with the embodiment shown in FIG. 3), thereby forcing any remaining water from the third conduit 102 into the brew cartridge 22. For example, a 12 volt pump may jump from 4 volts in step (218c) to 9 volts in step (220b) and increase to 11 volts in step (220c) to quickly and efficiently force the water remaining in the third conduit 102 into the brew cartridge 22 to complete the 10 oz. serving. The system 10 then turns the pump 12 "off" (220d). Alternatively, the pump 12 may drop to a relatively lower voltage (e.g., 2 volts) instead of shutting off. The pump 12 pumps purging air through the coffee brewing system 10 until the desired serving size (e.g., 10 oz.) of coffee is brewed. The total runtime of step (220) is relatively short compared to the total brew time (e.g., 5-10%). Furthermore, positioning the entrance of the third conduit 102 above the heater tank 16 allows any water remaining in the third conduit 102 and behind the third check valve 104 to drain into the heater tank 16 under the influence of gravity, upon completion of step (220). In this respect, the third conduit 102 may be substantially free of water after the system 10 finishes step (220).

Figure 26:
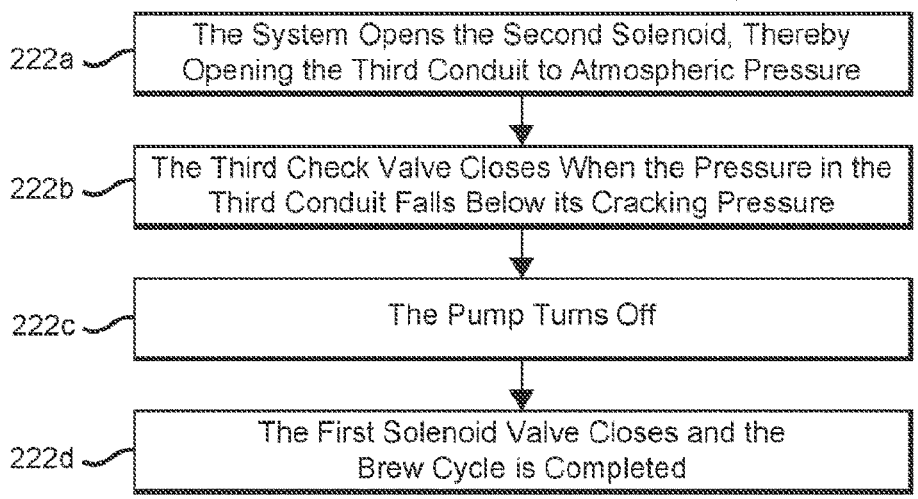
FIG. 26 is a flow chart illustrating steps for opening the brewer head conduit to atmospheric pressure according to an aspect of the present disclosure.

The next step (222) is to open the second solenoid valve 112 and close the third check valve 104 to help prevent any remaining water from dripping out from the brew head 18. More specifically, as illustrated in FIG. 26, the heater tank 16 and the second and the third conduits 62, 102 are under a positive pressure from the pump 12 during the brew cycle, the release point being the pressure drop in the brew cartridge 22 across the bed of coffee grounds 24. As such, this pressure can cause the brew head 18 to drip after the brewing process has ended. In this respect, the system 10 opens the second solenoid valve 112 in step (222a), thereby opening the third conduit 102 to the atmosphere. The pressure on the outlet side of the heater tank 16 (i.e., the third conduit 102) then drops to that of the atmosphere. The pressure in the third conduit 102 is relieved into atmosphere via the open end of the second air line 110. Water forced out of the open end of the second air line 110 (if any) drains into the reservoir 14. In this reduced pressure state, the third check valve 104 closes because the pressure in the third conduit 102 falls below the cracking pressure thereof (222b). Thus, water does not drip out of the brew head 18 because the third check valve 104 prevents any residual water from flowing thereto. If the pump 12 continued to run at a relatively lower voltage in step (220d), the system 10 shuts the pump 12 off in step (222c) after a relatively short amount of time (e.g., 2 seconds). Step (222c) is only necessary if the pump 12 does not turn off in step (220d). Finally, in step (222d), the system 10 closes first solenoid valve 108. At this point, the brew process is complete and the user may enjoy a hot cup (or more) of freshly brewed coffee. The heater tank 16 is still completely filled with water and pre-heated, thereby decreasing the time needed to brew another cup of coffee.

The heater tank 16 remains completely filled with water throughout steps (216)-(222). In this respect, the pump 12 supplies water to the brew cartridge 22 in steps (216) and (218) by pumping water from the reservoir 14 into the heater tank 16. A volume of water equal to the amount of water pumped into the heater tank 16 is displaced therefrom into the third conduit 102 because the heater tank 16 is completely filled. For example, for a 10 oz. serving size, the pump 12 pumps a total of 10 oz. of water from the reservoir 14 into the heater tank 16, which, in turn, displaces 10 oz. of heated water therefrom into the third conduit 102 and the brew cartridge 22 for brewing a cup (or more) of coffee into the underlying coffee mug 26 or the like. Of course, the amount of water displaced from the water reservoir 14 to the heater tank 16 during the brew cycle may be altered somewhat to account for water in the third conduit 102 and/or the atmospherically vented tube 150 during the purge cycle.

Figure 27:
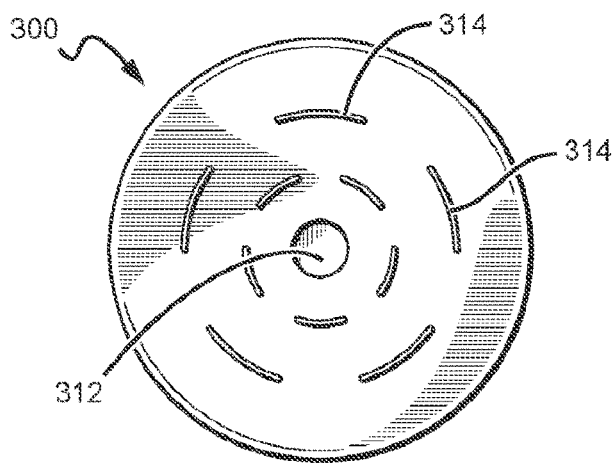
FIG. 27 is a top plan view of a float for use in a reservoir water level sensor according to an aspect of the present disclosure.
Figure 28:
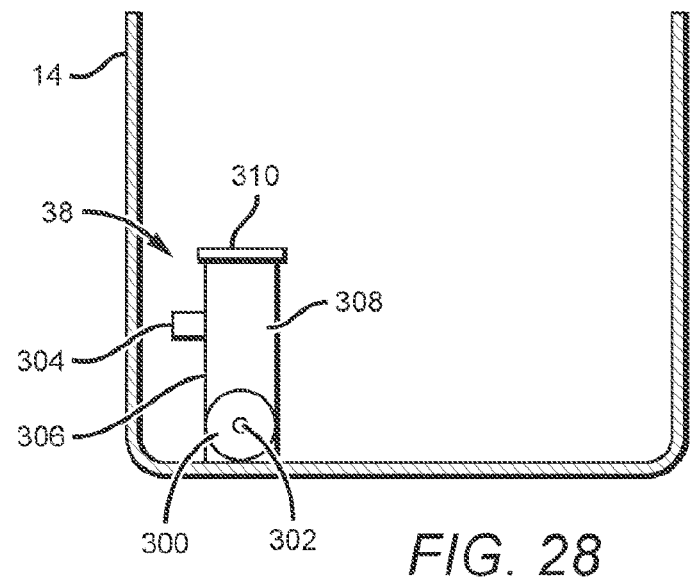
FIG. 28 is a diagrammatic view of the reservoir water level sensor according to an aspect of the present disclosure.
Figure 29:
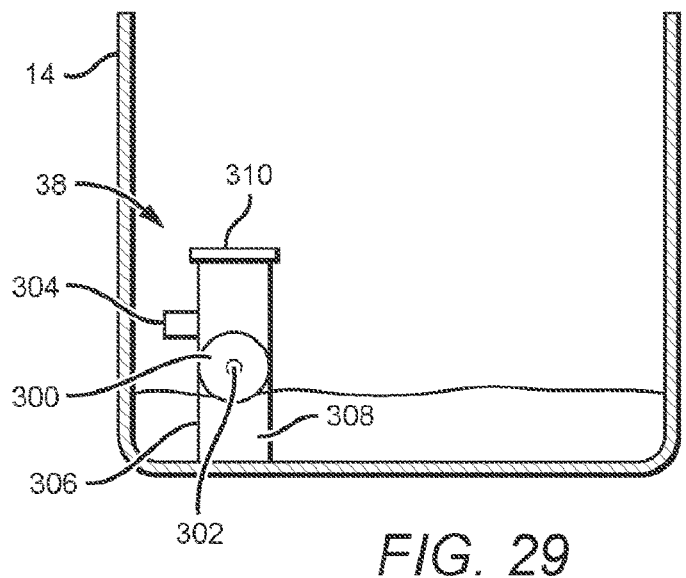
FIG. 29 is a diagrammatic view of the reservoir water level sensor according to an aspect of the present disclosure.
Figure 30:
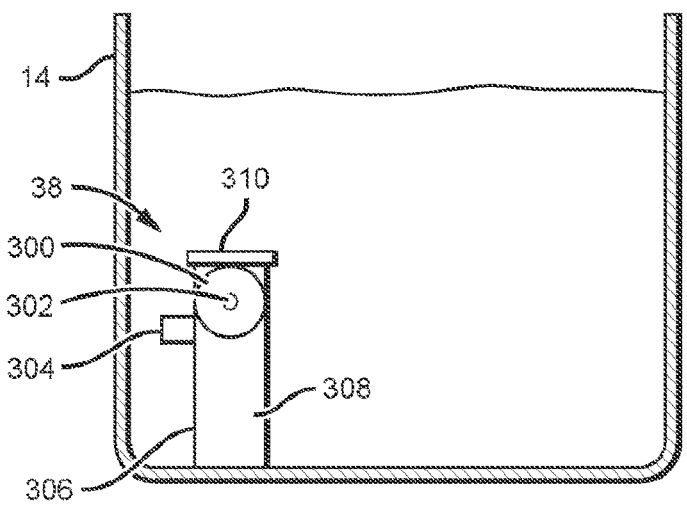
FIG. 30 is a diagrammatic view of the reservoir water level sensor according to an aspect of the present disclosure.

One embodiment of the reservoir water level sensor 38 is illustrated in FIGS. 27-30. The sensor 38 includes a buoyant float 300 having a magnet 302 affixed thereto that rises and falls with the water level in the reservoir 14. The magnet 302 trips a Hall Effect sensor 304, thereby indicating the water level in the reservoir 14. More specifically, the reservoir 14 includes a plurality of walls 306 that form a chamber 308 that horizontally constrains the position of the float 300 while simultaneously allowing the float 300 to move vertically therein based on the water level in the reservoir 14. In this respect, the walls 306 are configured in a manner to open the chamber 308 to water in the reservoir 14, so that the water level in the chamber 308 is commensurate with the water level in the reservoir 14. The chamber 308 is positioned at the bottom of the reservoir 14 as shown in FIGS. 28-30 and prevents the float 300 from falling below the bottom of the reservoir 14. In this respect, the float 300 is tangent to the bottom surface of the reservoir 14 (FIG. 28) when empty. The chamber 308 extends upward from the bottom of the reservoir 14 to approximately one-quarter to one-third of the overall height of the reservoir 14. Although, the chamber 308 may extend higher or lower as needed or desired. The chamber 308 includes a cap 310, which circumscribes the maximum vertical position of the float 300. The Hall Effect sensor 304 is positioned relative to the chamber 308 and movement of the float 300 therein so the magnet 302 trips the Hall Effect sensor 304 when the reservoir 14 contains a certain quantity of water. The Hall Effect sensor 304 may be at a position to signal when the water reservoir 14 has enough water to brew the largest serving size of the system 10 (e.g., 12 oz.).

The Hall Effect sensor 304 may be positioned between the minimum vertical position of the magnet 302 (i.e., when the float 300 is tangent to the bottom surface of the reservoir 14 as illustrated in FIG. 28) and the maximum vertical position of the magnet 302 (i.e., when the float 300 is tangent to the cap 310 as illustrated in FIG. 30). This feature permits the magnet 302 to travel up past the Hall Effect sensor 304 when more than the maximum serving size of water is in the reservoir 14. This feature ensures that the Hall Effect sensor 304 is signaled when the water level in the reservoir 14 falls to or below the maximum serving size.

As illustrated in FIG. 27, the float 300 may be disk-shaped and constructed from a water buoyant polymer, such as polystyrene or polypropylene. Furthermore, the float 300 may be oriented in the chamber 308 so that the flat surfaces of the float 300 are perpendicular to the bottom surface of the reservoir 14. The float 300 may include a central depression 312 for receiving and retaining the magnet 302. The float 300 also includes one or more outwardly-extending protrusions 314 to prevent the float 300 from sticking or suctioning to the walls of the reservoir 14 or the walls 306 of the chamber 308. The float 300 may be any shape or oriented in any position known in the art.

FIGS. 28-30 illustrate the operation of the reservoir water level sensor 38. More specifically, FIG. 28 shows the float 300 is tangent to the bottom surface of the reservoir 14 when the reservoir 14 is empty. The float 300 raises in the chamber 308 as the water level in the reservoir 14 increases. In this respect, FIG. 29 shows the position of the float 300 when the water level in the reservoir 14 is at some level below (e.g., 6 oz.) the maximum serving size (e.g., 12 oz.) of the system 10. Here, the float 300 and the magnet 302 are still at a vertical position below the Hall Effect sensor 304. Once the water level in the reservoir 14 rises beyond the maximum serving size (e.g., 12 oz.), the magnet 302 trips the Hall Effect sensor 304, thereby indicating that the reservoir 14 contains at least enough water to brew the maximum serving of coffee. The float 300 continues to rise within the chamber 308 and beyond the Hall Effect sensor 308 as more water is added to the reservoir 14. When the reservoir 14 is full, for example as shown in FIG. 30, the float 300 abuts the cap 310 at the top of the chamber 308 and is positioned above the sensor 304. When in this position, the system 10 will freely brew coffee in accordance with the desired quantity entered into the control panel 116 until the water level in the reservoir 14 falls below the maximum brew size.

In this respect, dispensing water from the reservoir 14 during one or more brew cycles, and without refilling the reservoir 14 in the meantime, causes the water level therein to fall. In this embodiment, the float 300 will start to decrease in vertical height at some point (e.g., 14 oz.) above the maximum brew quantity (e.g., 12 oz.). This allows the float 300 and the corresponding magnet 302 thereon to travel back past the Hall Effect sensor 304 as water continues to be dispensed from the reservoir 14. At the point where the water in the reservoir 14 equals the maximum brew size, the magnet 302 trips or signals the Hall Effect sensor 304 on its way down. Here, the system 10 knows the reservoir 14 only contains only enough water for the maximum serving size (e.g., 12 oz.). In one embodiment, once the existing brew cycle finishes, the system 10 will not initiate another brew cycle if the reservoir 14 contains less than the maximum serving size. In this respect, the system 10 may provide an indication to add water to the reservoir 14. In this embodiment, the next brew cycle can only be initiated after enough water is added to reservoir 14 so the float 300 and the magnet 302 again pass and trip the Hall Effect sensor 304, thereby indicating that the water level in the reservoir 14 is more than the maximum serving size.

In an alternate embodiment, the system 10 will initiate the brew cycle even if the water level in the reservoir 14 falls below the maximum serving size so long as the user selects a serving size smaller than the quantity of water remaining in the reservoir 14. That is, the system 10 determines the quantity of water present in the reservoir 14 by tracking the amount of water that leaves the reservoir 14 (e.g., by using the flow meter 48 or the pump 12) after the magnet 302 trips the Hall Effect sensor 304, by subtracting the remaining amount of the brew cycle from the maximum serving size. For example, if the maximum serving size is 12 oz., the system 10 knows that the reservoir 14 only contains 12 oz. of water when the magnet 302 trips the Hall Effect sensor 304. If 2 oz. of water leave the reservoir 14 after the magnet 302 trips the Hall Effect sensor 304, the system 10 knows that 10 oz. of water remain in the reservoir 14 (i.e., 12 oz. minus the 2 oz. used after tripping the Hall Effect sensor 304 equals 10 oz.). As such, the system 10 may be designed to permit one or more subsequent brew cycles of 10 oz. or less through continued tracking of the quantity of water remaining in the reservoir 14.

Figure 31:
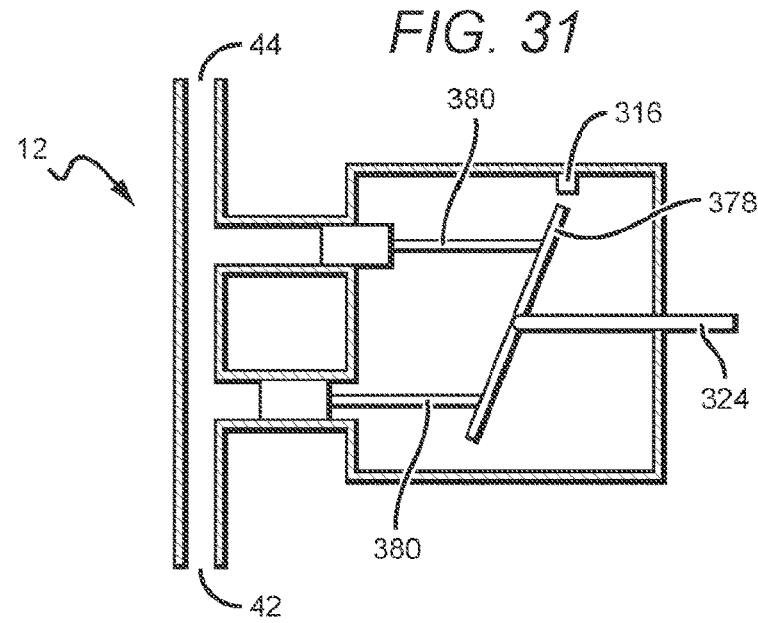
FIG. 31 is a diagrammatic view of one embodiment of the pump according to an aspect of the present disclosure.

In alternative embodiments, the system 10 may determine the rotational speed of the pump 12 by methods unrelated to reading the current that the pump 12 draws. For example, as illustrated in FIG. 31, the system 10 may include a microphone 316 that listens for sound pulses or vibrations generated when one or more rotary wobble plates 378 hit one or more pistons 380 in the pump 12. In this respect, the system 10 may be able to deduce the speed of the pump 12 based on the rate of sound pulses or vibrations picked up or heard by the microphone 316. The flow rate may then be calculated as mentioned above, i.e., the total volume of water displaced through the pump 12 being based on the formula: fluid quantity=pump rate*fluid volume/rotation*time; wherein the pump rate is measured by the microphone 316 based on the rate of sound pulses or vibrations and the fluid volume is the volume of water displaced by each pump diaphragm. The microphone 316 may be any suitable type of microphone such as a field-effect transistor (FET) microphone or a piezo microphone.

Figure 32:
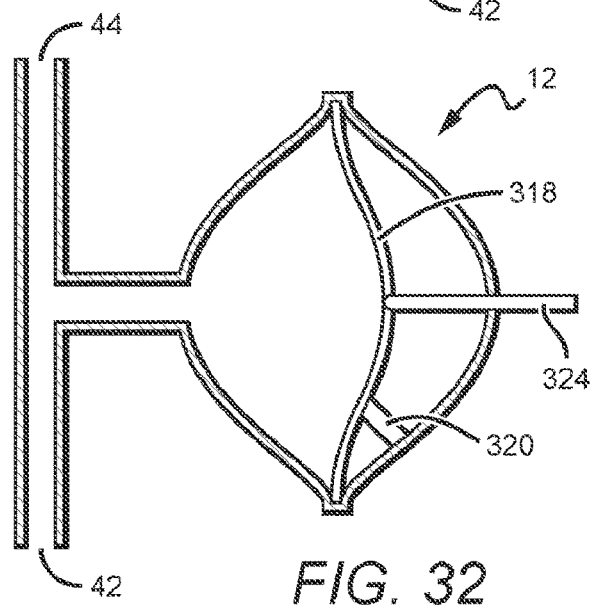
FIG. 32 is a diagrammatic view of another embodiment of the pump according to an aspect of the present disclosure.

Alternately, as illustrated in FIG. 32, the diaphragm 320 of the pump 12 may contact a piezoelectric member 320 during each pumping cycle, thereby inducing a measurable electric current therein. In this respect, the speed of the pump 12 can be measured by the rate the current is induced in the piezoelectric member 320 over a given time period (i.e., the number of times that the diaphragm 318 hits the piezoelectric member 320). The piezoelectric member 320 may include polyvinylidene fluoride, but may be made from any other type of piezoelectric material known in the art. In a further embodiment shown in FIG. 33, the microcontroller 50 uses a Hall Effect sensor 322 to determine the speed of the pump 12. In this respect, the pump shaft 324 has a magnet 326 disposed thereon. When the magnet 326 passes by the Hall Effect sensor 322, an electric current is induced therein. The speed of the pump 12 is similarly calculated based on the rate that the electric current is induced in the Hall Effect sensor 326. Another alternative embodiment is shown in FIG. 34, illustrating a disk 328 having a plurality of evenly-spaced circumferential slots 330 affixed to and rotating with the pump shaft 324. An emitter 332 disposed on one side of the disk 328 shines a light beam 334 for periodic reception by a photoreceptor 336 when aligned with one of the slots 330 in the disk 328. Again, periodic reception by the photoreceptor 336 of the light beam 334 through the slots 330 can generate a periodic and measurable signal indicative of the speed of the pump 12. For example, the microcontroller 50 may determine the speed of the pump 12 by dividing the number of times that photoreceptor 336 receives the light beam 334 from the emitter 332 in a specified time period, and based on the number of slots 330 in the disk 328.

In one embodiment, the system 10 may maintain the heater tank 16 in a filled state after the initial fill sequence described above, regardless of the temperature of the water therein. In this respect, the pump 12 may operate in constant closed loop feedback with the heater tank level sensors 66, 66', 66". Normally, the heating element 56 maintains the water at or near the desired brewing temperature (e.g., 192° Fahrenheit). As discussed herein, the water temperature in the heater tank 16 may fall below the brew temperature when the system 10 is inactive for an extended duration or when an energy saver mode is activated. The water in the heater tank 16 may thermally contract when it cools. As such, the water level may fall below the heater tank water level sensor 66, causing the controller 50 to activate the pump 12 to displace additional water from the reservoir 14 into the heater tank 16. The controller 50 may turn the pump 12 "on" and "off" as needed to ensure the heater tank 16 remains substantially constantly filled with water. If the water in the heater tank 16 is below the desired brew temperature when the brew cycle is initiated, the heater element 56 turns "on" to increase the temperature of the water therein to the appropriate brewing temperature. Accordingly, the water therein thermally expands as it is heated. Since the heater tank 16 is already substantially or completely full of water, thermal expansion may cause some water to flow out through the normally "open" second solenoid valve 112 and into the second air line 110, 110' and the atmospherically vented tube 150. The water in the second air line 110, 110' and/or in the atmospherically vented tube 150 may be evacuated or dispensed at the end of each brew cycle in accordance with the embodiments disclosed herein.

In an aspect of the present disclosure, the controller 50 may use feedback from the temperature sensor 58 and the heater tank level sensor 66 to self-learn temperature and related heater tank 16 fill levels. In this respect, the controller 50 may be able to better maintain the water level in the heater tank 16 in a manner that reduces or eliminates water overflow from thermal expansion, as described above. That is, if the microcontroller 50 receives feedback that more than a few oz. of water are flowing into the second airline 110 and/or the atmospherically vented tube 150, the microcontroller 50 may adjust the operation of pump 12 and the heating element 56 by, e.g., increasing the temperature of the water in the heater tank 16 before adding additional water, to reduce overflow as a result of thermal expansion.

Alternatively, the system 10 may purposely overfill the heater tank 16 beyond the heater tank water level sensor 66 so that water fills the second air line 110 and/or the atmospherically vented tube 150 with some water spilling back into the water reservoir 14. Here, the system 10 establishes a constant or static starting point with a known quantity of water in the heater tank 16, the second air conduit 110 and the atmospherically vented tube 150 for use in a brew cycle.

In one embodiment illustrated in FIG. 35, the system 10 include a debouncing logic device 338 to smooth out transient feedback sent to the microcontroller 50 by heater tank water level sensor 66, 66', 66". More specifically, the water in the heater tank 16 may splash or otherwise bubble or flow in an irregular manner as the pump 12 fills the heater tank 16. This may cause the float 80 to periodically and accidentally obstruct transmission of the light beam 76 to the photoreceptor 78. Additionally, water bubbles may disperse the light beam 76 so that an inadequate amount of the light beam 76 is received by the photoreceptor 78, thereby providing false feedback to the controller 50 that the heater tank 16 is full. As such, the sensor 66 may fluctuate between full and not full readings (i.e., the float 80 cycles between occluding and not occluding the light beam 76 from the photoreceptor 78) several times in rapid succession. The debouncing logic device 338 acts as a filter to interpret and regulate the output signal from the photoreceptor 78. In this respect, the debouncing logic device 338 may employ a signal from the water level sensor 66 that may be constant for a specified period of time (e.g., 1 second) before signaling to the microcontroller 50 that the heater tank 16 is full. That is, the system 10 may employ fail to receive the light beam 76 for the specified period of time (e.g., 1 second) before the microcontroller 50 will turn "off" the pump 12. Likewise, the system 10 may require that the photoreceptor 78 continuously receive the light beam 76 for the predetermined time period (e.g., 1 second) before the microcontroller 50 will turn the pump 12 "on". In this respect, the debouncing logic device 338 may smooth out feedback fluctuations from the heater tank water level sensor 66 to prevent turning the pump 12 "on" and "off" in immediate successions.

In another embodiment of the brewing system 10 disclosed herein, FIGS. 38 and 39 illustrate the brew head 18, and specifically the upper jaw 88b having a generally flat and outwardly extending sealing ring 340 disposed circumferentially around the seal 100 to provide auxiliary planar support for the a lid 342 of the brew cartridge 22. Conventional brewers known in the art include a counter bore 344 circumferentially disposed around the inlet needle 92 as illustrated in FIG. 36. During the brew process, conventional brewers pressurize the brew cartridge 22 to approximately 1-2 psi which can cause the lid 342, typically made from a thin metal foil, to flex upward into the counter bore 344. The 1-2 psi pressure in the cartridge 22 is insufficient to break the lid 342, but is undesirable because it does not create adequate mixing of the hot water and coffee grounds in the brew cartridge 22 during the brew cycle. As such, increasing the pressure in the brew cartridge 22 beyond 2 psi can be detrimental because the increased pressure causes further movement of the lid 342 upward into the counter bore 344, causing the lid 342 to undesirably "blow out" as shown in FIG. 37. In this respect, the blow out 346 may be larger in diameter than the inlet needle and, therefore, may cause undesired leaking.

More specifically, the inlet needle 92 creates small, high stress tears when it pierces the lid 342. These tears are prone to further propagation when the lid 342 is permitted to flex upward into the counter bore 344. The "blow out" 346 occurs when the tears propagate to such an extent that the hole in the lid 342 becomes larger than the seal 100. In this respect, the seal 100 no longer hermetically seals the inlet needle 92 to the lid 342, thereby allowing the pressurized water and coffee ground mixture to escape from the brew cartridge 22. This problem is exacerbated as the brew cartridge pressurization increases. The system 10 pressurizes the brew cartridge 22 to a relatively higher pressure (e.g., 2-5 psi) than typical conventional brewers for increased fluidization of the coffee grounds 24 therein during the brew cycle. To prevent the aforementioned blow out 346, the sealing ring 340 as illustrated in FIGS. 38 and 39 prevents the lid 342 from flexing upward into the conventional counter bore 344. In other words, the brewing system 10 shown in FIGS. 38 and 38 includes the outwardly extending sealing ring 340 in place of the indented counter bore 344. In FIGS. 38 and 39, the lid 342 remains substantially supported along a larger surface area during pressurized brewing, thereby preventing the blow out 346 shown in FIG. 37. In this respect, the sealing ring 340 is advantageous over the counter bore 344 because it allows increased pressurization of the brew cartridge 22 without the attendant "blow out" risks associated with conventional brewers. The sealing ring 340 may be constructed from silicone, ethylene propylene diene monomer (EPDM) rubber, or any other suitable material. The sealing ring 340 and the seal 100 may be separate components, but may also be one single integrated component. Furthermore, the sealing ring 340 may be any shape that adequately supports the lid 342 (e.g., the ring seal 340 may be rectangular, etc.) to permit increased pressurization within the brew cartridge 22 and prevents the blow out 346.

As discussed above, the control panel 116 includes the rheostat 348 that allows the user to control the serving size and/or the brewing temperature. In one embodiment illustrated in FIG. 40, the same rheostat 348 controls both the serving size and the brew temperature. In this respect, the control panel 116 may include a mode selector 350 for toggling between serving size and brew temperature adjustment. Here, the rheostat 348 can be rotated to change the serving size (or brew temperature). Then, after selection of the mode selector 350, the rheostat 348 can be rotated to change the brew temperature (serving size), and vice versa. The mode selector 350 may be a switch, dial, knob, button, capacitive sensor, resistive sensor, or any other suitable human-machine interface. Furthermore, the mode selector 350 may be separate from the rheostat 348 as shown in FIG. 40, or the mode selector 350 may be integrated in with the rheostat 348 (e.g., the rheostat 348 may rotate and function as a push button).

The system 10 may optionally include an auto brew function activated by an auto brew selector 352 (FIG. 40) on the control panel 116. After a brew cycle is completed, the system 10 may require some time (e.g., 60 seconds) to heat the water in the heater tank 16 to the appropriate or desired brewing temperature. This may be the case even though the heater tank 16 remains completely full during the previous brew cycle and the heating element 56 remains on. In this respect, it may take the heater tank 16 some time (e.g., 60 seconds as mentioned above) to heat the newly displaced water from the reservoir 14 to the desired brew temperature. The auto brew function facilitates initiation of another brew cycle while the heater tank 16 is still heating the water therein. In this respect, if the user decides to brew another serving (e.g., by pressing a start button (not shown)), the system 10 will start the next brew cycle immediately after the water in the heater tank 16 is heated to the appropriate brewing temperature. If the auto brew function is not selected, the user may need to wait until the water in the heater tank 16 has reached the appropriate brewing temperature before initiating another brew cycle. In this respect, the brewing system 10 will not automatically activate if the start button is pressed while the heater tank 16 is still heating the water therein, unless the auto brew function is activated.

In an additional aspect, the brewing system 10 may prompt the user to place a brew cartridge 22 into the brew chamber 20 every time the system 10 is turned "on". For example, a brew cartridge sensor 354 (FIG. 9) may detect the presence of the brew cartridge 22 when placed in the brew chamber 20. In response, the system 10 may turn "off" the brew cartridge insertion indicator. Turning the system 10 "off" and then back "on" may cause the system 10 to provide a prompt to insert a new brew cartridge into the brew chamber 20, even if the brew cartridge 22 is already present in the brew chamber 20. This prevents the system 10 from brewing coffee with a used brew cartridge or an unused brew cartridge may have been left in the brew chamber 20 for some extended duration (e.g., a brew cartridge may be left in the brew chamber 20 for a month without use). Alternately, the system 10 may only prompt for insertion of a new brew cartridge 22 if the brew cartridge sensor 354 does not detect the brew cartridge 22 in the brew chamber 20.

Figure 40:
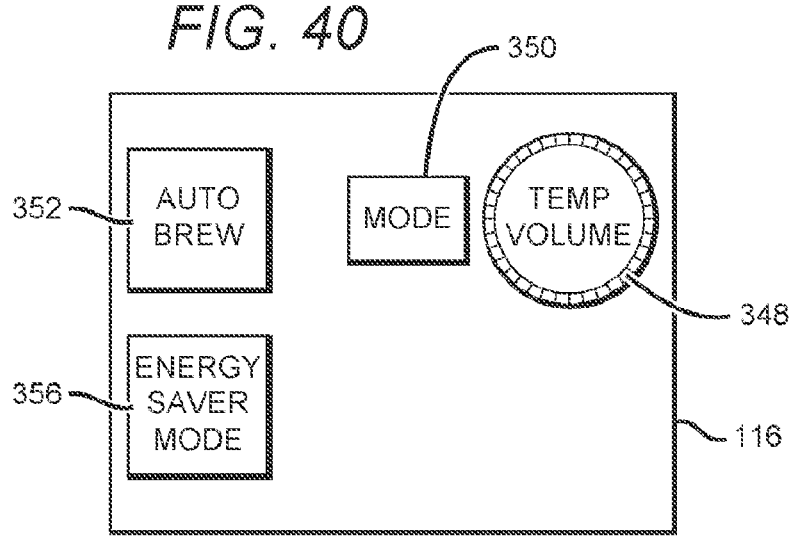
FIG. 40 is a diagrammatic view of a brewer control panel, according to an aspect of the present disclosure.

The system 10 also includes an energy saver mode that may be activated by the energy saver mode selector 356 (FIG. 40). Normally the heater tank 16 maintains the water therein at the appropriate brewing temperature (e.g., 192° Fahrenheit) so that the system 10 is always ready to brew another serving of coffee. In this respect, the system 10 is essentially in a permanent state of standby so that the user does not have to wait for the water in the heater tank 16 to reach the brew temperature to initiate a new brew cycle. When the energy saver mode is selected, the heater tank 16 will maintain the water therein at a temperature at or near the brewing temperature (e.g., 188192° Fahrenheit) for an initial predetermined or manually set duration (e.g., two hours). In this respect, the heating element 56 operates in closed loop feedback with the temperature sensor 58. For example, if the temperature of the water in the heater tank 16 falls below the 188° Fahrenheit during this initial duration, the heating element 56 turns on to heat the water. Once the water reaches 192° Fahrenheit, the heating element 56 turns off. After the initial duration (e.g., 2 hours), the heater tank 16 may then maintain the water therein at a temperature lower than the desire brew temperature, but relatively hotter than room temperature e.g., 140° Fahrenheit) for some secondary extended duration, such as 26 hours. After 28 hours since the last brew cycle (i.e., after 2 hours at 188-192° Fahrenheit and 26 hours at 140° Fahrenheit), the controller 50 may turn off the heating element 56 altogether and allow the water in the heater tank 16 to cool to room temperature. The specific temperatures and durations used in the energy saver mode may vary depending on the specific needs of the system. In this respect, the temperatures and times may be preconfigured or manually set by each individual user. The energy saver mode selector 356 may be a switch, dial, knob, button, capacitive sensor, resistive sensor, or any other suitable human-machine interface known in the art.

Figure 41:
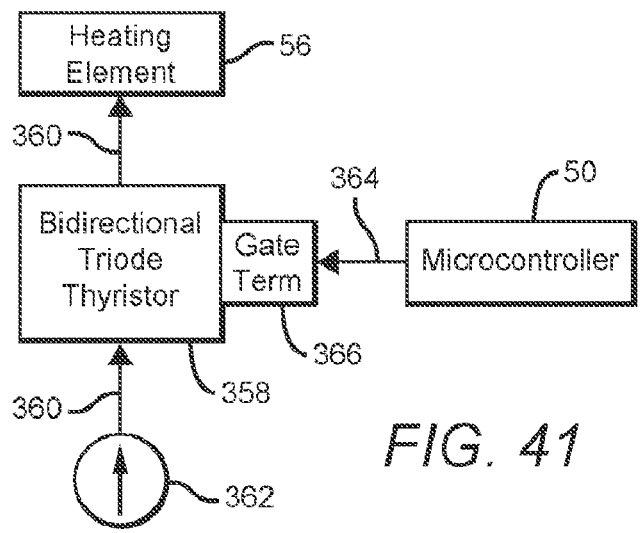
FIG. 41 is a schematic view illustrating the general logic for operating a bidirectional triode thyristor according to an aspect of the present disclosure.

In one embodiment illustrated in FIG. 41, the system 10 may include a bidirectional triode thyristor ("BTT") 358 (i.e., a triode for alternating current or "TR IAC") to control the current, voltage, and/or power provided to the heating element 56. The system 10 operates on alternating current ("AC") power, where both the current and voltage vary with phase angle in a sinusoidal manner. In this respect, to supply a specified current to the heating element 56 from an AC power source (e.g., a wall outlet), the current must be turned on and off at various points along the alternating current sine wave. In this respect, the BTT 358 uses phase control, a form of pulse width modulation, to selectively supply to current to the heating element 56 at the correct phase angles to achieve the desired current delivery (e.g., 7 amperes). More specifically, the BTT 358 is a semiconductor device that allows an alternating current 360 to pass therethrough (e.g., from an alternating current source 362, such as an electrical outlet) when a trigger pulse 364 (i.e., a small electrical current that turns "on" and turns "off" the BTT 358) is supplied to a gate terminal 366. In this respect, the microcontroller 50 can control the amount of current supplied to the heating element 56 by providing the trigger pulse 364 to the BTT 358 at the desired phase angles. That is, the BTT 358 allows electricity to pass therethrough only at certain points on the alternating current sine wave. The BTT 358 can be pulsed in this manner at any phase angle to achieve any current, voltage, or power delivery necessary to properly heat the water in the heater tank 16.

Figure 42:
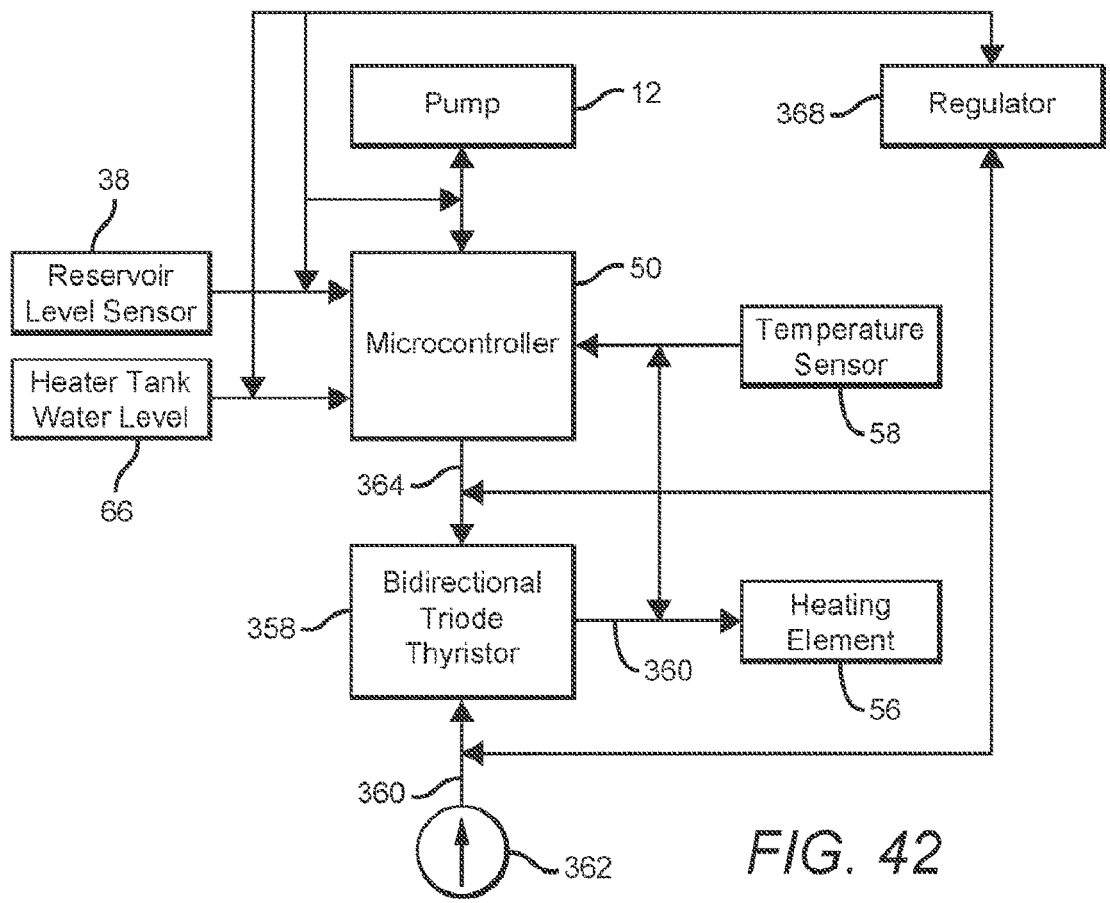
FIG. 42 is a schematic view illustrating the general logic for preventing overheating of the coffee brewer components according to an aspect of the present disclosure.

As illustrated in FIG. 42, the system 10 includes a regulator 368, which monitors the circuitry in the system 10 for shorts, breaks, overheating, etc. If the regulator 368 senses identifies unusual activity with the brewer circuitry (e.g., operating outside of certain factor of safety thresholds), the regulator 368 may be able to disable the system 10, including the controller 50 and the heating element 56 and/or the pump 12. In this respect, the regulator 368 provides an added product safety benefit by allowing the brewing system 10 to operate within properly functioning and safe brewing conditions.

Figure 43:
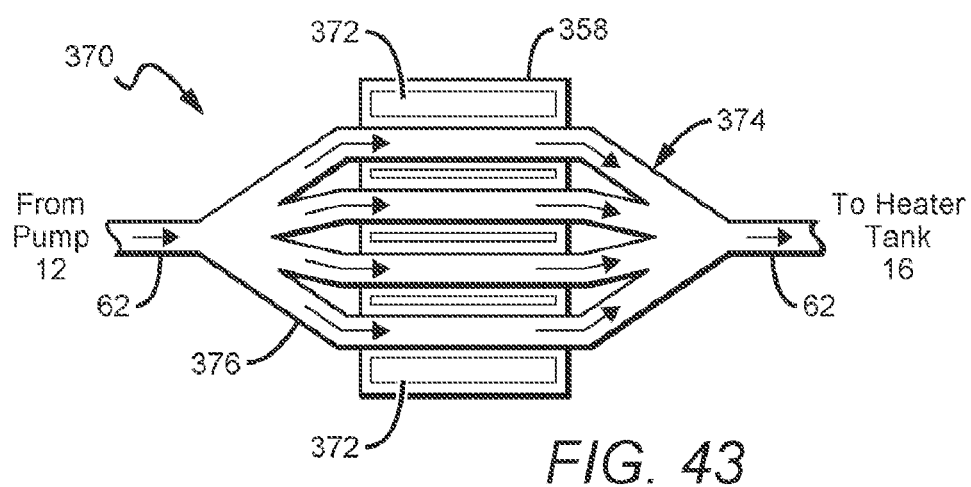
FIG. 43 is a diagrammatic view of a cooling system for cooling the bidirectional triode thyristor and preheating water according to an aspect of the present disclosure.

In another aspect of the brewing system 10 disclosed herein, FIG. 43 illustrates a cooling system 370 for providing simultaneous cooling of internal brewer components such as the BTT 358 and other heat producing devices (e.g., microcontroller 50) and heating of water en route to the heater tank 16. For example, the BTT 358 may include one or more cooling fins 372 that act as a heat sink to draw heat away from the BTT 358. The second conduit 62 may include a heat exchanger 374 that runs in and around the cooling fins 372 to pick up heat energy emitted by the BTT 358 and transferred to the heat conducting fins 372. As a result, this cools the BTT 358 and pre-heats the water flowing to the heater tank 16. This particular feature may increase the overall efficiency of the system 10.

That is, by increasing the temperature of the water entering the heater tank 16 using heat energy from other components that is otherwise lost, the heating element 56 needs less time and energy to heat the water in the heater tank 16 to the appropriate or desired brew temperature. The heat exchanger 374 divides the flow through the second conduit 62 into a plurality of smaller conduits 376 as shown in FIG. 43 to increase the efficiency of the heat transfer. The smaller conduits 376 may then recombine in the second conduit 62 before the flow reaches the heater tank 16. The heat exchanger 374 may also be disposed in the first conduit 40. Alternately, the cooling system 370 may include a cooling circuit (not shown) that transports heat from the BTT 358 to the heat exchanger 374 so that the cooling fins 372 need not be adjacent to the second conduit 62.

Figure 44:
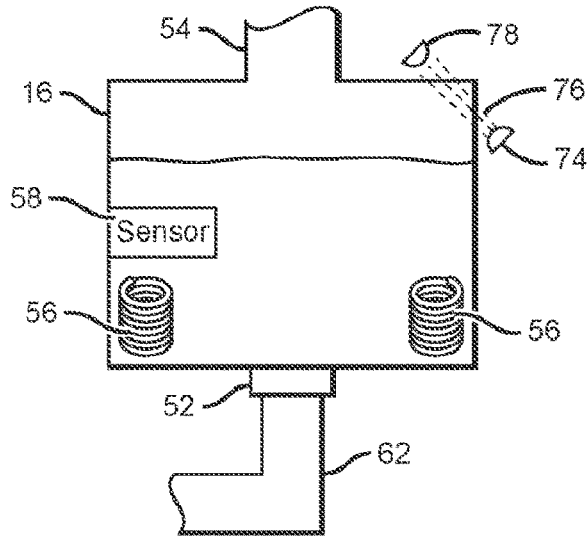
FIGS. 44 and 45 are schematic views of a heater tank water level sensor according to an aspect of the present disclosure.
Figure 45:
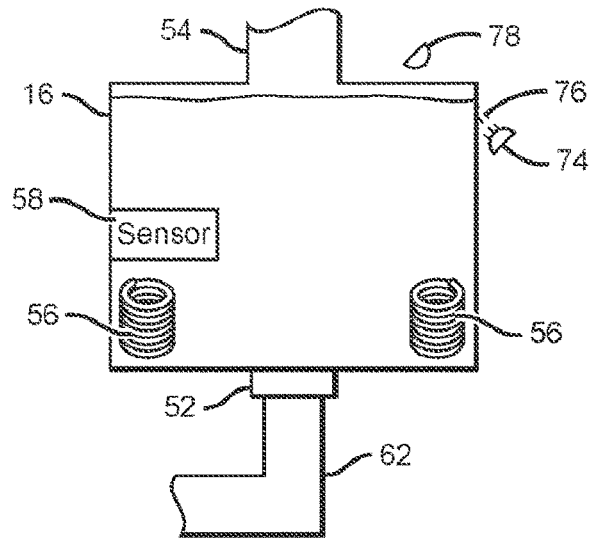

In an alternate embodiment illustrated in FIGS. 44 and 45, the brewing system 10 may include a floatless heater tank level sensor 66′′′ for determining when the heater tank 16 is filled with water. In this respect, the emitter 74 and the photoreceptor 78 may be disposed on the exterior of an upper corner of the heater tank 16. In the embodiment shown in FIG. 44, the emitter 74 is disposed at an upward angle with respect to the generally vertical side wall of the heater tank 16 and the photoreceptor 78 is disposed at a downward angle with respect to the generally horizontal upper wall of the heater tank 16. As such, the light beam 76 exits the emitter 74 and passes through a portion of the heater tank 16 before contacting the photoreceptor 78. The presence of water in the path of the light beam 76 alters the optical properties (e.g., intensity) thereof. In this respect, the light beam 76 is unaltered when the heater tank 16 is not full, i.e., no water is present in the upper corners of the heater tank 16 as shown in FIG. 44.

Conversely, the optical properties of the light beam 76 are altered when the heater tank 16 is completely full, i.e., water is present in the upper corners of the heater tank 16 as shown in FIG. 45. Here, the light beam 76 is interrupted such that the photoreceptor 78 no longer receives a signal. This state may be communicated to the microcontroller 50 and identified as a condition wherein the heater tank 16 is full. One advantage of the floatless heater tank level sensor 66′′′ is that the system 10 may be able to reduce the volume of water that overflows the heater tank 16 due to thermal expansion during the heating process. More specifically, the float-based heater tank water level sensors 66, 66′, 66′′ may allow water flow out of the heater tank outlet 54 and into the cavity 68 disposed above the heater tank 16 before turning "off" the pump 12. Conversely, the floatless heater tank level sensor 66′′′ may turn the pump 12 "off" before the water level reaches the heater tank outlet 54. In this respect, there is more room for the water to thermally expand before spilling into the second air line 110. The heater tank 16 walls or the portion thereof that the light beam 76 passes through may be substantially transparent. The positions of the emitter 74 and photoreceptor 78 may be reversed. Moreover, the emitter 74 and photoreceptor 78 may be disposed elsewhere on the heater tank 16 (i.e., not in an upper corner). For example, the emitter 74 and photoreceptor 78 may be placed on opposite sides of the heater tank outlet 54 or on opposite sides of an upper portion of the heater tank 16. Additionally, the floatless sensor 66′′′ may be any type of optical sensor capable of determining the presence of water.

Figure 46:
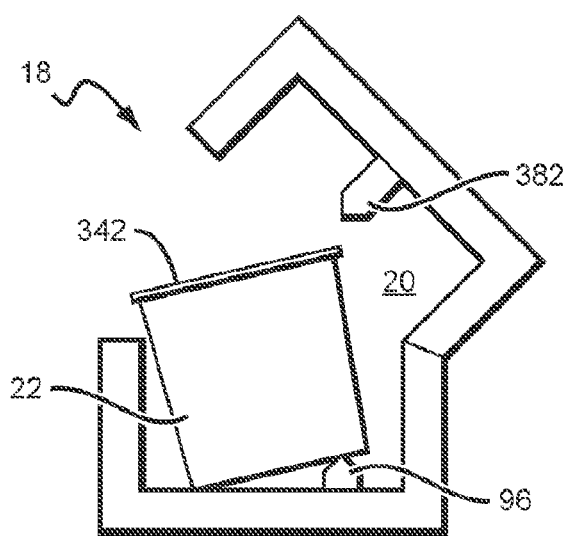
FIG. 46 is a diagrammatic view of a brew head according to an aspect of the present disclosure.

Conventional brewers known in the art, such as the one shown in the diagrammatic view of FIG. 46, include the outlet needle 96 toward the rear of the brew chamber 20. This causes the brew cartridge 22 to initially sit at an angle as generally shown in FIG. 46. Typically, the upper portion of the brew head 18 moves angularly with respect to the lower portion thereof when closing the brew chamber 20. As such, a fixed inlet needle 382 disposed at a generally right angle to the upper portion of the brew head 18 moves from a rearwardly angled position (i.e., the top of the fixed inlet needle 382 is behind the bottom thereof) to a vertical position as the brew head 18 closes. During this movement, the fixed inlet needle 382 is not substantially vertical until the brew chamber 20 is fully closed—this occurs after the fixed inlet needle 382 pierces the lid 342. Moreover, the brew cartridge 22 is also rearwardly angled (i.e., the rear of the brew cartridge 22 is higher than the front thereof) when the fixed inlet needle 382 initially contacts the lid 342. As such, the fixed inlet needle 382 is disposed at an acute angle with respect to the lid 342 during the piercing thereof as illustrated in FIG. 46. As the brew chamber 20 continues to close, the fixed inlet needle 382 moves to a substantially vertical position, while brew cartridge 22 moves toward a substantially horizontal position, thereby piercing the lid 342. The inlet needle 382 of known brewers is relatively short (possibly as a result of failing to rotate), so the risk of angled piercing is relatively low, but such a puncturing system can lead to an increased risk of "blow out", as mentioned above.

Figure 47:
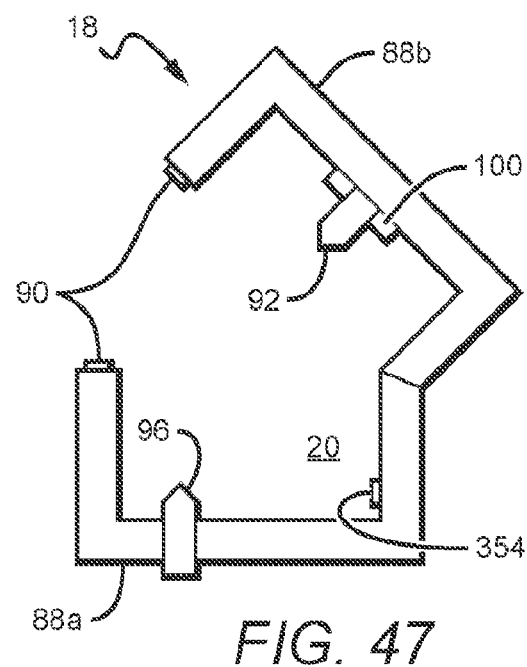
FIGS. 47 and 48 are diagrammatic views of a brew head according to an aspect of the present disclosure.
Figure 48:
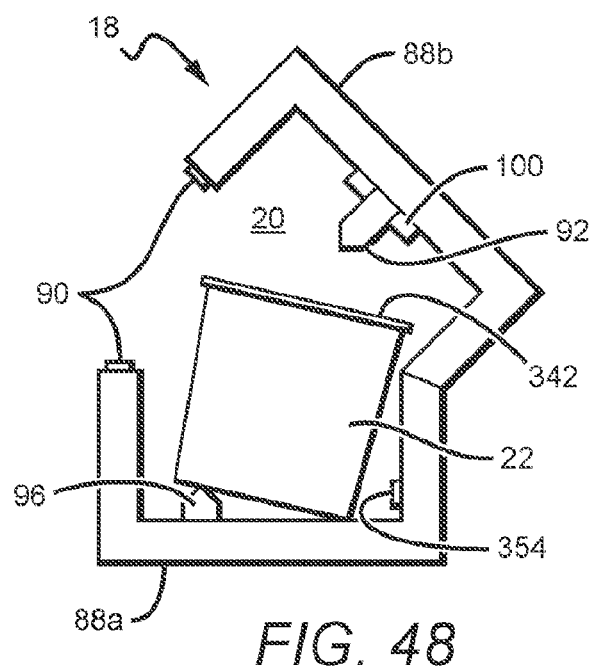
Figure 49:
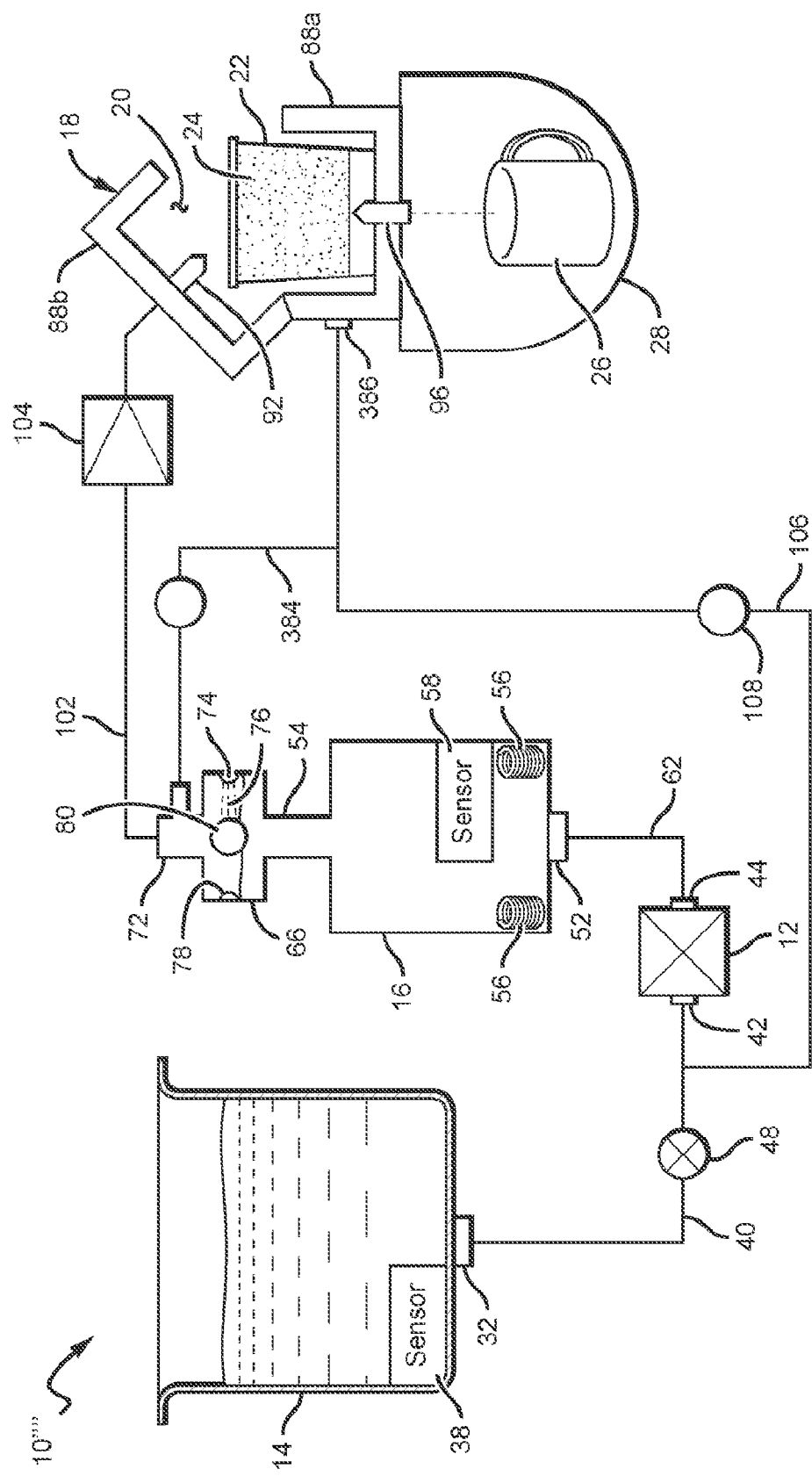
FIG. 49 is a schematic view of an embodiment of the coffee brewing system according to an aspect of the present disclosure.

To rectify the above-mentioned issue, FIGS. 47 and 48 illustrate an embodiment wherein the outlet needle 96 is disposed at the front of the brew chamber 20 (i.e., on the side of the brew chamber 20 closest to the release button 130), as opposed to the rear as shown in FIG. 46. In this respect, the brew cartridge 22 initially angles inwardly toward the interior of the brew head 18 and presented for substantial perpendicular engagement with the inlet needle 92. As such, the rotating inlet needle 92 is disposed substantially at a right angle relative to the lid 342 during piercing thereof. This occurs because the brew cartridge 22 is angled slightly forward and the rotating inlet needle 92 is angled slightly backward. Moreover, the rotating inlet needle 92 remains at a generally right angle with respect to the lid 342 as the rotating inlet needle 92 and the lid 342 move to a final fully pierced brew position (i.e., a vertical orientation for the rotating inlet needle 92 and a horizontal orientation for the brew cartridge 22). This feature maintains the desired right angle engagement when the inlet needle 92 and the outlet needle 96 puncture the cartridge 22 when enclosed within the brew chamber 20. As such, the lid 342 does not tear and can be used with an inlet needle, such as the rotating inlet needle 92, relatively longer than other inlet needles known in the art. In another alternative embodiment illustrated in FIG. 49, the system 10'''' includes a purge conduit 384 for storing water that flows out of the heater tank 16 due to thermal expansion when heating the water therein. As such, this embodiment does not include or require the second air line 110, the atmospherically vented tube 150, or the overflow fitting 398. More specifically, the purge conduit 384 may extend from the heater tank level sensor outlet 72 to an air inlet port 386 which may be disposed on the lower jaw 88*a*. The purge conduit 384 includes the second solenoid valve 112, similar to the second air line 110. The solenoid valve 112 selectively controls fluid access to the purge conduit 384 when in the "open" position and selective prohibits access to the purge conduit 384 when in the "closed" position, as generally described herein. The first air line 106 extends between the purge conduit 384 and the first conduit 40. As such, the pump 12 draws purging air through the through inlet port 386, the large diameter tube and first air line 106 when the first solenoid valve 108 is open. The purge conduit 384 should be of a size (as may be manipulated in width and length) capable of storing at least the maximum amount of water that may be expelled from the heater tank 16 during the heating process, i.e., when the heather tank 16 is full and the water therein is heated from ambient temperature to the desired brew temperature. As such, water from the purge conduit 384 will not flow out of the inlet port 386. In this respect, the purge conduit 384 functions more akin to an auxiliary or overflow reservoir than and conduit. The inlet port 386 may be disposed anywhere in the system 10 where it can draw air from the atmosphere, not just the brew head 18 as shown.

Since the volume of water stored in the purge conduit 384 depends on the amount of heating necessary to bring the water in the heater tank 16 to the brewing temperature, the microcontroller 50 may use a look-up table 388 (FIG. 50) to determine the quantity of water to pump from the reservoir 14 to the heater tank 16 during a brew cycle (e.g., step (218)). The water in the heater tank 16 thermally expands when heated, thereby overflowing into the purge conduit 384. Accordingly, larger changes in temperature, e.g., from ambient or room temperature to 192° F. or the desired brew temperature, will result in larger changes in water volume, while smaller changes in temperature, e.g., from 192° F. in energy saver mode to 192° F., will result in smaller changes in water volume. The change in volume during heating process dictates how much water is temporarily stored in the purge conduit 384. During the air purge process (i.e., step (220)), the pump 12 pumps all of the water stored in the purge conduit 384 back into the heater tank 16 before drawing any purging air, thereby forcing an equal quantity of water into the brew cartridge 20. As such, the system 10'''' must reduce the amount of water that the pump 12 displaces from the reservoir 14 during the brew process (i.e., steps (216) and (218)) by the amount in the purge conduit 384 to maintain the proper serving size. For example, if the user selects an 8 oz. serving size, and 0.5 oz. of water is stored in the purge conduit 384, the pump 12 must displace 7.5 oz. of water during steps (216) and (218) to ensure that the resultant serving size is 8 oz. In this respect, the microcontroller 50 can use the look up table 388 to accurately estimate the amount of water in the purge conduit 384 based on the temperature of the water in the heater tank 16 when the brew cycle is initiated. For example, if the water in the heater tank 16 is substantially at brew temperature (e.g., around 192° F.), nearly no thermal expansion occurs because the water herein does not need to be heated before starting the brew cycle. As such, the pump 12 will displace a quantity of water equal to the desired serving size during the steps (216) and (218). If the water is at 140° F., however, 0.3 oz. of water may be present in the purge conduit 384. As such, the pump 12 would displace 0.3 oz. less than the desired serving size from the reservoir 14 during steps (216) and (218) since the same volume of water would be recaptured from the purge conduit 384 at the end of the brew cycle. The quantities identified above are for illustrative purposes only and are not necessarily reflective of the actual volumes of water in the purge conduit 384 at any given point in time. In an embodiment, the look up table 388 may change values at increments of 20° F. Although, persons of ordinary skill in the art will readily recognize that the lookup table 388 may use different increments, depending on the desired resolution.

Another problem with single-serve coffee brewers known in the art is that the water reservoir is subject to condensation, as shown, e.g., in FIG. 51. As disclosed herein, the heater tank 16 significantly increases in temperature (e.g., to 192° F.) in preparation for and during a brew cycle. The elevated temperature of the heater tank 16 also causes relative heating of the ambient air within the brewer housing. As such, a side panel 392 of the brewer adjacent to the water reservoir 14 also increases in temperature and can cause or accelerate evaporation of water therein. Additionally, some of the warmer water from the second air line 110 may evaporate if it flows into reservoir 14 due to the concomitant pressure drop, as described herein. When the water vapor trapped in the reservoir 14 cools, it condenses onto the walls of the reservoir 14 as illustrated in FIG. 51. Condensation is typically most problematic when the heater tank 16 is "on" (i.e., heating water therein).

To address the condensation issue, the brewing system 10 may include a vent 390 (FIG. 52) formed in the brewer housing that allows heated air from within the interior of the brewer to travel out and into the interior of the water reservoir 14. Furthermore, the water reservoir lid 30 may include a notch 394 at or near the front thereof and toward the interior of the brewer, such as adjacent the side panel 392 (FIG. 53). Accordingly, the warmer air from the brewer interior functions as an automatic heat pump to substantially reduce, and in some cases eliminate, condensation on the interior of the water reservoir 14 by providing flow through circulation from the vent 390 out through the notch 394. That is, the vent 390 shown in FIG. 52 allows warm air to exit the brewer housing into the reservoir 14, and the notch 394 shown in FIG. 53 allows this warm air and any associated water vapor in the reservoir 14 to escape into the atmosphere. As such, water vapor is not able to condense (or minimally condenses) on the walls of the reservoir 14 because: (1) the heated air from the interior of the brewer maintains the air in the water reservoir 14 at an elevated temperature; (2) the heated air is relatively drier and reduces the humidity in the water reservoir 14; and (3) the air flow through the water reservoir carries out water vapor out from the interior of the water reservoir 14 through the notch 394, prior to cooling. In this respect, the vent 390 and the notch 394 create a "chimney effect" and act as a natural heat pump to draw hot air from inside the brewer housing through the notch 394. The vent 390 may be disposed underneath the overflow spout 398, but may be disposed anywhere that provides fluid communication between the reservoir 14 and the space enclosed by the brewer housing. In an alternative embodiment, the water reservoir 14 may also include a fan (not shown) for moving air through the water reservoir 14 to substantially reduce or eliminate condensation therein.

In another aspect of the brewing system 10, the brew head 18 may include a solenoid that prevents opening the brew chamber 20 during a brew cycle. In this respect, the solenoid may lock the release button 130 in the non-depressed position during the brew cycle, or provide some other electrical or mechanical sealing mechanism. As such, even if the release button 130 is pushed, the release button shaft 136 will not actuate the jaw lock 128 to allow the upper jaw 88b to move away from the lower jaw 88a. To this end, the brew chamber 20 remains closed during the brew cycle and until the solenoid releases the button 130, to prevent inadvertent opening thereof.

In an alternative embodiment, the brewing system 10 may not cycle the pump 12 to maintain the heater tank 16 in a completely filled state when the water therein thermally condenses as a result of cooling. Here, the system 10 allows the water level in the heater tank 16 to fall below the heater tank water level sensor 66. Upon initiation of a brew cycle, water in the heater tank 16 is increased in temperature until the desired brewing temperature is reached. At this point, the system 10 may determine whether the heater tank is full by reading the heater tank water level sensor 66. If the water level is too low, the pump will displace additional water from the reservoir 14 to fill the heater tank 16.

In another aspect, the system 10 may have three distinct heater tank filling modes. The system 10 operates in a first filling mode at first use. Here, the pump 12 displaces water from the reservoir 14 into the heater tank 16 until the heater tank water level sensor 66 indicates that the heater tank 16 is full. The microcontroller 50 then activates the heating element 56 to heat the water in the heater tank 16 to the appropriate brewing temperature (e.g., 192° F.). As such, the water thermally expands and overflows into the second air line 110, atmospherically vented tube 150 or purge conduit 384, depending on the embodiment. Typically, the amount of overflow is approximately 12 grams; although, the overflow amount may be more or less depending on the specific characteristics of the brewer. As discussed in greater detail above, the pump 12 displaces any residual water in the second air line 110, the atmospherically vented tube 150 or the purge conduit 384 before drawing purging air. In this respect, the pump 12 must displace less water during the brew cycle (i.e., steps (216) and (218)) to ensure the resultant beverage is of the correct serving size. As such, the microcontroller 50 uses a correction factor to adjust the run time of the pump 12 to deliver the correct serving size. The system 10 never uses the first mode again after the first brew cycle since the system 10 experiences a relatively large amount of water overflow as a result of all the initial water being pumped into the heater tank 16 at ambient temperature.

A second mode is used after the first brew cycle and when the water in the heater tank 16 is at or near the desired brew temperature. Here, the heater tank 16 is completely full or substantially full with heated water. Accordingly, the water in the heater tank 16 does not substantially thermally contract before the next brew cycle initiates because the water is already at the desired brew temperature. As such, the system 10 is ready to begin the brew cycle (i.e., steps (216) and (218)). It may, however, be necessary to briefly cycle the pump 12 to top off the heater tank 16 if some evaporation has occurred.

A third mode is used after the first brew cycle and when the water in the heater tank 16 has cooled. As discussed in detail above, the water in the heater tank 16 thermally contracts upon cooling. Accordingly, the water level in the heater tank 16 may fall below a level that can be read by the heater tank water level sensor 66. As such, the sensor 66 may send a signal to the microcontroller 50 that the heater tank 16 is not completely full. Here, the microcontroller 50 may ignore the heater tank water level sensor 66 when the water in the heater tank 16 is below the brew temperature. As such, upon initiation of the next brew cycle, the microcontroller 50 activates the heating element 56 to heat the water in the heater tank 16, thereby causing the water in the heater tank 16 to thermally expand. Typically, this thermal expansion increases the water level in the heater tank 16 to a point where the sensor 66 reads the heater tank 16 as being "full" when the water reaches the desired brew temperature. Regardless, once the water in the heater tank 16 is at the desired brew temperature, the microcontroller 50 then considers the signal from the heater tank water level sensor 66. If the sensor 66 indicates the heater tank 16 is not full, the pump 12 may displace additional water into the heater tank 16 to top it off. The heater tank 16 may lose water, e.g., by way of evaporation or otherwise. As such, the amount of additional water displaced into the heater tank 16 is substantially less than in other embodiments disclosed herein. At this point, the system 10 is ready to initiate the brew cycle.

In another aspect, a system 500 disclosed herein is adapted to produce carbonated beverages from a carbonated beverage cartridge 502 having a carbonating gas precursor 504 in an inner chamber 506 thereof and a soluble beverage medium 508 in an outer chamber 510 thereof. The system 500 is substantially similar to the systems 100, 100', 100", 100''', but includes a modified brew head 18' and modified brew chamber 20' having a rotating hollow shaft 512 disposed concentrically around the rotating inlet needle 92. The rotating hollow shaft 512 helps open a through channel 514 between the inner and outer chambers 506, 510 and an annular outlet 516 in the bottom of the carbonated beverage cartridge 502. The rotating inlet needle 92 injects hot water into the inner chamber 506, which reacts with the carbonating gas precursor 504 to produce carbonated gas. This carbonated gas flows up through the through channel 514 and intermixes with the soluble beverage medium 508 to form a carbonated beverage. The carbonated beverage then dispenses through the annular passageway 516 into an underlying beverage vessel such as the mug 26.

Figure 54:
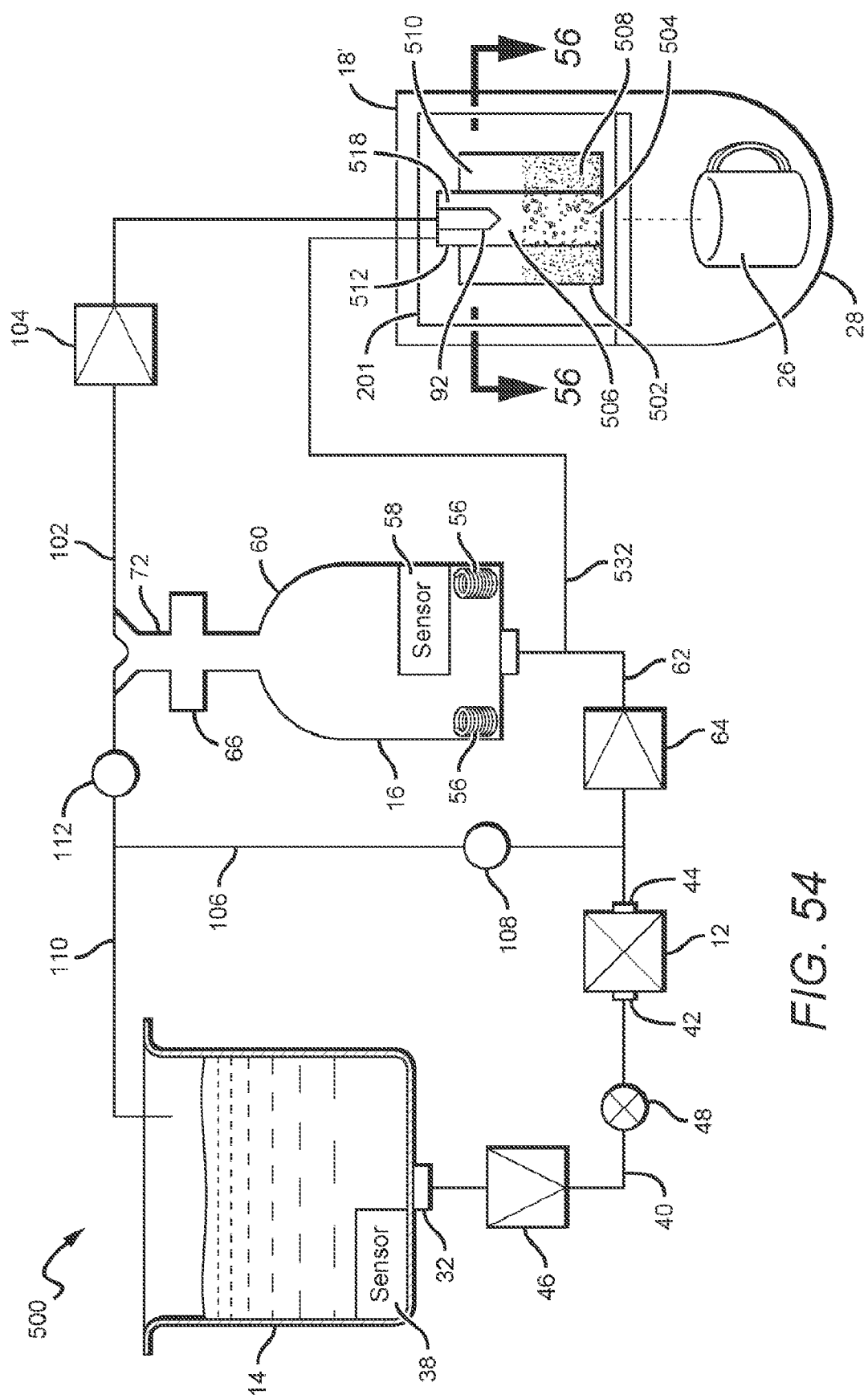
FIG. 54 is a schematic view of an embodiment of the brewing system according to an aspect of the present disclosure.

With respect to FIG. 54, the system 500 may generally include the pump 12 that displaces ambient temperature water from the reservoir 14 to the heater tank 16 for heating thereof and eventual delivery to the brew head 18' for injection into the carbonated beverage cartridge 502 via the rotating inlet needle 92. The brew head 18' further includes the rotating hollow shaft 512 disposed concentrically around the rotating inlet needle 92, thereby forming an annular passageway 518 therebetween. The rotating hollow shaft 512 includes one or more protrusions or keys 520 that engage complementary protrusions or keys 522 on an inner container 524 that forms the inner chamber 506 of the carbonated beverage cartridge 502. Furthermore, the rotating inlet needle 92 and the rotating hollow shaft 512 are configured for vertical movement with respect to the brew head 18'. That is, the bottom ends of the rotating inlet needle 92 and the rotating hollow shaft 512 are moveable from a position generally above the carbonated beverage cartridge 502 to a position below a pierceable lid 526 thereof. The rotating inlet needle 92 and the rotating hollow shaft 512 may rotate in the same or different directions, at the same time or at different speeds with respect to one another. In this respect, the brew head 18' includes one or more motors for spinning the rotating inlet needle 92 and the rotating hollow shaft 512. As illustrated in FIG. 55, a single motor 528 may rotate both the inlet needle 92 and the hollow shaft 512 at different speeds or directions, e.g., via a gearbox or transmission 554. Alternatively, two or more motors (not shown) may rotate each independently. In one embodiment, the rotating inlet needle 92 is heated by, e.g., a resistance heater 530.

The system 500 further includes a cold water delivery conduit 532, which supplies cold water to the brew head 18' for eventual delivery to the carbonated beverage cartridge 502 via the annular passageway 518. In one embodiment, the cold water conduit 532 may extend from the reservoir 14 to the brew head 18'. In this respect, the system 500 may include a second pump (not shown) for pumping water through the cold water conduit. The cold water conduit 532 may extend from the second conduit 62 to the brew head 18' as illustrated in FIG. 54. Accordingly, the pump 12 displaces water from the reservoir 14 to both the heater tank 16 and the annular passageway 518. The cold water delivered to the brew 18' may be ambient temperature water directly from the reservoir 14 or chilled water that passes through a chiller or other refrigeration unit 534 en route to the brew head 18'.

Figure 56:
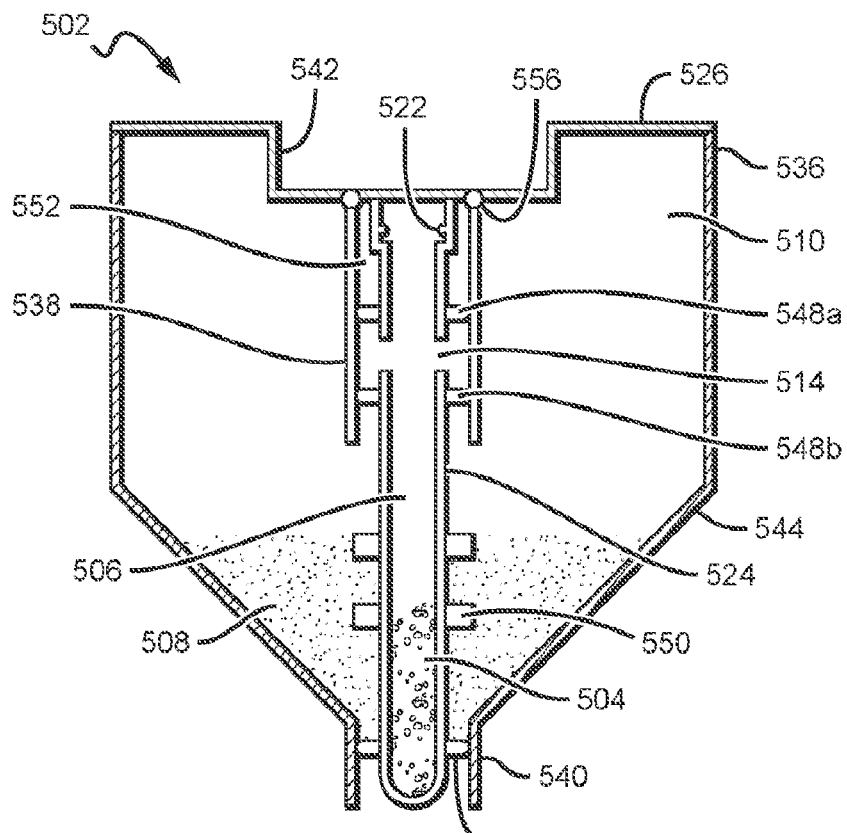
FIG. 56 is a cross-sectional view of one embodiment of a carbonated beverage cartridge taken generally about the Line 56-56 in FIG. 54 according to an aspect of the present disclosure.

As briefly mentioned above, the system 500 includes the carbonated beverage cartridge 502 having the inner container 524 forming the inner chamber 506 and an outer container 536 forming the outer chamber 510. The carbonated beverage cartridge 502 operates in a similar manner as the bottle cap and valve assembly disclosed in U.S. Pat. Nos. 5,273,083; 5,413,152; and 5,553,270, each of which are incorporated herein by reference in their entirety. More specifically as illustrated in FIG. 56, the outer container 536 is generally cylindrically-shaped and contains the soluble beverage medium 508 (e.g., syrup). An inlet tube 538 extends from the top surface of the outer container 536 down into the outer chamber 510. An outlet tube 540 extends downward from the bottom surface of the outer container 536. In this respect, the inlet tube 538 is disposed in the interior of the outer container 536 (i.e., in the outer chamber 510) and the outlet tube 540 is disposed on the exterior of the outer container 536. The lengths of the inlet and outlet tubes 538, 540 may be about 25-30% of the height of the outer container 536. Although, the inlet and outlet tubes 538, 540 may be longer or shorter as necessary. In one embodiment, the top surface of the outer container 536 may include a central counter bore 542 to which the top of the inlet tube 538 attaches. In this respect, the top surface of carbonated beverage cartridge 502 has a generally stepped configuration where the central portion thereof is lower than the periphery. The bottom portion of the outer container 536 may optionally include a chamfer 544 to funnel the contents of the outer chamber 536 into the outlet tube 540. Furthermore, the outer container 536 may be any suitable shape known in the art (e.g., rectangular).

The inner container 524 is generally cylindrical with a closed bottom and open top and contains the carbonating gas precursor 504. The inner container 524 includes the through channel 514 that provides for fluid communication with the outer chamber 510. The exterior surface of the inner container 524 includes at least one upper circumferential ridge 548a disposed above the through channel 514 and at least one middle circumferential ridge 548b disposed below the through channel 514. Furthermore, the exterior surface of the inner container 524 includes at least one lower circumferential ridge 548c disposed substantially near the bottom thereof. The pierceable lid 526 closes the open top of the inner container 524. The lid 526 is slightly larger than the top of the inner container 524 to permit connection with the outer container 536 via ultrasonic welds 556 or any other suitable method (e.g., adhesive). The exterior surface of the inner container 524 may include a plurality of fins or paddles 550 extending out therefrom. The carbonating gas precursor 504 may be a mixture of sodium bicarbonate ($NaHCO_3$) and citric acid ($C_6H_8O_7$) in solid form (e.g., a powder). Although, the carbonating gas precursor 504 may be any substance and in any phase that produces carbon dioxide gas when exposed with water.

The inner container 524 is disposed generally concentrically within the outer container 536 and configured to move rotationally and vertically with respect thereto. In this respect, the outer chamber 510 is generally annular and disposed circumferentially around the inner container 524 and the inner chamber 506. More specifically as illustrated in FIG. 56, the upper and lower portions of the inner container 524 are disposed within the inlet and outlet tubes 538, 540, respectively. As such, the upper and middle circumferential ridges 548a, 548b sealingly abut the inner wall of the inlet tube 538. Similarly, the lower circumferential ridge 548c sealingly abuts the interior wall of the outlet tube 540. In this respect, the upper circumferential ridge 548a prevents anything from entering or exiting the top of outer chamber 536 via the inlet tube 538, the middle ridge 548b prevents any fluid communication between the inner and outer chambers 506, 510, and the lower circumferential ridge 548c prevents anything from entering or exiting the outer chamber 510 through the outlet tube 540. The contact between the circumferential ridges 548a, 548b, 548c and the inlet and out tubes 538, 540 must be tight enough to prevent liquids from passing therebetween, yet loose enough to permit the inner container 524 to move relative to the inlet and outlet tubes 538, 540. The lid 526 is joined to the top of the outer container 536 via ultrasonic welding or adhesive. In this respect, the top of the inner container 524 is generally planar with the top of the inlet tube 538 and the lid 526 further seals the top of both the inner and outer chambers 506, 510.

Figure 57:
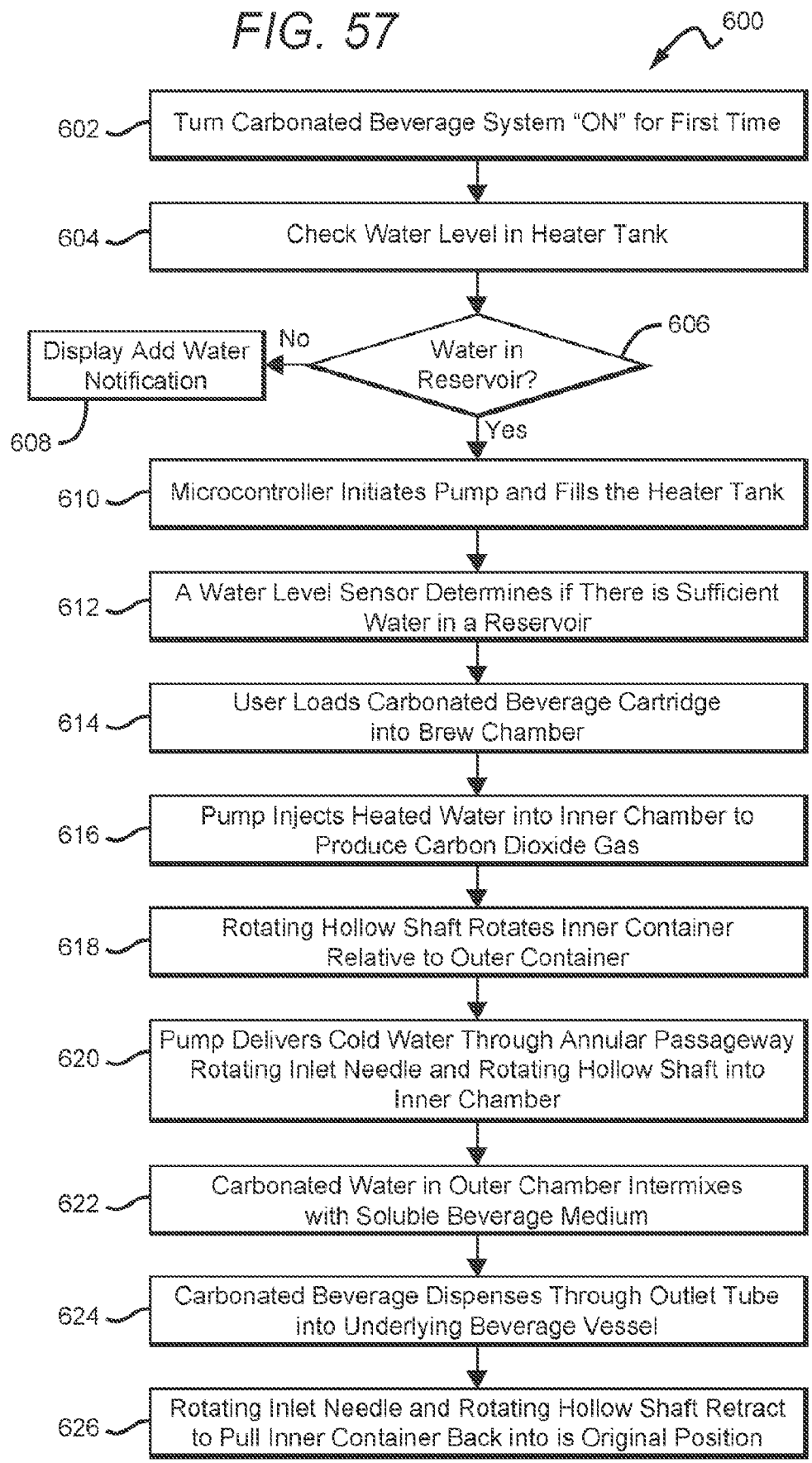
FIG. 57 is a flow chart illustrating a method for producing a carbonated beverage according to an aspect of the present disclosure.

FIG. 57 illustrates one method (600) for producing a carbonated beverage with the system 500 in accordance with the embodiments disclosed herein. Steps (602)-(612) are substantially the same as steps (202)-(212). Step (614) is substantially the same as step (214), albeit the carbonated beverage cartridge 502 is placed in the brew chamber 20' instead of the brew cartridge 22. Also, the brew head 18' does not include the outlet needle 96 as mentioned above. Thus, nothing pierces the bottom of the carbonated beverage cartridge 502. The system 500 is ready to produce a carbonated beverage upon the completion of step (614).

Figure 58:
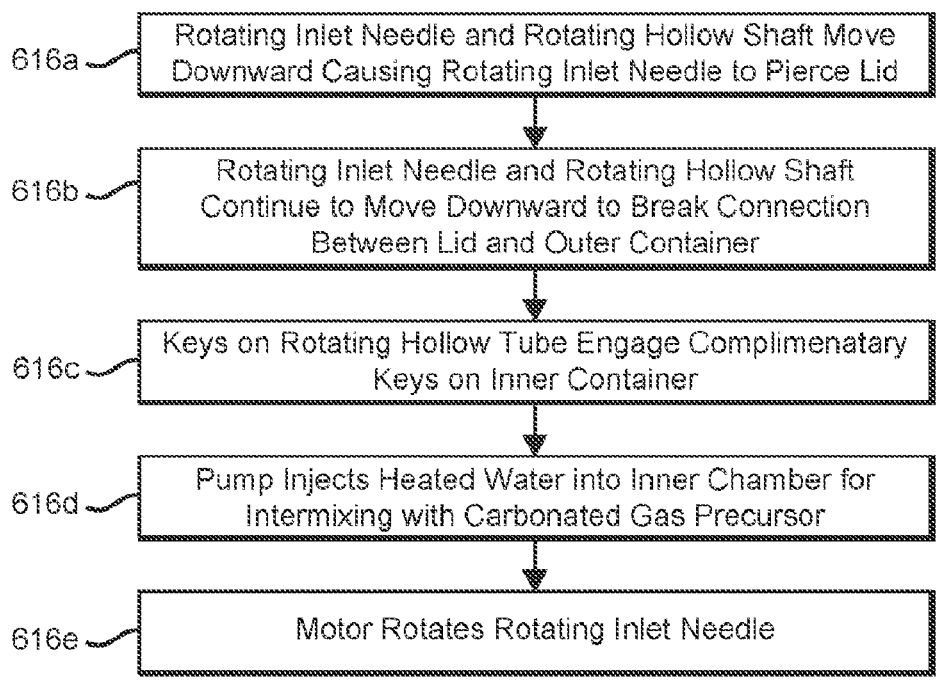
FIG. 58 is a flow chart illustrating a method for injecting heated water into an inner chamber of the carbonated beverage cartridge according to an aspect of the present disclosure.
Figure 59:
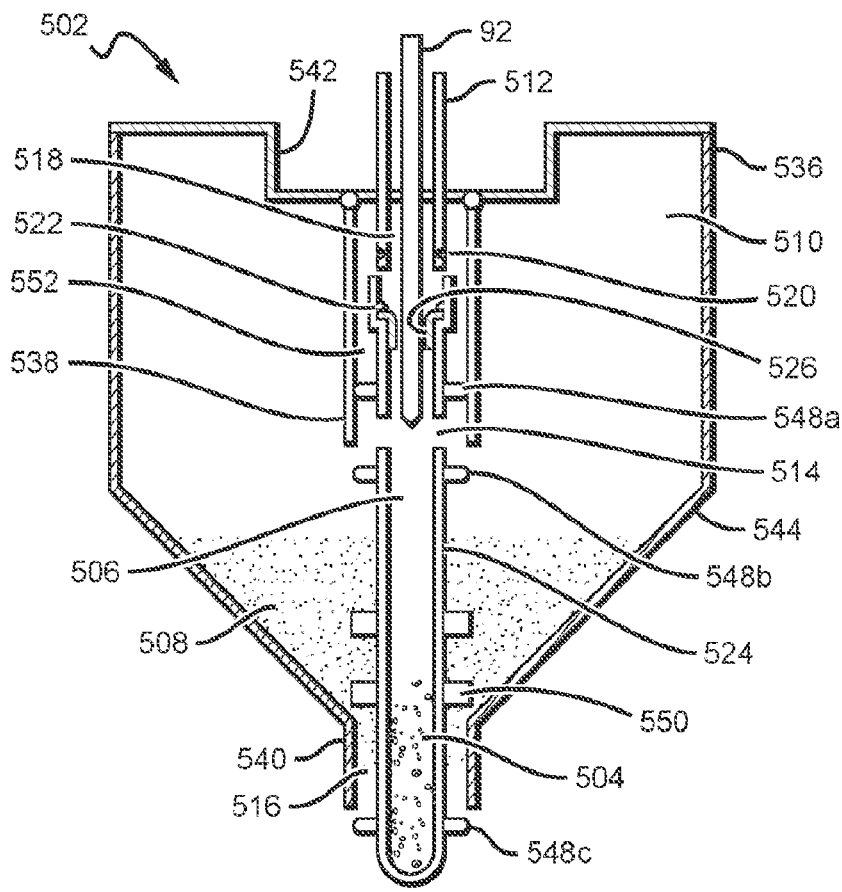
FIG. 59 is a cross-sectional view of the carbonated beverage cartridge according to an aspect of the present disclosure.
Figure 60:
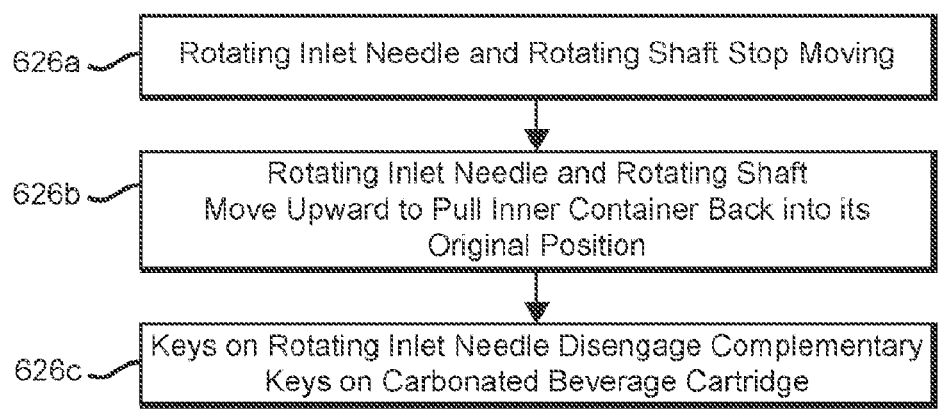
FIG. 60 is a flow chart illustrating a method for sealing the carbonated beverage cartridge according to an aspect of the present disclosure.

In step (616), the pump 12 injects heated water into the inner chamber 506 to produce carbon dioxide gas. More specifically as illustrated in FIG. 58, the rotating inlet needle 92 and the rotating hollow shaft 512 move downward in step (616a), thereby causing the rotating hollow shaft 512 to pierce the lid 526. As such, the rotating inlet needle 92 also obtains access to the inner chamber 506. Next, the rotating inlet needle 92 and the rotating hollow shaft 512 continue to move downward in step (616b), thereby contacting the inner container 524 and breaking the connection (e.g., the welds 556) between the lid 524 and outer container 536. This causes the inner container 524 to move downward with respect to the outer container 536. As such, the middle ridge 548b is no longer in contact with the inlet tube 538 and the lower ridge 548c is no longer in contact with the outlet tube 540 as illustrated in FIG. 59. In this respect, fluid communication is permitted between the inner and outer chambers 506, 510. Similarly, the fluid may flow through the outlet tube 540 into an underlying beverage vessel such as cup 26 now that the lower ridge 548c is disposed below the bottom of the outlet tube 540. In step (616c), the keys 520 on the rotating hollow tube 512 engage the complementary keys 522 on the inner container 524. In this respect, the inner container 524 and the rotating hollow shaft 512 now move both vertically and rotationally in unison. The pump 12 then injects heated water into the inner chamber 506 for intermixing with the carbonating gas precursor 504 in step (616d). Heated water causes the carbonating gas precursor 504 to release greater amounts of carbon dioxide more quickly than ambient temperature or colder water. Next, the motor 528 rotates the rotating inlet needle 92.

The next step is for the rotating hollow shaft 512 to rotate the inner container 524 relative to the outer container 536 in step (618). The combination of the motions of the rotating inlet needle 92 and the rotating hollow shaft 512 vigorously mix the heated water and the carbonating gas precursor 504, thereby creating carbon dioxide gas bubbles. In one embodiment, the carbonation gas precursor 504 is a mixture of sodium bicarbonate (NaHCO3) and citric acid (C6H807) in solid form (e.g., a powder). In this respect, sodium bicarbonate and citric acid reacts with the heated water to form sodium citrate, water, and carbon dioxide gas. The fins 550 disposed on the exterior of the inner container 536 rotate as well, thereby agitating and mixing the soluble beverage medium 508. The rotating hollow shaft 512 may rotate in a different direction or at a different speed than the rotating inlet needle 92 to more vigorously intermix the heated water and carbonation gas precursor 504.

In step (620), the pump 12 pumps cold water through the annular passageway 518 into the inner container 536. More specifically, the carbon dioxide bubbles in the inner chamber 506 rise to the top thereof for travel out through the channel 514. A small portion of the carbon dioxide bubbles may be released from the carbonating gas precursor 504 in the heated water in the inner chamber 506. Warmer water is used to more quickly and efficiently dissolve carbon dioxide gas therein. The carbonated water then flows into the outer chamber 510 through the channel 514. The channel 514 may include a mesh screen or other filtering agent to prevent dry precursor 504 from exiting the inner chamber 506. In particular, the upper ridge 548a prevents the carbonated water from flowing upward through the inlet tube 538 and exiting the top of the carbonated beverage cartridge 502. The middle ridge 548b, however, is disposed below the bottom of the inlet tube 538, thereby permitting the carbonated water to readily flow into the outer chamber 510. In this respect, the cold water injected into the inner chamber 506 permits sufficient intermixing of the carbon dioxide dissolved into the relatively warmer water injected by the rotating needle 92.

In step (622), the carbonated water in the outer chamber intermixes with the soluble beverage medium 508, thereby producing the carbonated beverage. The fins 550 agitate and stir the carbonated water and soluble beverage medium 508 to create turbulence therein, thereby further facilitating the intermixing and homogenization process.

In step (624), the carbonated beverage dispenses from the outlet tube 540 and into the underlying beverage vessel such as mug 26. As discussed in greater detail above, the lower ridge 548c had moved to a position below the bottom of the outlet tube 540 in step (616) and as illustrated in FIG. 59. In this respect, the annular outlet 516 is open, thereby allowing the carbonated beverage to flow therethrough. At this point, the user may enjoy the refreshing carbonated beverage.

Figure 61:
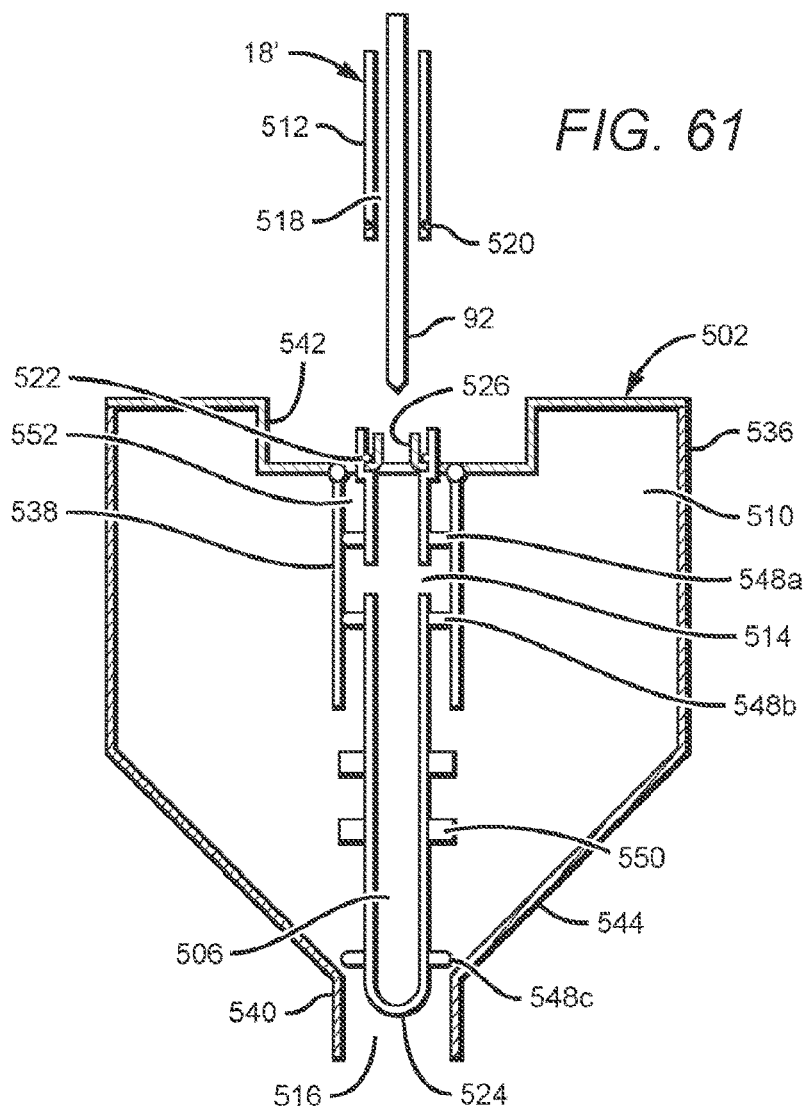
FIG. 61 is a cross-sectional view of the carbonated beverage cartridge similar to FIGS. 56 and 59 according to an aspect of the present disclosure.
Figure 63:
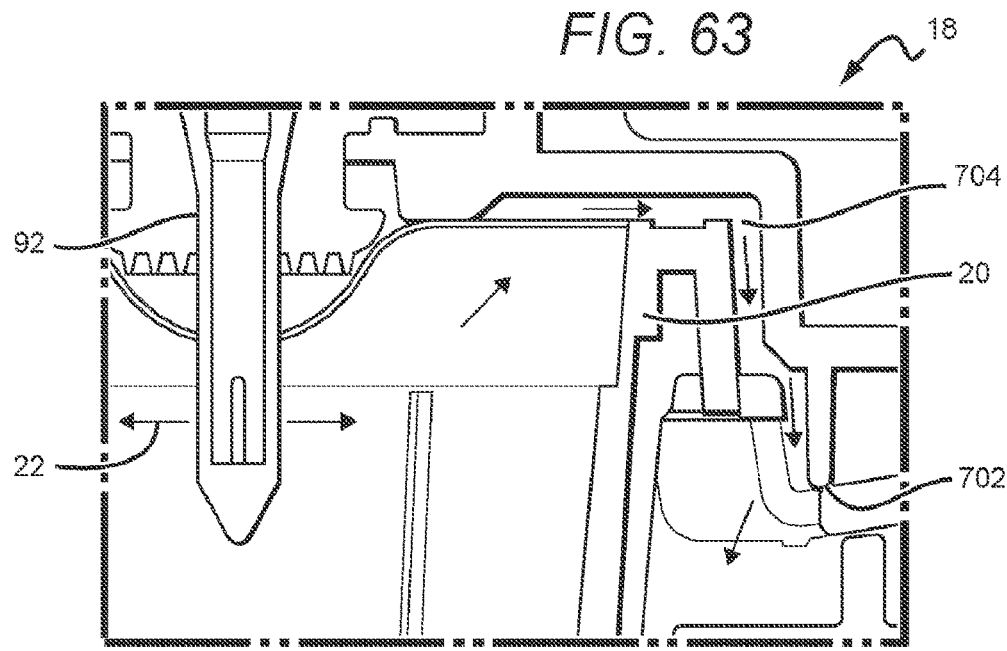
FIG. 63 is an enlarged view taken generally about Rectangle 63 in FIG. 39 according to an aspect of the present disclosure.

The rotating hollow shaft 512 and rotating inlet needle 92 retract (i.e., move upward) in step (626), thereby pulling the inner container 524 back to its original position. The system 500 may clean the inlet needle 92 with water as it is being removed from engagement with the inner container 524. In step (626a), the rotating inlet needle 92 and the rotating hollow shaft 512 stop rotating. Next, the rotating inlet needle 92 and rotating hollow shaft 512 move upward in step (626b), thereby pulling the inner container 524 back into is original position (i.e., the position prior to step (616)). Here, the middle ridge 548b is in sealing contact with the inlet tube 538 to prevent fluid communication between inner and outer chambers 506, 510 and the bottom ridge 548c is in sealing contact with outlet tube 540 to prevent any liquid flow therethrough. In this respect, the lower ridge 548c prevents any residual soluble beverage medium 508 or carbonated beverage from leaking out of the carbonated beverage cartridge 502 after beverage production. The rotating hollow shaft 512 disengages the inner container 524 in step (626c). Specifically, the keys 520 on the rotating hollow shaft 512 disengage the complementary keys 522 on the carbonated beverage cartridge 502. FIG. 61 illustrates the carbonated beverage cartridge 502 and the brew head 18' after the step (626) is complete. At this point, the user may open the brew head 18' and remove and discard the used carbonated beverage cartridge 502.

The brewing systems 10 disclosed herein may include a sealing ring 702 and one or more drainage passageways 704 to trap and drain into the underlying beverage vessel (e.g., the cup 26) any water that escapes from the brew cartridge 22 during beverage production. More specifically and as shown in FIG. 62, the upper jaw 88b includes the sealing ring 702 disposed circumferentially around the exterior of the brew chamber 20. When the brew chamber 20 closes, the lower and upper jaws 88a, 88b compress the sealing ring 702 therebetween to provide a liquid-tight seal around the brew chamber 20. In this respect, heated liquid and steam cannot escape through the mating surfaces between the lower and upper jaws 88a, 88b. The sealing ring 702 may be constructed from plastic, but may also be made from silicone, ethylene propylene diene monomer (EPDM) rubber, or any other suitable material known in the art. The lower jaw 88a includes the one or more drainage passageways 704 extending therethrough from a portion of the brew chamber 20 disposed radially outward from the brew cartridge 22 and radially inward from the sealing ring 702. In this respect, any liquid or steam generated within the brew chamber 20 during a brew cycle flows through the drainage passageways 704 and eventually dispenses into the underlying cup 26. This prevents liquid from escaping out between the lower and upper jaws 88a, 88b and back into the brewer housing. In this respect, the brew chamber 20 is the only "wet" area (i.e., area exposed to fluid), while the area enclosed by the brewer housing remains substantially dry and free of liquid.

Figure 64:
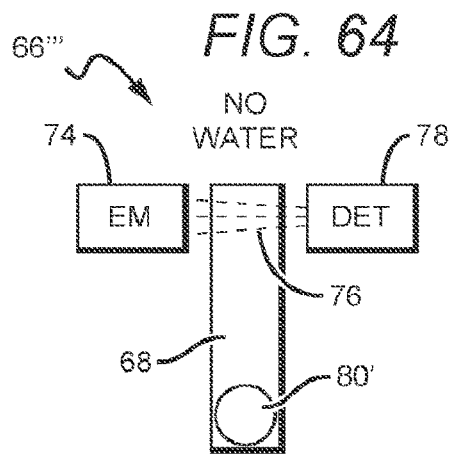
FIG. 64 is a diagrammatic view of a heater tank water level sensor according to an aspect of the present disclosure.
Figure 65:
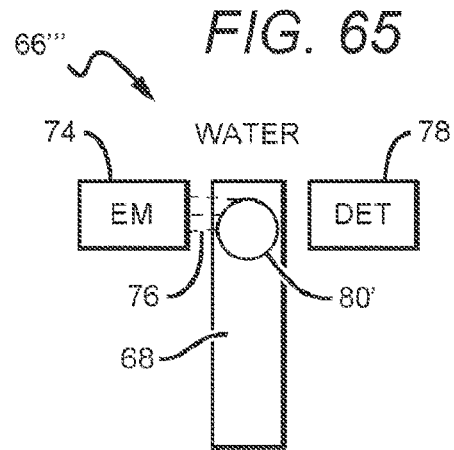
FIG. 65 is a diagrammatic view of the heater tank water level sensor according to an aspect of the present disclosure.
Figure 66:
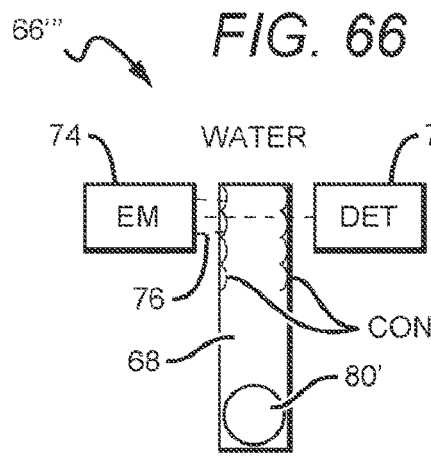
FIG. 66 is a diagrammatic view of the heater tank water level according to an aspect of the present disclosure.

As illustrated in FIG. 66, condensation may cause heater tank water level sensors 66, 66', 66" to send false readings to the microcontroller 50 indicating that the heater tank 16 is full. As discussed in greater above, the sensor 66 includes the emitter 74 that emits the light beam 76 across the cavity 68 for reception by the photoreceptor 78. When the heater tank 16 is not full as illustrated in FIG. 64, the photoreceptor 78 receives the light beam 76. Conversely, the float 80 occludes the light beam 76 when heater tank 16 is full, as shown in FIG. 65. The heater tank 16 heats the water therein and in the heater tank sensor 66 to a brew temperature close to the boiling temperature of water (e.g., 192° Fahrenheit). When this water cools, e.g., during the energy saver made, steam or moisture in the air may condense on the inner walls of the cavity 68 in the form of droplets or bubbles. These droplets or bubbles form various concave and convex light refracting surfaces on the walls of the cavity 68. This can cause the light beam 76 to diverge into multiple directions, thereby significantly decreasing the intensity that would otherwise be received by the photoreceptor 78. In this respect, the droplets or bubbles on the walls of the cavity 68 cause the rays in the light beam 76 to scatter. As such, significant condensation may weaken the light beam 76 to an extent that the photoreceptor 76 no longer reads the beam. In this respect, the controller 50 may identify the heater tank 16 as being full. A false heater tank sensor reading can prevent the system 10 from brewing the desired serving size.

In this respect, the pump 12 may deliver a topping-off volume of water from the reservoir 14 to the heater tank 16 prior to initiating the brew cycle (i.e., steps (216) and (218)) to ensure the heater tank 16 is completely full. As discussed in greater detail above, overflow from the heater tank 16 flows into the atmospherically vented tube 150, which overflows back into the reservoir 14. The topping-off volume of water is a volume of water large enough to ensure the heater tank 16 and the atmospherically vented tube 150 are completely full when the brew cycle initiates. Specifically, the topping-off volume is the sum of the maximum amount of evaporation that may occur from the heater tank 16, the volume of the atmospherically vented tube 150, and a safety volume, which is an additional amount of water that causes the water in the atmospherically vented tube 150 to overflow into reservoir 14. The safety volume acts analogously to a factor of safety. As such, the microcontroller 50 knows exactly how much water is in the system 10 at the beginning of the brew cycle, thereby allowing the system 10 to consistently deliver the correct serving size. The controller 50 specifically knows the volume of water in the system because it is a function of the volume in the heater tank 16 and the atmospherically vented tube 150, each of which are full. For example, if the maximum expected evaporation is 0.5 oz. and the atmospherically vented tube 15 holds 2 oz. of water, the topping-off volume may be 2.7 oz. (i.e., 0.5 oz. to compensate for evaporation, 2 oz. to fill the atmospherically vented tube, and a 0.2 oz. safety volume). In this respect, at least 0.2 oz. will flow back into the reservoir 14, but this ensures that the heater tank 16 and the atmospherically vented tube 150 are completely full.

Figure 67:
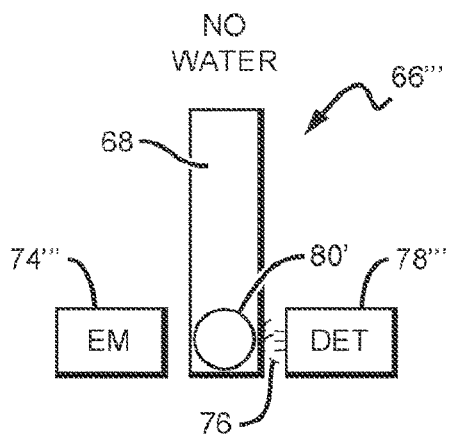
FIG. 67 is a diagrammatic view of an embodiment of the heater tank water level sensor according to an aspect of the present disclosure.
Figure 68:
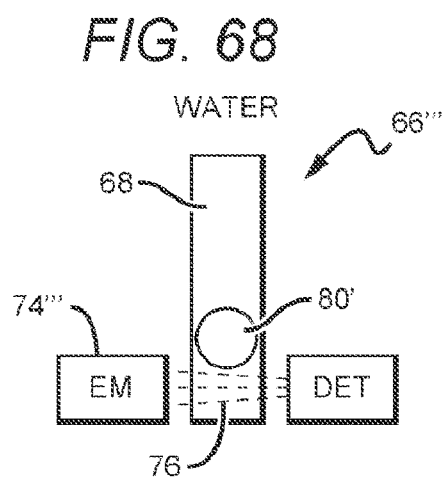
FIG. 68 is a diagrammatic view of the heater tank water level sensor according to an aspect of the present disclosure.

In an alternate embodiment illustrated in FIGS. 67 and 68, a heater tank water level sensor 66''' includes an emitter 74''' and a photoreceptor 78''' disposed at the bottom of the heater tank water level sensor 66. In this respect, the float 80' occludes the photoreceptor 78''' from receiving the light beam 76 when the heater tank 16 is not full, as shown in FIG. 67. Here, the float 80' is at the bottom of the cavity 68 when the heater tank 16 is not full. The float 80' is eventually pushed out of occlusion with the light beam 76 when the water level in the sensor 66 surpasses the level of the emitter 74''' and the photoreceptor 78''', as illustrated in FIG. 68. As such, the microcontroller 50 knows that the heater tank 16 is full when the photoreceptor receives the light beam 76.

The sensor 66''' is not affected by condensation, as could the sensors 66, 66', 66" because the condensation occurs at the top of the cavity 68, as shown in FIG. 66. In this respect, the condensation cannot not disperse the light beam 76 because there is no condensation at the bottom of the cavity 68 where the photoreceptor 78''' is disposed, i.e., it is filled with water when the float 80' no longer occludes transmission of the light beam 76. When the cavity 68 is full, the water therein does not affect the sensor readings. It is not the water itself that causes the divergence in the light beam 76. Instead, the concave and convex surfaces of the water droplets or bubbles on the walls of the cavity 68 formed by the surface tension of water causes the light beam 76 to disperse or scatter. When the heater tank 16 is full, there are no water droplets on these surfaces, as shown in FIG. 68. As such, the light beam 76 passes through the water without any significant divergence thereof that would result in false readings.

Another feature of the brewing system 10 is that the brewer circuitry (e.g., the microcontroller 50) may include logic that determines when the water reservoir 14 has been inadvertently or purposely removed during operation of a brew cycle. In this sensed condition, the microcontroller 50, e.g., may turn off some or all the operating equipment such as the pump 12, the heating element 56, etc. to ensure safety and proper shutdown. Removal of the reservoir 14 during the brew cycle immediately cuts off the ambient water supply. As a result, the pump 12 no longer displaces water from the reservoir 14 but, instead, pumps air into the heater tank 16 for delivery to the brew head 18, as described above.

In this condition, the flow meter 48 (e.g., as shown in FIGS. 1 and 16) may fail if included in the brewing system 10. Air pumped through the heater tank 16 enters into the heater tank level sensor 66 before the brew head 18. The heater tank level sensor 66 may be designed to measure the turbulence therein, e.g., to detect removal of the reservoir 14 during a brew cycle. For example, this may be accomplished through use of a light sensor (transmitter/receiver) that measures the bubbling turbulence flowing through the heater tank level sensor 66. Here, the microcontroller 50 may identify that the reservoir 14 has been removed when the heater tank level sensor 66 sees turbulent bubbling therein for some predetermined duration.

Alternatively, the sensor 66 may measure the rate that the float 80, 80', 80" occludes the light beam 334 from traveling between the emitter 332 to the photoreceptor 336. Note that there may be some movement of the float 80, 80', 80" within the heater tank level sensor 66 during a brew cycle as a result of normal movement of air and water and fluctuations in pressure therein. Movement of the float 80, 80', 80" in normal operating conditions in this respect, however, should be intermittent. Accordingly, the microcontroller 50 may be configured to identify a condition when the system 10 has not initiated the "purge" cycle and when the heater tank level sensor 66 measures or identifies some minimum threshold number of repeat pulses or bounces (i.e., conditions where the float 80, 80', 80" may occlude and then not occlude the light beam 334) in successive repetition (and possibly within some predetermined time frame). For example, in an embodiment, the microcontroller 50 may identify that the reservoir 14 was removed from the system 10 during the brew cycle when the heater tank level sensor 66 measures 20 or 40 successive pulses within a couple seconds. The pulses are the result of air bubbling through the heater tank level sensor 66.

In another embodiment, the system 10 may include a servo-feedback loop designed to control the heating of water in the heater tank 16 by the heating element 56. The servo-feedback loop is a proportional derivative loop or PID controller. Basically, the PID controller calculates an error value as the difference between a measured process variable (e.g., the variable temperature within the heater tank 16 at any given point in time) and a desired set point (e.g., the desired brewing temperature). The P ID controller attempts to minimize the error by adjusting the brew process through use of the manipulated variable. In this respect, a larger difference between the temperature of the water in the heater tank 16 and the desired brewing temperature (e.g., when the water therein is ambient temperature) may cause the microcontroller 50 to increase the intensity of the heating element 56 for purposes of more rapidly heating the water therein. The P ID controller may continually or intermittently (e.g., every few seconds or microseconds) measure the rate of change in the error value and dampen the heating element 56 as the error becomes smaller as a result of the temperature in the heater tank 16 becoming closer to the desired brew temperature. In other words, the PID controller may allow the brewing system 10 to more quickly heat water in the heater tank 16 without overheating.

Although several embodiments have been described in detail for purposes of illustration, various modifications may be made without departing from the scope and spirit of the disclosure. Accordingly, the disclosure is not to be limited, except as by the appended claims.

Figure 69:
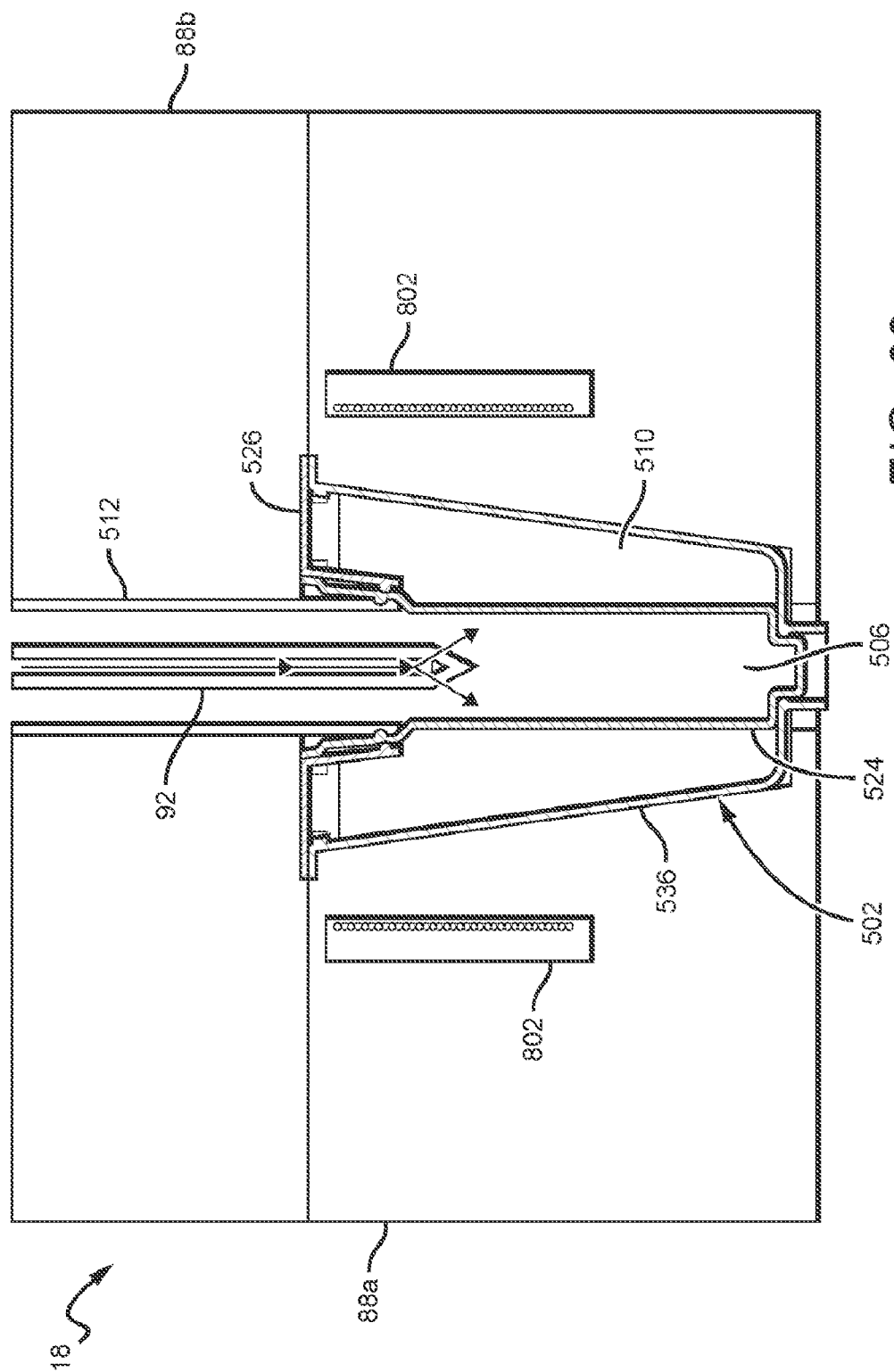
FIG. 69 is a diagrammatic view of a brew head according to an aspect of the present disclosure.

In a further embodiment, the carbonation system 500 may use inductive heating to heat the water delivered into the inner chamber 506 of the carbonated beverage cartridge 502 by the rotating inlet needle 92 during the carbon dioxide gas production step (i.e., step (616)). More specifically, the brew head 18 may include a high-voltage induction coil 802, which receives high frequency alternating current from the current source 362. The microcontroller 50 and/or the BTT 358 may control the delivery of alternating current to the coil 802. The coil 802 may encircle at least a portion of the rotating inlet needle 92 when the rotating inlet needle 92 is in its lowered water delivery position, i.e., the position during the step (616*d*). In this respect, the coil 802 may be located in either the lower jaw 88*a*, as illustrated in FIG. 69, or the upper jaw 88*b*. The rotating inlet needle 92 may be constructed from a conductive material such as steel or another ferrous metal to facilitate heat transfer and inductive heating.

As illustrated in FIG. 69, the coil 802 converts the room temperature water entering the rotating inlet needle 92 into heated water to facilitate the carbon dioxide production process. In this respect, the pump 12 pumps room temperature from the reservoir 14 to the rotating inlet needle 92. The alternating current flowing through the coil(s) 802 creates eddy currents (i.e., circular electric currents) in the rotating inlet needle 92 and the water flowing therethrough. The internal resistance of the rotating inlet needle 92 and water dissipates the eddy currents, thereby producing heat that increases the temperature of the rotating inlet needle 92 and the water flowing therethrough (i.e., resistive heating).

The rotating inlet needle 92 will typically heat faster than the water because steel and most other ferrous metals have a lower specific heat capacity than water. In this respect, heat will diffuse from the hotter rotating inlet needle 92 into the relatively cooler water flowing therethrough (i.e., via thermal conduction), thereby further heating the water entering the carbonated beverage cartridge. As such, the coil(s) 802 may eliminate or otherwise supplement the resistance needle heater 530.

In addition to the embodiments described above, various additional features can be incorporated into embodiments of the present disclosure, as will be further described below.

As described in U.S. Provisional Patent Application 61/940,290 ("the '290 Application), which is fully incorporated by reference herein in its entirety, inlet nozzles according to the present disclosure (such as the inlet needle 92 shown in FIG. 9) may move in many different manners. Such manners include, but are not limited to:

vertical or horizontal translational movement;

rotation of the inlet needle about an axis distal from the inlet needle, such as (but not limited to) circumferential movement;

spinning of the inlet needle about its own central axis;

rotational "pivoting" wherein the base of the inlet needle remains stationary while the bottom of the needle rotates (or the base rotates with a radius less than or greater than the rotational radius of the bottom of the needle); and/or vertical and/or horizontal vibrational and/or oscillatory movement.

Many different manners of inlet needle movement are possible, and the above listing should not be considered limiting in any manner. Additionally, the movement of the inlet needle can be coordinated with the flow of water through the inlet needle outlet(s) in order to maximize performance. In one embodiment of the present disclosure, an inlet needle can perform a "needle brew cycle" in order to maximize performance. The first phase of the needle brew cycle can include flowing water through the inlet needle outlet(s) prior to beginning the movement of the inlet needle. This can enable the displacement of material—such as coffee grounds—away from the inlet needle outlet(s). Next, the inlet needle can begin its movement cycle, as described above and in U.S. Provisional Patent Application 61/940,290. Beginning the flow of water prior to beginning movement of the inlet needle can prevent material within the cartridge from becoming stuck to the inlet needle, which could cause clogging.

Near the end of the needle brew cycle, the inlet needle can end its movement while water continues to flow. This can enable the displacement of material away from the inlet needle outlet(s) in its final resting position, thus preventing any clogging of the inlet needle outlet(s) when the brew head is opened and the inlet needle removed.

Embodiments of the present disclosure can perform functions of prior art systems and devices while eliminating prior art components. For example, in embodiments of the present disclosure, fluid flow can be measured without the use of a flowmeter. FIG. 3 shows a schematic of a system according to the present disclosure which may not include a flow meter. As previously described, the pump 12 can function as both an air pump and a heater pump. Additionally, in some embodiments of the present disclosure, a pump can act as a flowmeter and pressure regulator.

Pumps according to the present disclosure can act as a pressure regulator and/or a flowmeter as described in U.S. Provisional Patent Application No. 62/112,627, filed on Feb. 5, 2015, which is fully incorporated by reference herein in its entirety. Upon each pump action of water (e.g., rotation of the pump 12 rotor or movement of the pump 12 piston(s)) from the pump 12, a current reading may spike due to the work and/or fluid displacement being accomplished. These current readings may be used to calculate flow volumes, as each current spike may correspond to an amount of water sent from the pump. Further, by monitoring the amount of fluid being displaced, the pump may act as a pressure regulator within system 10. By calculating flowrate based upon current readings instead of, for example, use of a flowmeter or optical sensor, components may be eliminated, leading to a more cost-efficient system.

In some instances, due to, for example, current reading errors, spikes in current may not register, and thus certain fluid movement may not register in the flow calculation described above. In such instances, current pulse correction may be corrected for, such as by code which recognizes a missing pulse and compensates for the missing pulse in the final flowrate calculation.

Other manners of flowrate and current calculation are possible. For example, the magnetic flux near the motor running the pump can be measured and the amount of current transmitted to the pump can be calculated therefrom; from the current, the flowrate can be calculated. Many different characteristics and/or measurable characteristics of the motor and/or the pump can be measured in order to calculate the total flowrate, including but not limited to: light generated by arcing inside the motor; heat generated inside or outside the motor; sound generated by the motor and/or pump; and vibrational movement generated by the motor and/or pump.

Embodiments of the present disclosure can also include components for preventing the deformation of cartridges typically used in coffee machines. Typical cartridges can become deformed upon being encountered by water of a high temperature. Prior art systems for holding a cartridge typically simply hold the cartridge at its top, therefore allowing deformation throughout the body of the cartridge below its uppermost portion. As shown in FIG. 70, in embodiments of the present disclosure, a deformation barrier 3006 can be formed against most or all of the sidewall(s) of the cartridge 3004. This can allow for heating of the cartridge 3004 to higher temperatures, such as those typically associated with espresso brewing. The deformation barrier(s) 3006 can be biased so as to press against the cartridge 3004, such as by a spring-like and/or a hydraulic system.

Additionally, deformation barriers according to the present disclosure may include systems for cooling the cartridge 3004. For example, the deformation barrier 3006 may be double-walled and include a flow of liquid, such as water, therethrough. The deformation barrier 3006 can be thermally conductive so as to carry heat away from the cartridge 3006. This water can serve to cool the outer walls of the cartridge 3004 to prevent cartridge deformation. Embodiments of deformation barriers 3006 according to the present disclosure include, but are not limited to, rigid barriers and non-rigid barriers, such as deformable bladders.

Some embodiments of the disclosure may include pre-heating of a cartridge in order to achieve a certain product. For example, a brew of 4 ounces or an espresso brew of, for example, 1.5-2 oz, will lose proportionally more heat (compared to an 8 oz. brew) due to the heat sink capabilities of the cartridge 3004. As such, it can be advantageous to pre-heat the cartridge 3004 in order to lessen the heat loss. In order to achieve this, water in a heater tank (e.g., the heater tank 16 in FIG. 3) can be heated to the point of producing steam. This steam can then be pumped through an inlet needle, such as the inlet needle 3002, in order to pre-heat the cartridge 3004 and/or the barrier 3006. Such pre-heating can prevent loss of heat from fluid passing through the system, thus providing a hotter product to the user. In some embodiments, the amount of steam pumped into the cartridge 3004 can be converted to liquid volume and included in the calculation of the total volume pumped into the cartridge.

Some embodiments of the present disclosure can include an additional heater which, in fluid flow, is after the cartridge. For example, a boost heater may be used. As seen in FIG. 71, an element 4006 can be included downstream of a cartridge, such as the cartridge 4004. The element 4006 can function similarly to a funnel in order to provide a convenient pour into a user's cup. Additionally, the element 4006 (hereinafter referred to as a "funnel") can be heated so as to provide a hotter final product. By heating the funnel 4006, deformation of the cartridge 4004 can be prevented, since the fluid entering the cartridge 4004 will have not yet been heated by the funnel 4006.

The memory of microprocessor 50 may be implemented in firmware and/or software implementation. The firmware and/or software implementation methodologies may be implemented with modules (e.g., procedures, functions, and so on) that perform the functions described herein. A machine-readable medium tangibly embodying instructions may be used in implementing the methodologies described herein; for example, a barcode and/or UPC code can be included on a cartridge and read by, for example, an optical sensor in the beverage head. For example, software codes may be stored in a memory and executed by a processor unit (e.g., processor 50). Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to brewers. Of course, if the brewer is inverted, above becomes below, and vice versa. Additionally, if oriented sideways, above and below may refer to sides of a brewer. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Although several embodiments have been described in detail for purposes of illustration, various modifications may be made without departing from the scope and spirit of the present disclosure. Accordingly, the disclosure is not to be limited by the examples presented herein, but is envisioned as encompassing the scope described in the appended claims and the full range of equivalents of the appended claims.

Although several embodiments have been described in detail for purposes of illustration, various modifications may be made without departing from the scope and spirit of the present disclosure. Accordingly, the disclosure is not to be limited by the examples presented herein, but is envisioned as encompassing the scope described in the appended claims and the full range of equivalents of the appended claims.

What is claimed is:

1. A brewing system, comprising:
a fluid conduit system;
an air conduit system;
a valve, coupled to the fluid conduit system and the air conduit system;
a pump, coupled to the valve, and
a heater, coupled to an outlet of the pump for heating a fluid pumped by the pump, in which the valve selectively allows access to the fluid conduit system and selectively allows access to the air conduit system such that the pump selectively pumps fluid and selectively pumps air.

2. The brewing system of claim 1, in which a first port of the air conduit system is coupled to atmospheric pressure.

3. The brewing system of claim 2, in which the first port of the air conduit system is coupled to a fluid reservoir.

4. The brewing system of claim 3, in which a first port of the fluid conduit system is coupled to the fluid reservoir.

5. The brewing system of claim 4, in which the pump pumps air through at least a portion of the fluid conduit system when the pump selectively accesses the air conduit system.

6. The brewing system of claim 5, in which the valve at least partially controls a pressure in at least a portion of the fluid conduit system.

7. The brewing system of claim 6, in which the valve is a solenoid valve.

8. The brewing system of claim 7, in which a volume of fluid passing through the pump is measured by monitoring electrical current draw of the pump.

9. A brewing system, comprising:
a fluid conduit system;
a heater;
a pump, coupled to the fluid conduit system and coupled to an inlet of the heater, in which a volume of fluid passing through the pump is measured by monitoring an electrical current draw of the pump, wherein a pressure in the fluid conduit system is regulated by monitoring the electrical current draw of the pump; and
a valve, coupled to the pump, in which the valve selects a pumping medium to be delivered to the pump, wherein air is delivered to the pump as the pumping medium.

10. The brewing system of claim 9, in which the air is pumped through at least a portion of the fluid conduit system.

11. The brewing system of claim 10, in which the air is pumped through the portion of the fluid conduit system after a brew cycle.

12. A method for brewing a beverage, comprising: pumping a fluid at least partially through a first conduit to a heater;
heating the fluid after the fluid has been pumped through the first conduit and before the fluid is delivered to a cartridge containing a beverage medium;
switching a valve when a desired amount of the fluid has been pumped to the cartridge heater; and
pumping air through the first conduit to purge at least a portion of the fluid from the first conduit.

13. The method of claim 12, further comprising measuring an electrical current draw of a pump when the pump is pumping said fluid; and
determining a volume of fluid delivered to the cartridge based at least in part on the measured electrical current draw of the pump.

14. The method of claim 13, in which the first conduit is coupled to a reservoir.

15. The method of claim 14, in which the portion of the fluid purged from the first conduit is purged to the reservoir.

16. The method of claim 15, further comprising determining a pressure in the cartridge based at least in part on the measured electrical current draw of the pump.

17. The method of claim 16, in which the pump is a tri-chamber diaphragm pump.

18. The brewing system of claim 9, in which a first port of the fluid conduit system is coupled to a fluid reservoir.

19. The brewing system of claim 9, in which a valve at least partially controls a pressure in at least a portion of the fluid conduit system.

20. The brewing system of claim 19, in which the valve is a solenoid valve.

* * * * *